(12) United States Patent
Wang et al.

(10) Patent No.: US 10,732,441 B2
(45) Date of Patent: Aug. 4, 2020

(54) NANO-CAVITY MODULATOR DEVICE AND METHOD OF MANUFACTURE AND USE

(71) Applicant: OREGON STATE UNIVERSITY, Corvallis, OR (US)

(72) Inventors: Alan Wang, Corvallis, OR (US); Erwen Li, Corvallis, OR (US)

(73) Assignee: OREGON STATE UNIVERSITY, Corvallis, OR (US)

( * ) Notice: Subject to any disclaimer, the term of this patent is extended or adjusted under 35 U.S.C. 154(b) by 0 days.

(21) Appl. No.: 16/241,264

(22) Filed: Jan. 7, 2019

(65) Prior Publication Data

US 2019/0212586 A1  Jul. 11, 2019

Related U.S. Application Data

(60) Provisional application No. 62/615,813, filed on Jan. 10, 2018.

(51) Int. Cl.
*G02F 1/025* (2006.01)
*G02F 1/015* (2006.01)

(52) U.S. Cl.
CPC ...... *G02F 1/025* (2013.01); *G02F 2001/0158* (2013.01); *G02F 2201/12* (2013.01); *G02F 2201/34* (2013.01)

(58) Field of Classification Search
CPC .......................... G02F 1/025; G02F 2001/0158
See application file for complete search history.

(56) References Cited

U.S. PATENT DOCUMENTS

| | | | | |
|---|---|---|---|---|
| 7,026,640 B2 * | 4/2006 | Nathan | ............... | B82Y 20/00 257/9 |
| 7,298,949 B2 * | 11/2007 | Gothoskar | ............ | G02F 1/025 385/130 |
| 9,057,825 B2 * | 6/2015 | Erickson | ............... | B82Y 20/00 |
| 9,535,308 B2 * | 1/2017 | Li | ...................... | G02B 6/1225 |
| 2004/0021193 A1 * | 2/2004 | Nathan | ............... | B82Y 20/00 257/499 |
| 2004/0150873 A1 * | 8/2004 | Pearsall | ............... | B82Y 20/00 359/321 |
| 2005/0179986 A1 * | 8/2005 | Gothoskar | ............ | G02F 1/025 359/321 |
| 2007/0004164 A1 * | 1/2007 | Lee | ....................... | H01L 28/40 438/393 |
| 2010/0215309 A1 * | 8/2010 | Shubin | ................. | B82Y 20/00 385/3 |
| 2014/0248019 A1 * | 9/2014 | Witzens | ............... | G02F 1/0121 385/2 |

OTHER PUBLICATIONS

Miller, D.A. J. Lightwave Technol. 2017, 35, 346-396.
Pan, Z.; Zhang, C.; Subbaraman, H.; Chung, C. J.; Li, Q.; Xu, X.; Zhang, X.; Guo, L.J.; Chen, R.T. in SPIE Opto, Feb. 2017; International Society for Optics and Photonics.

(Continued)

*Primary Examiner* — Sung H Pak
(74) *Attorney, Agent, or Firm* — Niels Haun; Dann, Dorfman, Herrell & Skillman, P.C.

(57) ABSTRACT

Compact electro-optic modulator with integrated voltage-switched transparent conductive oxide capacitor with one-dimensional silicon photonic crystal nano-cavity.

16 Claims, 33 Drawing Sheets

(56) References Cited

OTHER PUBLICATIONS

Richard Soref, The Past, Present, and Future of Silicon Photonics.; IEEE J. Sel. Top. Quant. 2006, 12, 1678-1687.
Asghari, M.; Krishnamoorthy, A. V. Nat. Photonics 2011, 5, 268-270.
Rumley, S.; Nikolova, D.; Hendry, R.; Li, Q.; Calhoun, D.; Bergman, K. J. Lightwave Technol. 2015, 33, 547-562.
Timurdogan, E.; Sorace-Agaskar, C. M.; Sun, J.; Hosseini, E. S.; Biberman, A.; Watts, M. R. Nat. Commun. 2014, 5.
Leuthold, J.; Koos, C.; Freude, W. Nat. Photonics 2010, 4, 535-544.
Tian, Y.; Zhang, L.; Ji, R.; Yang, L.; Zhou, P.; Chen, H.; Ding, J.; Zhu, W.; Lu, Y.; Jia, L.; Fang, Q. Opt. Lett. 2011, 36, 1650-1652.
Xu, Q.; Soref, R. Opt. Express 2011, 19, 5244-5259.
Wang, Z.; Ying, Z.; Dhar, S.; Zhao, Z.; Pan, D. Z.; Chen, R. T. In CLEO: Science and Innovations, May 2017; Optical Society of America.
Barnes, W. L.; Dereux, A.; Ebbesen, T. W. Nature 2003, 424, 824.
Melikyan, A.; Alloatti, L.; Muslija, A.; Hillerkuss, D.; Schindler, P. C.; Li, J.; Palmer, R.; Korn, D.; Muehlbrandt, S.; Van Thourhout, D.; Chen, B. Nat. Photonics 2014, 8, 229-233.
Haffner, C.; Heni, W.; Fedoryshyn, Y.; Niegemann, J.; Melikyan, A.; Elder, D. L.; Baeuerle, B.; Salamin, Y.; Josten, A.; Koch, U.; Hoessbacher, C. Nat. Photonics 2015, 9, 525-528.
Watts, M. R.; Zortman, W. A.; Trotter, D. C.; Young, R. W.; Lentine, A. L. Opt. Express 2011, 19, 21989-22003.
Tanabe, T.; Nishiguchi, K.; Kuramochi, E.; Notomi, M. Opt. Express 2009, 17, 22505-22513.
Soref, R. A.; Bennett, B. R. IEEE J. Quantum Elect. 1987, 23, 123-129.
Ding, J.; Chen, H.; Yang, L.; Zhang, L.; Ji, R.; Tian, Y.; Zhu, W.; Lu, Y.; Zhou, P.; Min, R.; Yu, M. Opt. Express 2012, 20, 7081-7087.
Xu, Q.; Schmidt, B.; Pradhan, S.; Lipson, M. Nature 2005, 435, 325.
Xiao, X.; Li, X.; Xu, H.; Hu, Y.; Xiong, K.; Li, Z.; Chu, T.; Yu, J.; Yu, Y. IEEE Photonic. Tech. L. 2012, 24, 1712-1714.
Reed, G. T.; Mashanovich, G.; Gardes, F. Y.; Thomson, D. J. Nat. Photonics 2010, 4, 518-526.
DeRose, C. T.; Watts, M. R.; Trotter, D. C.; Luck, D. L.; Nielson, G. N.; Young, R. W. In Conference on Lasers and Electro-optics, May 2010; Optical Society of America.
Liu, M.; Yin, X.; Ulin-Avila, E.; Geng, B.; Zentgraf, T.; Ju, L.; Wang, F.; Zhang, X. Nature 2011, 474, 64.
Youngblood, N.; Anugrah, Y.; Ma, R.; Koester, S. J.; Li, M. Nano Lett. 2014, 14, 2741-2746.
Briggs, R. M.; Pryce, I. M.; Atwater, H. A. Opt. Express 2010, 18, 11192-11201.
Xiong, C.; Pernice, W. H.; Ngai, J. H.; Reiner, J. W.; Kumah, D.; Walker, F. J.; Ahn, C. H.; Tang, H. X. Nano Lett. 2014, 14, 1419-1425.
Naik, G. V.; Kim, J.; Boltasseva, A. Opt. Mater. Express 2011, 1, 1090-1099.
Naik, G. V.; Shalaev, V. M.; Boltasseva, A. Adv. Mater. 2013, 25, 3264-3294.
Ma, Z.; Li, Z.; Liu, K.; Ye, C.; Sorger, V. J. Nanophotonics 2015, 4, 198-213.
Keeler, G. A.; Geib, K. M.; Serkland, D. K.; Parameswaran, S.; Luk, T. S.; Griñe, A. J.; Ihlefeld, J.; Campione, S.; Wendt, J. R. In Optical Fiber Communication Conference, Mar. 2017; Optical Society of America.
Sorger, V. J.; Lanzillotti-Kimura, N. D.; Ma, R. M.; Zhang, X. Nanophotonics 2012, 1, 17-22.
Lee, H. W.; Papadakis, G.; Burgos, S. P.; Chander, K.; Kriesch, A.; Pala, R. A.; Peschel, U.; Atwater, H. A. Nano letters 2014, 14, 6463-6468.
Chiang, H. Q.; Wager, J. F.; Hoffman, R. L.; Jeong, J.; Keszler, D. A. Appl. Phys. Lett. 2005, 86, 013503.
Feigenbaum, E.; Diest, K.; Atwater, H. A. Nano Lett. 2010, 10, 2111-2116.
Vasudev, A. P.; Kang, J. H.; Park, J.; Liu, X.; Brongersma, M. L. Opt. Express 2013, 21, 26387-26397.
Park, J.; Kang, J. H.; Liu, X.; Brongersma, M. L. Sci. Rep. 2015, 5, srep15754.
Liberal, I.; Engheta, N. Nat. Photonics 2017, 11, 149-158.
Melikyan, A.; Lindenmann, N.; Walheim, S.; Leufke, P. M.; Ulrich, S.; Ye, J.; Vincze, P.; Hahn, H.; Schimmel, T.; Koos, C.; Freude, W. Opt. Express 2011, 19, 8855-8869.
Krasavin, A. V.; Zayats, A. V. Phys. Rev. Lett. 2012, 109, 053901.
Colinge, J. P.; Colinge, C. A. Physics of semiconductor devices; Springer Science & Business Media, 2005.
Meng, B.; Booske, J.; Cooper, R. IEEE T. Microw. Theory 1995, 43, 2633-2636.
Shi, K.; Lu, Z. Opt. Commun. 2016, 370, 22-28.
Zain, A. R. M.; Johnson, N. P.; Sorel, M.; Richard, M. Opt. Express 2008, 16, 12084-12089.
Sze, S. M.; Ng, K. K. Physics of semiconductor devices; John wiley & sons, 2006.
Yota, J.; Shen, H.; Ramanathan, R. J. Vac. Sci. Technol. A. 2013, 31, 01A134.
Schmidt, B.; Xu, Q.; Shakya, J.; Manipatruni, S.; Lipson, M. Optics Express 2007, 15, 3140-3148.
Cheng, Q., Bahadori, M., Glick, M., Rumley, S. and Bergman, K., 2018. Recent advances in optical technologies for data centers: a review.Optica,5(11), pp. 1354-1370.
Nikolova, D., Rumley, S., Calhoun, D., Li, Q., Hendry, R., Samadi, P. and Bergman, K., 2015. Scaling silicon photonic switch fabrics for data center interconnection networks.Optics express,23(2), pp. 1159-1175.
Chen, J., Gong, Y., Fiorani, M. and Aleksic, S., 2015. Optical interconnects at the top of the rack for energy-efficient data centers. IEEE Communications Magazine,53(8), pp. 140-148.
Sato, K.I., 2018. Realization and application of large-scale fast optical circuit switch for data center networking.Journal of Lightwave Technology,36(7), pp. 1411-1419.
Li, Y., Zhang, Y., Zhang, L. and Poon, A.W., 2015. Silicon and hybrid silicon photonic devices for intra-datacenter applications: state of the art and perspectives.Photonics Research,3(5), pp. B10-B27.
Thomson, D., Zilkie, A., Bowers, J.E., Komljenovic, T., Reed, G.T., Vivien, L., Marris-Morini, D., Cassan, E., Virot, L., Fédéli, J.M. and Hartmann, J.M., 2016. Roadmap on silicon photonics.Journal of Optics,18(7), p. 073003.
Komljenovic, T., Davenport, M., Hulme, J., Liu, A.Y., Santis, C.T., Spott, A., Srinivasan, S., Stanton, E.J., Zhang, C. and Bowers, J.E., 2016. Heterogeneous silicon photonic integrated circuits.Journal of Lightwave Technology,34(1), pp. 20-35.
Testa, et al. 2016. Silicon photonics iii.Topics in applied physics, pp. 421-446.
Soref, R.I.C.H.A.R.D.A. and Bennett, B.R.I.A.N.R., 1987. Electrooptical effects in silicon.IEEE journal of quantum electronics,23(1), pp. 123-129.
Soref, R.A., 1993. Silicon-based optoelectronics.Proceedings of the IEEE,81(12), pp. 1687-1706.
Soref, R., 2010. Silicon photonics: a review of recent literature. Silicon,2(1), pp. 1-6.
Bogaerts, W., De Heyn, P., Van Vaerenbergh, T., De Vos, K., Kumar Selvaraja, S., Claes, T., Dumon, P., Bienstman, P., Van Thourhout, D. and Baets, R., 2012. Silicon microring resonators.Laser & Photonics Reviews,6(1), pp. 47-73.
Marris-Morini et al., 2016, Handbook of silicon photonics. Taylor & Francis pp. 439-478.
Chen, S., Li, W., Wu, J., Jiang, Q., Tang, M., Shutts, S., Elliott, S.N., Sobiesierski, A., Seeds, A.J., Ross, I. and Smowton, P.M., 2016. Electrically pumped continuous-wave III-V quantum dot lasers on silicon.Nature Photonics,10(5),p. 307.
Hiraki, T., Aihara, T., Hasebe, K., Takeda, K., Fujii, T., Kakitsuka, T., Tsuchizawa, T., Fukuda, H. and Matsuo, S., 2017. Heterogeneously integrated III-V/Si MOS capacitor Mach-Zehnder modulator. Nature Photonics,11(8), p. 482.
Phare, C.T., Lee, Y.H.D., Cardenas, J. and Lipson, M., 2015. Graphene electro-optic modulator with 30 GHz bandwidth.Nature Photonics,9(8), p. 511.

(56) References Cited

OTHER PUBLICATIONS

Ye, S.W., Yuan, F., Zou, X.H., Shah, M.K., Lu, R.G. and Liu, Y., 2017. High-speed optical phase modulator based on graphene-silicon waveguide.IEEE Journal of Selected Topics in Quantum Electronics,23(1), pp. 76-80.
Gao, Y., Shiue, R.J., Gan, X., Li, L., Peng, C., Meric, I., Wang, L., Szep, A., Walker Jr, D., Hone, J. and Englund, D., 2015. High-speed electro-optic modulator integrated with graphene-boron nitride heterostructure and photonic crystal nanocavity.Nano letters,15(3), pp. 2001-2005.
Lin, C.Y., Wang, X., Chakravarty, S., Lee, B.S., Lai, W., Luo, J., Jen, A.K.Y. and Chen, R.T., 2010. Electro-optic polymer infiltrated silicon photonic crystal slot waveguide modulator with 23 dB slow light enhancement. Applied Physics Letters, 97(9), p. 194.
Wolf, S., Zwickel, H., Hartmann, W., Lauermann, M., Kutuvantavida, Y., Kieninger, C., Altenhain, L., Schmid, R., Luo, J., Jen, A.K.Y. and Randel, S., 2018. Silicon-organic hybrid (SOH) Mach-Zehnder modulators for 100 Gbit/s on-off keying. Scientific reports, 8(1), p. 2598.
Mercante, A.J., Yao, P., Shi, S., Schneider, G., Murakowski, J. and Prather, D.W., 2016. 110 GHz CMOS compatible thin film LiNbO3 modulator on silicon. Optics express, 24(14), pp. 15590-15595.
Chen, L., Xu, Q., Wood, M.G. and Reano, R.M., 2014. Hybrid silicon and lithium niobate electro-optical ring modulator. Optica, 1(2), pp. 112-118.
Xiong, C., Pernice, W.H., Ngai, J.H., Reiner, J.W., Kumah, D., Walker, F.J., Ahn, C.H. and Tang, H.X., 2014. Active silicon integrated nanophotonics: ferroelectric BaTiO3 devices. Nano letters, 14(3), pp. 1419-1425.
Markov, P., Appavoo, K., Haglund, R.F. and Weiss, S.M., 2015. Hybrid Si—VO 2—Au optical modulator based on near-field plasmonic coupling. Optics express, 23(5), pp. 6878-6887.
Yu, Z., Zheng, J., Xu, P., Zhang, W. and Wu, Y., 2018. Ultracompact Electro-Optical Modulator-Based Ge 2 Sb 2 Te 5 on Silicon. IEEE Photonics Technology Letters, 30(3), pp. 250-253.
Wu, C., Yu, H., Li, H., Zhang, X., Takeuchi, I. and Li, M., 2018. Low-Loss Integrated Photonic Switch Using Subwavelength Patterned Phase Change Material. ACS Photonics, 6(1), pp. 87-92.
Naik, G.V., Kim, J. and Boltasseva, A., 2011. Oxides and nitrides as alternative plasmonic materials in the optical range. Optical Materials Express, 1(6), pp. 1090-1099.
Babicheva, V.E., Boltasseva, A. and Lavrinenko, A.V., 2015. Transparent conducting oxides for electro-optical plasmonic modulators. Nanophotonics, 4(1), pp. 165-185.
Ma, Z., Li, Z., Liu, K., Ye, C. and Sorger, V.J., 2015. Indium-tin-oxide for high-performance electro-optic modulation. Nanophotonics, 4(1), pp. 198-213.
Huang, Y.W., Lee, H.W.H., Sokhoyan, R., Pala, R.A., Thyagarajan, K., Han, S., Tsai, D.P. and Atwater, H.A., 2016. Gate-tunable conducting oxide metasurfaces. Nano letters, 16(9), pp. 5319-5325.
Wood, M.G., Campione, S., Parameswaran, S., Luk, T.S., Wendt, J.R., Serkland, D.K. and Keeler, G.A., 2018. Gigahertz speed operation of epsilon-near-zero silicon photonic modulators. Optica, 5(3), pp. 233-236.
Hoshino, K., Hong, D., Chiang, H.Q. and Wager, J.F., 2009. Constant-voltage-bias stress testing of a-IGZO thin-film transistors. IEEE Transactions on Electron Devices, 56(7), pp. 1365-1370.
Hoffman, R.L., Norris, B.J. and Wager, J.F., 2003. ZnO-based transparent thin-film transistors. Applied Physics Letters, 82(5), pp. 733-735.
Ellmer, K., 2012. Past achievements and future challenges in the development of optically transparent electrodes. Nature Photonics, 6(12), p. 809.
Xu, Q., Manipatruni, S., Schmidt, B., Shakya, J. and Lipson, M., 2007. 12.5 Gbit/s carrier-injection-based silicon micro-ring silicon modulators. Optics express, 15(2), pp. 430-436.
Li, C., Zhou, L. and Poon, A.W., 2007. Silicon microring carrier-injection-based modulators/switches with tunable extinction ratios and OR-logic switching by using waveguide cross-coupling. Optics express, 15(8), pp. 5069-5076.
Liu, A., Liao, L., Rubin, D., Nguyen, H., Ciftcioglu, B., Chetrit, Y., Izhaky, N. and Paniccia, M., 2007. High-speed optical modulation based on carrier depletion in a silicon waveguide. Optics Express, 15(2), pp. 660-668.
Watts, M.R., Zortman, W.A., Trotter, D.C., Young, R.W. and Lentine, A.L., 2010. Low-voltage, compact, depletion-mode, silicon Mach-Zehnder modulator. IEEE Journal of Selected Topics in Quantum Electronics, 16(1), pp. 159-164.
Liu, A., Jones, R., Liao, L., Samara-Rubio, D., Rubin, D., Cohen, O., Nicolaescu, R. and Paniccia, M., 2004. A high-speed silicon optical modulator based on a metal-oxide-semiconductor capacitor. Nature, 427(6975), p. 615.
Van Campenhout, J., Pantouvaki, M., Verheyen, P., Selvaraja, S., Lepage, G., Yu, H., Lee, W., Wouters, J., Goossens, D., Moelants, M. and Bogaerts, W., Mar. 2012, Low-voltage, low-loss, multi-Gb/s silicon micro-ring modulator based on a MOS capacitor. In Optical Fiber Communication Conference and Exposition (OFC/NFOEC), 2012 and the National Fiber Optic Engineers Conference (pp. 1-3). IEEE.
Liao, L., Samara-Rubio, D., Morse, M., Liu, A., Hodge, D., Rubin, D., Keil, U.D. and Franck, T., 2005. High speed silicon Mach-Zehnder modulator. Optics Express, 13(8), pp. 3129-3135.
Liu, M., Yin, X., Ulin-Avila, E., Geng, B., Zentgraf, T., Ju, L., Wang, F. and Zhang, X., 2011. A graphene-based broadband optical modulator. Nature, 474(7349), p. 64.
Youngblood, N., Anugrah, Y., Ma, R., Koester, S.J. and Li, M., 2014. Multifunctional graphene optical modulator and photodetector integrated on silicon waveguides. Nano letters, 14(5), pp. 2741-2746.
Briggs, R.M., Pryce, I.M. and Atwater, H.A., 2010. Compact silicon photonic waveguide modulator based on the vanadium dioxide metal-insulator phase transition. Optics express, 18(11), pp. 11192-11201.
Naik, G.V., Shalaev, V.M. and Boltasseva, A., 2013. Alternative plasmonic materials: beyond gold and silver. Advanced Materials, 25(24), pp. 3264-3294.
Lee, H.W., Papadakis, G., Burgos, S.P., Chander, K., Kriesch, A., Pala, R., Peschel, U. and Atwater, H.A., 2014. Nanoscale conducting oxide PlasMOStor. Nano letters, 14(11), pp. 6463-6468.
Chiang, H.Q., Wager, J.F., Hoffman, R.L., Jeong, J. and Keszler, D.A., 2005. High mobility transparent thin-film transistors with amorphous zinc tin oxide channel layer. Applied Physics Letters, 86(1), p. 013503.
Feigenbaum, E., Diest, K. and Atwater, H.A., 2010. Unity-order index change in transparent conducting oxides at visible frequencies. Nano letters, 10(6), pp. 2111-2116.
Vasudev, a.p., Kang, J.H., Park, J., Liu, X. and Brongersma, M.L., 2013. Electro-optical modulation of a silicon waveguide with an "epsilon-near-zero" material. Optics express, 21(22), pp. 26387-26397.
Lu, Z., Zhao, W. and Shi, K., 2012. Ultracompact electroabsorption modulators based on tunable epsilon-near-zero-slot waveguides. IEEE Photonics Journal, 4(3), pp. 735-740.
Mondon, F. and Blonkowski, S., 2003. Electrical characterisation and reliability of HfO2 and Al2O3—HfO2 MIM capacitors. Microelectronics Reliability, 43(8), pp. 1259-1266.
Huang, T.C., Li, C., Wu, R., Chen, C.H., Fiorentino, M., Cheng, K.T., Palermo, S. and Beausoleil, R., Aug. 2015, DWDM nanophotonic interconnects: toward terabit/s chip-scale serial link. In Circuits and Systems (MWSCAS), 2015 IEEE 58th International Midwest Symposium on (pp. 1-4). IEEE.
G. Li, X. Zheng, J. Yao, H. Thacker, I. Shubin, Y. Luo, K. Raj, J. E. Cunningham, and A. V. Krishnamoorthy, "25Gb/s 1V-driving CMOS ring modulator with integrated thermal tuning," Opt. Express 19, 20435 (2011).
P. Dong, S. Liao, D. Feng, H. Liang, D. Zheng, R. Shafiiha, C.-C. Kung, W. Qian, G. Li, X. Zheng, A. V. Krishnamoorthy, and M. Asghari, "Low V ultralow-energy, compact, high-speed silicon electro-optic modulator," Opt. Express 17, 22484 (2009).
O. Dubray, S. Menezo, B. Blampey, P. Le Maitre, J. F. Carpentier, B. Ben Bakir, M. Fournier, and S. Messaoudene, "20Gb/s PAM-4 Transmission from 35 to 90° C. by modulating a Silicon Ring

(56) References Cited

OTHER PUBLICATIONS

Resonator Modulator with 2Vpp," in Optical Fiber Communication Conference (OSA, 2015), p. W2A.31.

R. Dubé-Demers, S. LaRochelle, and W. Shi, "Ultrafast pulse-amplitude modulation with a femtojoule silicon photonic modulator," Optica (2016).

J. F. Buckwalter, X. Zheng, G. Li, K. Raj, and A. V. Krishnamoorthy, "A Monolithic 25-Gb/s Transceiver With Photonic Ring Modulators and Ge Detectors in a 130-nm CMOS SOI Process," IEEE J. Solid-State Circuits 47, 1309-1322 (2012).

O. Dubray, M. A. Seyedi, C. H. Chen, B. Charbonnier, A. Descos, M. Fiorentino, R. G. Beausoleil, and S. Menezo, "30Gbit/s PAM-4 transmission by modulating a dual silicon ring resonator modulator," in 2016 IEEE Optical Interconnects Conference (OI) (IEEE, 2016), pp. 6-7.

X. Xiao, H. Xu, X. Li, Y. Hu, K. Xiong, Z. Li, T. Chu, Y. Yu, and J. Yu, "25 Gbit/s silicon microring modulator based on misalignment-tolerant interleaved PN junctions," Opt. Express 20, 2507 (2012).

Z. Yong, W. D. Sacher, Y. Huang, J. C. Mikkelsen, Y. Yang, X. Luo, P. Dumais, D. Goodwill, H. Bahrami, P. G.-Q. Lo, E. Bernier, and J. K. S. Poon, "U-shaped Pn junctions for efficient silicon Mach-Zehnder and microring modulators in the O-band," Opt. Express 25, 8425 (2017).

S. Manipatruni, R. K. Dokania, B. Schmidt, N. Sherwood-Droz, C. B. Poitras, A. B. Apsel, and M. Lipson, "Wide temperature range operation of micrometer-scale silicon electro-optic modulators," Opt. Lett. 33, 2185 (2008).

K. Padmaraju, D. F. Logan, X. Zhu, J. J. Ackert, A. P. Knights, and K. Bergman, "Integrated thermal stabilization of a microring modulator," Opt. Express 21, 14342 (2013).

F. Gan, T. Barwicz, M. A. Popovic, M. S. Dahlem, C. W. Holzwarth, P. T. Rakich, H. I. Smith, E. P. Ippen, and F. X. Kartner, "Maximizing the Thermo-Optic Tuning Range of Silicon Photonic Structures," in 2007 Photonics in Switching (IEEE, 2007), pp. 67-68.

Timurdogan, E., Sorace-Agaskar, C.M., Sun, J., Hosseini, E.S., Biberman, A. and Watts, M.R., 2014. An ultralow power athermal silicon modulator. Nature communications, 5, p. 4008.

Ying, Z., Wang, Z., Zhao, Z., Dhar, S., Pan, D.Z., Soref, R. and Chen, R.T., 2018. Comparison of microrings and microdisks for high-speed optical modulation in silicon photonics. Applied Physics Letters, 112(11), p. 111108.

Dubé-Demers, R., St-Yves, J., Bois, A., Zhong, Q., Caverley, M., Wang, Y., Chrostowski, L., LaRochelle, S., Plant, D.V. and Shi, W., 2015. Analytical modeling of silicon microring and microdisk modulators with electrical and optical dynamics. Journal of Lightwave Technology, 33(20), pp. 4240-4252.

E. Li, Q. Gao, R. T. Chen, and A. X. Wang, "Ultracompact Silicon-Conductive Oxide Nanocavity Modulator with 0.02 Lambda-Cubic Active Volume," Nano Lett. 18, (2018).

S. Campione, M. G. Wood, D. K. Serkland, S. Parameswaran, J. Ihlefeld, T. S. Luk, J. R. Wendt, K. M. Geib, and G. A. Keeler, "Submicrometer Epsilon-Near-Zero Electroabsorption Modulators Enabled by High-Mobility Cadmium Oxide," IEEE Photonics J. 9, 1-7 (2017).

D. Liang, G. Kurczveil, M. Fiorentino, S. Srinivasan, J. E. Bowers, and R. G. Beausoleil, "A Tunable Hybrid III-V-on-Si MOS Microring Resonator with Negligible Tuning Power Consumption," in Optical Fiber Communication Conference (OSA, 2016), p. Th1K.4.

Wang, X., Liu, J., Yan, Q., Chen, S. and Yu, J., 2003. SOI thermo-optic modulator with fast response. Chinese Optics Letters, 1(9), pp. 527-528.

Wang, X., Lin, C.Y., Chakravarty, S., Luo, J., Jen, A.K.Y. and Chen, R.T., 2011. Effective in-device r33 of 735 pm/V on electro-optic polymer infiltrated silicon photonic crystal slot waveguides. Optics letters, 36(6), pp. 882-884.

Lai, W.C., Chakravarty, S., Wang, X., Lin, C. and Chen, R.T., 2011. Photonic crystal slot waveguide absorption spectrometer for on-chip near-infrared spectroscopy of xylene in water. Applied Physics Letters, 98(2), p. 7.

Lai, W.C., Chakravarty, S., Wang, X., Lin, C. and Chen, R.T., 2011. On-chip methane sensing by near-IR absorption signatures in a photonic crystal slot waveguide. Optics letters, 36(6), pp. 984-986.

Lin, C.Y., Wang, X., Chakravarty, S., Lee, B.S., Lai, W.C. and Chen, R.T., 2010. Wideband group velocity independent coupling into slow light silicon photonic crystal waveguide. Applied Physics Letters, 97(18), p. 233.

Ren, F., Li, M., Gao, Q., Cowell III, W., Luo, J., Jen, A.K. and Wang, A.X., 2015. Surface-normal plasmonic modulator using sub-wavelength metal grating on electro-optic polymer thin film. Optics Communications, 352, pp. 116-120.

Wang, L., Wang, X., Jiang, W., Choi, J., Bi, H. and Chen, R., 2005. 45 polymer-based total internal reflection coupling mirrors for fully embedded intraboard guided wave optical interconnects. Applied Physics Letters, 87(14), p. 141110.

Dou, X., Wang, X., Huang, H., Lin, X., Ding, D., Pan, D.Z. and Chen, R.T., 2010. Polymeric waveguides with embedded micromirrors formed by Metallic Hard Mold. Optics express, 18(1), pp. 378-385.

Wang, X., Jiang, W., Wang, L., Bi, H. and Chen, R.T., 2008. Fully embedded board-level optical interconnects from waveguide fabrication to device integration. Journal of Lightwave Technology, 26(2), pp. 243-250.

Li, E., Gao, Q., Liverman, S. and Wang, A.X., 2018. One-volt silicon photonic crystal nanocavity modulator with indium oxide gate. Optics letters, 43(18), pp. 4429-4432.

E. Li, B. Ashrafi Nia, B. Zhou, A. X. Wang, "Transparent Conductive Oxide-Gated Silicon Microring with Extreme Resonance Wavelength Tunability," Photonics Research, Jan. 2019.

Gao, Q., Li, E. and Wang, A.X., 2018. Ultra-compact and broadband electro-absorption modulator using an epsilon-near-zero conductive oxide. Photonics Research, 6(4), pp. 277-281.

Gao, Q., Li, E. and Wang, A.X., 2018. Comparative analysis of transparent conductive oxide electro-absorption modulators. Optical Materials Express, 8(9), pp. 2850-2862.

Hänsch W, Vogelsang T, Kircher R and Orlowski M 1989 Carrier transport near the Si/SiO2 interface of a MOSFET Solid-State Electronics 32(10) 839-49.

Wettstein A, Schenk A and Fichtner W 2001 Quantum device-simulation with the density-gradient model on unstructured grids IEEE Transactions on Electron Devices 48(2) 279-84.

Bock, P.J., Cheben, P., Schmid, J.H., Lapointe, J., Delage, A., Janz, S., Aers, G.C., Xu, D.X., Densmore, A. and Hall, T.J., 2010. Subwavelength grating periodic structures in silicon-on-insulator: a new type of microphotonic waveguide. Optics express, 18(19), pp. 20251-20262.chong.

Donzella, V., Sherwali, A., Flueckiger, J., Grist, S.M., Fard, S.T. and Chrostowski, L., 2015. Design and fabrication of SOI micro-ring resonators based on sub-wavelength grating waveguides. Optics express, 23(4), pp. 4791-4803.

Wang, Z., Xu, X., Fan, D., Wang, Y. and Chen, R.T., 2016. High quality factor subwavelength grating waveguide micro-ring resonator based on trapezoidal silicon pillars. Optics letters, 41(14), pp. 3375-3378.

Yan, H., Huang, L., Xu, X., Chakravarly, S., Tang, N., Tian, H. and Chen, R.T., 2016. Unique surface sensing property and enhanced sensitivity in microring resonator biosensors based on subwavelength grating waveguides. Optics express, 24(26), pp. 29724-29733.

Pan, Z., Xu, X., Chung, C.J., Dalir, H., Yan, H., Chen, K., Wang, Y., Jia, B. and Chen, R.T., 2018. High☐Speed Modulator Based on Electro☐Optic Polymer Infiltrated Subwavelength Grating Waveguide Ring Resonator. Laser & Photonics Reviews, 12(6), p. 1700300.

Choi, C.H., David, M., Gao, Z., Chang, A., Allen, M., Wang, H. and Chang, C.H., 2016. Large-scale generation of patterned bubble arrays on printed bi-functional boiling surfaces. Scientific reports, 6, p. 23760.

MacNeill, W., Choi, C.H., Chang, C.H. and Malhotra, R., 2015. On the self-damping nature of densification in photonic sintering of nanoparticles. Scientific reports, 5, p. 14845.

(56) References Cited

OTHER PUBLICATIONS

Choi, C.H., Levin, J.B. and Chang, C.H., 2016. Continuous formation of a seed layer and vertical ZnO nanowire arrays enabled by tailored reaction kinetics in a microreactor. CrystEngComm, 18(44), pp. 8645-8652.

Li, E., Chong, X., Ren, F. and Wang, A.X., 2016. Broadband on-chip near-infrared spectroscopy based on a plasmonic grating filter array. Optics letters, 41(9), pp. 1913-1916.

Albuquerque, G.H. and Herman, G.S., 2016. Chemically modulated microwave-assisted synthesis of MOF-74 (Ni) and preparation of metal-organic framework-matrix based membranes for removal of metal ions from aqueous media. Crystal Growth & Design, 17(1), pp. 156-162.

Gao, Q., Ren, F. and Wang, A.X., 2016. Direct and efficient optical coupling into plasmonic integrated circuits from optical fibers. IEEE Photon. Technol. Lett., 28(11), pp. 1165-1168.

Bansal, S. and Malhotra, R., 2016. Nanoscale-shape-mediated coupling between temperature and densification in intense pulsed light sintering. Nanotechnology, 27(49), p. 495602.

Chong, X., Kim, K.J., Li, E., Zhang, Y., Ohodnicki, P.R., Chang, C.H. and Wang, A.X., 2016. Near-infrared absorption gas sensing with metal-organic framework on optical fibers. Sensors and Actuators B: Chemical, 232, pp. 43-51.

Chong, X., Li, E., Squire, K. and Wang, A.X., 2016. On-chip near-infrared spectroscopy of CO2 using high resolution plasmonic filter array. Applied Physics Letters, 108(22), p. 221106.

Choi, C.H., Allan-Cole, E. and Chang, C.H., 2017. Visible to infrared plasmonic absorption from silver nanostructures enabled by microreactor-assisted solution deposition. CrystEngComm, 19(9), pp. 1265-1272.

He, Y., Kim, K.J. and Chang, C.H., 2017. Continuous, size and shape-control synthesis of hollow silica nanoparticles enabled by a microreactor-assisted rapid mixing process. Nanotechnology, 28(23), p. 235602.

Kim, K.J., Pan, C., Bansal, S., Malhotra, R., Kim, D.H. and Chang, C.H., 2017. Scalably synthesized environmentally benign, aqueous-based binary nanoparticle inks for Cu 2 ZnSn (S, Se) 4 photovoltaic cells achieving over 9% efficiency. Sustainable Energy & Fuels, 1(2), pp. 267-274.

Dexter, M., Gao, Z., Bansal, S., Chang, C.H. and Malhotra, R., 2018. Temperature, Crystalline Phase and Influence of Substrate Properties in Intense Pulsed Light Sintering of Copper Sulfide Nanoparticle Thin Films. Scientific reports, 8(1), p. 2201.

Gao, Q., Liverman, S. and Wang, A.X., 2017. Design and characterization of high efficiency nanoantenna couplers with plasmonic integrated circuit. Journal of Lightwave Technology, 35(15), pp. 3182-3188.

Chong, X., Kim, K.J., Zhang, Y., Li, E., Ohodnicki, P.R., Chang, C.H. and Wang, A.X., 2017. Plasmonic nanopatch array with integrated metal-organic framework for enhanced infrared absorption gas sensing. Nanotechnology, 28(26), p. 26LT01.

Chong, X., Zhang, Y., Li, E., Kim, K.J., Ohodnicki, P.R., Chang, C.H. and Wang, A.X., 2018. Surface-Enhanced Infrared Absorption: Pushing the Frontier for On-Chip Gas Sensing. ACS sensors, 3(1), pp. 230-238.

Choi, C.H., Krishnan, S., TeGrotenhuis, W. and Chang, C.H., 2018. Capillary Rise of Nanostructured Microwicks. Micromachines, 9(4), p. 153.

Chiu, D., He, Y., Gao, Z., Remple, C. and Chang, C.H., 2018. Growth Kinetics of ZnS Thin Films from a High-Rate Chemical Bath Deposition with Trisodium-Nitrilotriacetate Complexing. ECS Journal of Solid State Science and Technology, 7(11), pp. P615-P623.

Albuquerque, G.H., Squire, K., Wang, A.X. and Herman, G.S., 2017. Continuous Synthesis of Monodisperse Ag Nanocubes. Crystal Growth & Design, 18(1), pp. 119-125.

Hwang, H.J., Devaraj, H., Yang, C., Gao, Z., Chang, C.H., Lee, H. and Malhotra, R., 2018. Rapid Pulsed Light Sintering of Silver Nanowires on Woven Polyester for personal thermal management with enhanced performance, durability and cost-effectiveness. Scientific reports, 8(1), p. 17159.

Kim, K.J., Zhang, Y., Kreider, P.B., Chong, X., Wang, A.X., Ohodnicki Jr, P.R., Baltrus, J.P. and Chang, C.H., 2018. Nucleation and growth of oriented metal-organic framework thin films on thermal SiO2 surface. Thin Solid Films, 659, pp. 24-35.

Dexter, M., Pfau, A., Gao, Z., Herman, G.S., Chang, C.H. and Malhotra, R., 2018. Modeling nanoscale temperature gradients and conductivity evolution in pulsed light sintering of silver nanowire networks. Nanotechnology, 29(50), p. 505205.

Nguyen-Huu, D. and Nguyen, T., 2017. Probabilistic Models and Algorithms for Data Synchronization/Broadcast Via Network Coding. IEEE Transactions on Vehicular Technology, 66(7), pp. 6075-6088.

Nguyen-Huu, D., Duong, T. and Nguyen, T., 2017. Location-assisted coding for FSO communication. IEEE Transactions on Communications, 65(10), pp. 4360-4370.

Liverman, S., Wang, Q., Chu, Y.J., Borah, A., Wang, S., Natarajan, A., Wang, A.X. and Nguyen, T., 2018. WiFO: A hybrid communication network based on integrated free-space optical and WiFi femtocells. Computer Communications, 132, pp. 74-83.

Liverman, S., Wang, Q., Chu, Y., Duong, T., Nguyen-Huu, D., Wang, S., Nguyen, T. and Wang, A.X., Feb. 2016, Integrating free-space optical communication links with existing WiFi (WiFO) network. In Broadband Access Communication Technologies X (vol. 9772, p. 97720P). International Society for Optics and Photonics.

Liverman, S.T., Wang, Q., Chu, Y.J., Natarajan, A., Nguyen, T. and Wang, A.X., Oct. 2016, Hybrid wireless communication networks: Integrating free-space optics and wifi. In Frontiers in Optics (pp. JTh2A-56). Optical Society of America.

Nguyen, T. and Nguyen, T., Sep. 2017, Embedded Coding Techniques for FSO Communication. In 2017 IEEE 86th Vehicular Technology Conference (VTC-Fall) (pp. 1-5). IEEE.

Duong, T., Nguyen-Huu, D. and Nguyen, T., Nov. 2015, Location assisted coding (lac): Embracing interference in free space optical communications. In Proceedings of the 11th ACM Symposium on QoS and Security for Wireless and Mobile Networks (pp. 107-114). ACM.

Chu, Y.J., Nguyen, T. and Stark, Z.N., Aug. 2016, Wifo: Hybrid wifi and free-space optical communication system with pam optimal decoding. In 2016 25th International Conference on Computer Communication and Networks (ICCCN) (pp. 1-6). IEEE.

Wang, Q., Liverman, S., Chu, Y.J., Borah, A., Wang, S., Nguyen, T., Natarajan, A. and Wang, A.X., Nov. 2017, WiFO: A Hybrid WiFi Free-Space Optical Communication Networks of Femtocells. In Proceedings of the 20th ACM International Conference on Modelling, Analysis and Simulation of Wireless and Mobile Systems (pp. 35-42). ACM.

Zhang, Y., Chu, Y.J. and Nguyen, T., Jul. 2017, Coverage Algorithms for WiFO: A Hybrid FSO-WiFi Femtocell Communication System. In 2017 26th International Conference on Computer Communication and Networks (ICCCN) (pp. 1-6). IEEE.

Liverman, S., Wang, Q., Chu, Y.C., Borah, A., Wang, S., Natarajan, A., Nguyen, T. and Wang, A.X., Jan. 2018, Indoor communications networks realized through hybrid free-space optical and wifi links. In Broadband Access Communication Technologies XII (vol. 10559, p. 105590H). International Society for Optics and Photonics.

Kong, X., Chong, X., Squire, K. and Wang, A.X., 2018. Microfluidic diatomite analytical devices for illicit drug sensing with ppb-level sensitivity. Sensors and Actuators B: Chemical, 259, pp. 587-595.

Squire, K., Kong, X., LeDuff, P., Rorrer, G.L. and Wang, A.X., 2018. Photonic crystal enhanced fluorescence immunoassay on diatom biosilica. Journal of biophotonics, 11(10), p. e201800009.

Koeber, S., Palmer, R., Lauermann, M., Heni, W., Elder, D.L., Korn, D., Woessner, M., Alloatti, L., Koenig, S., Schindler, P.C. and Yu, H., 2015. Femtojoule electro-optic modulation using a silicon-organic hybrid device. Light: Science & Applications, 4(2), p. e255.

* cited by examiner

PHOTOLITHGRAPHY, RIE Si FOR CONTACT ISOLATION

EBL FOLLOWED BY RIE Si TO FORM THE WAVEGUIDE, PC CAVITY AND GRATING COUPLERS

DRY THERMAL OXIDATION AT 1000°C TO FORM 20nm $SiO_2$ GATE OXIDE LAYER

PHOTOLITHGRAPHY, THERMAL EVAPORATING METAL AND FOLLOWED BY LIFTOFF PROCESS TO PATTERN THE ELECTRODES

ANNEAL AT 475°C TO FORM OHMIC CONTACT AT Al/Si INTERFACE

EBL, RF SPUTTERING 20nm ITO AND FOLLOWED BY LIFTOFF PROCESS TO FOR ITO/SiO2/Si MOS STRUCTURE

NANO-CAVITY MODULATOR DEVICE AND METHOD OF MANUFACTURE AND USE

RELATED APPLICATIONS

This application claims the benefit of priority of U.S. Provisional Application No. 62/615,813, filed on Jan. 10, 2018, the entire contents of which application is incorporated herein by reference.

GOVERNMENT LICENSE RIGHTS

This invention was made with government support under Award No. FA9550-17-1-0071 awarded by the Air Force Office of Scientific Research. The government has certain rights in the invention.

FIELD OF THE INVENTION

The present invention relates generally to electro-optic modulators, and more particularly, but not exclusively, to ones which include an integrated voltage-switched transparent conductive oxide capacitor with one-dimensional silicon photonic crystal nano-cavity to provide an ultra-compact (e.g., 0.6×8 µm$^2$ device footprint) and energy efficient (e.g., 46 fJ/bit) modulator.

BACKGROUND OF THE INVENTION

The ever-increasing demand to process, store, and exchange information creates an unceasing driving force for high bandwidth, energy-efficient photonic technologies. In recent years, the need to develop photonic devices with extremely high energy efficiency to atto-joule/bit has been recognized. Silicon photonics has the potential to transform future optical interconnect systems by reducing the energy consumption and enhancing the bandwidth of existing electronic systems by orders of magnitude using Complementary Metal-Oxide-Semiconductor (CMOS) compatible fabrication processes. In addition to the application to optical interconnects, silicon photonic devices can also operate logic gates to conduct certain types of optical computation. However, the performance of silicon photonic devices is still limited by the diffraction limit and the relatively weak plasma dispersion effect. Although silicon has a relatively high refractive index, it can only shrink the wavelength inside the silicon waveguide proportionally to the scale of $\lambda/n$, roughly to 400~600 nm. Further reduction of the device footprint requires exploiting surface plasmon polaritons, which are bound waves at the interface between a metal and a dielectric. The extremely strong light confinement of metal-insulator-metal waveguides has led to the demonstration of ultra-compact and high bandwidth plasmonic electro-optic (E-O) modulators. However, plasmonic structures and devices are very lossy and can only carry information over a very short distance, and hybrid plasmonic-dielectric waveguide integration must be used for real optical interconnects, which increases the complexity of design and fabrication.

A further constraint of silicon photonic devices is that the plasma dispersion effect induced by free carrier injection or depletion can only induce moderate refractive index perturbation. For example, for a typical depletion-based silicon photonic modulator with a moderate doping level of 2.5×10$^{18}$ cm$^{-3}$ in its active region, when completely depleted, the refractive index only changes by 0.06%. As a result, current Mach-Zehnder interferometer (MZI) silicon modulators require a long device length up to hundreds of micrometers to several millimeters to accumulate sufficient phase modulation. The large device footprint also leads to a large energy consumption of pico-joule/bit, which cannot meet the requirement of future photonic interconnects application. Compared with MZI modulators, resonator-based E-O modulators occupy a much smaller footprint and achieve significantly higher energy efficiency. To date, various ultracompact silicon micro-ring resonators, micro-disk resonators and photonic crystal nano-cavities have been used in optical interconnect systems, achieving high performance in modulation speed, compactness, and energy efficiency. However, resonator-based modulators have an intrinsic trade-off between energy efficiency and optical bandwidth. For practical devices, thermal control with integrated heaters and temperature sensors are often used to obtain stable performance, but with the sacrifice of additional energy consumption and footprint.

In addition, existing transparent conductive oxide-based E-O modulators based on straight silicon waveguide or plasmonic slot waveguide use electrically-induced optical absorption from the integrated MOS capacitor. The phase change induced by the real part of the permittivity of transparent conductive oxide materials, although accompanied by the imaginary part of the index change, does not contribute to any E-O modulation. Therefore, a relatively long modulation length (a few microns) is required to induce sufficient optical absorption. Moreover, these modulators require the presence of metal gates for strong plasmonic light confinement and electronic signal conductance, which introduces relatively high optical loss even at the transparent state.

Accordingly, there is a need in the art for E-O modulators which are energy efficient and have increased bandwidth while occupying a smaller footprint.

SUMMARY OF THE INVENTION

In one of its aspects the present invention may provide an ultra-compact and energy efficient nano-cavity electro-optic (E-O) modulator which includes a metal-oxide semiconductor-type (MOS-type) capacitor at the location of a photonic crystal (PC) nano-cavity on a silicon strip waveguide. The strip waveguide may be fabricated on a p-type silicon-on-insulator (SOI) substrate. Two photonic crystal mirror segments may be placed back-to-back about the PC nano-cavity. The air hole size of the mirror segments may be tapered down from the center of the cavity location to the respective ends of the two mirror segments. In an exemplary design, each mirror segment has multiple (>3) air holes. The filling factor, which is defined as f=A/pw, is tapered down in the center to the edge, where A is the air hole area, p is the air hole period, and w is the waveguide width. The period p may be chosen to allow the modulator to operate in the NIR to mid-IR range. (As used herein the term "light" is defined to include both the visible and non-visible portions of the electromagnetic spectrum, thus including the NIR to mid-IR range, for example.) In the center of the cavity, an ITO/SiO$_2$/Si film stack creates a MOS-type capacitor, and the silicon waveguide (Si film stack) may serve as the bottom electrode.

As used herein, the term "MOS-type capacitor" is defined to mean a capacitor having a structure similar to that of a MOS capacitor, but without the metal layer, so "MOS-type capacitors" of the present invention are metal-free in the sense that the metal of the MOS capacitor is replaced by a semiconductor, such as a metal oxide, e.g., a TCO such as ITO, for example. The term "SIS capacitor" is defined to mean a MOS-type capacitor in which the structure comprises a semiconductor-insulator-semiconductor structure, such as a TCO-oxide-silicon structure, for example. The semiconductor that replaces the metal in a MOS capacitor (e.g., TCO) may be a high-conductivity semiconductor, with a conductivity greater than 3.2e4 S/m to provide the gate. Two silicon strips or a thin layer of slab may be used to form a conduction path between the silicon waveguide and the silicon slab and contact electrodes disposed thereon. To make the SIS capacitor, a gate oxide layer ($SiO_2$, $HfO_2$, $Al_2O_3$, etc.) may be grown on top of the silicon PC nano-cavity to serve as the gate oxide. Then, a TCO layer (such as indium-tin oxide, aluminum doped zinc oxide, indium oxide, gallium oxide, or Indium gallium zinc oxide) may be sputtered on the gate oxide layer to provide a high-conductivity semiconductor gate electrode.

Hence in one exemplary configuration, the present invention may provide an electro-optic modulator comprising a semiconductor photonic crystal nano-cavity, and a semiconductor-insulator-semiconductor (SIS) capacitor disposed in contact with the nano-cavity. The SIS capacitor may include a first layer of oxide material disposed on the nano-cavity and may include a second layer of TCO material disposed on and covering the first layer of material to provide a stack of oxide material and TCO material. The first and second layers are conformally deposited on the nano-cavity with the first layer may including one or more of indium-tin oxide and $In_2O_3$ and the second layer including one or more of $SiO_2$ and $HfO_2$. The semiconductor photonic crystal nano-cavity may include a one-dimensional nano-cavity which may be provided in a waveguide made of the semiconductor material. The waveguide may include two photonic crystal mirror segments placed back-to-back with the nano-cavity disposed therebetween. A first electrode may be disposed in electrical communication with the waveguide at the location of the nano-cavity, and a second electrode may be disposed in electrical communication with the second layer. The waveguide may be a strip waveguide.

In a further exemplary configuration, the present invention may provide an electro-optic modulator comprising a semiconductor material strip waveguide. Two photonic crystal mirror segments may be placed back-to-back along the length of the waveguide to define a one-dimensional photonic crystal nano-cavity therebetween. A layer of oxide material may be conformally disposed in contact with an upper surface of the waveguide at the location of the nano-cavity, and a layer of transparent conductive oxide may be disposed in contact with the layer of oxide material.

In yet a further of its aspects the present invention may provide a method for modulating light comprising providing an electro-optic modulator having a semiconductor photonic crystal nano-cavity, and a semiconductor-insulator-semiconductor (SIS) capacitor disposed in contact with the nano-cavity; injecting light into the photonic crystal nano-cavity; and applying a time-varying voltage across the SIS capacitor to effect modulation of the light within the photonic crystal nano-cavity. The SIS capacitor may include a first layer of oxide material disposed on the nano-cavity and a second layer of TCO material disposed on and covering the first layer of material to provide a stack of oxide material and TCO material. The step of providing a time-varying voltage may include applying the voltage to the transparent conductive oxide material and the nano-cavity. In addition, the step of providing a time-varying voltage may include applying the voltage to create an epsilon-near-zero (ENZ) mode in the transparent conductive oxide material.

BRIEF DESCRIPTION OF THE DRAWINGS

The foregoing summary and the following detailed description of exemplary embodiments of the present invention may be further understood when read in conjunction with the appended drawings, in which.

DETAILED DESCRIPTION OF THE INVENTION

Figure 2A:
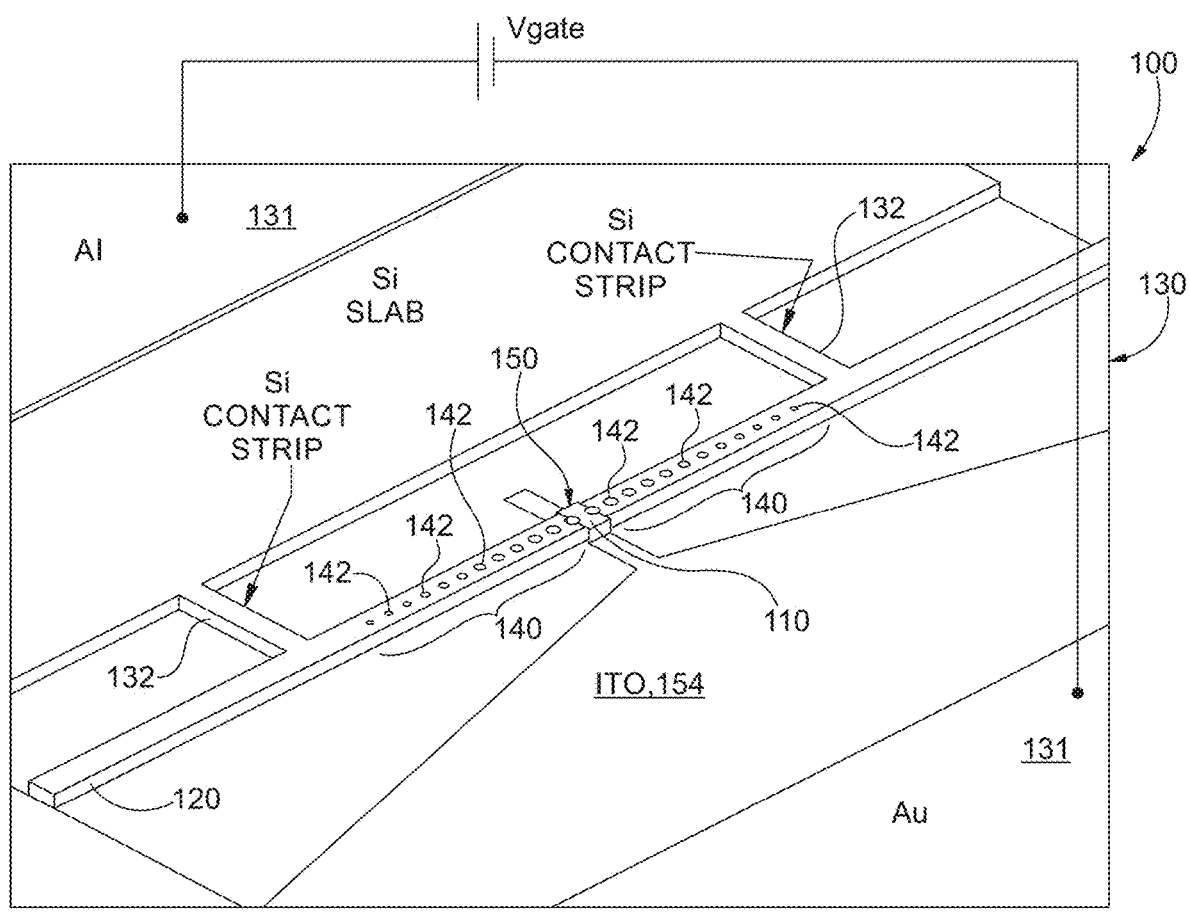
FIG. 2A schematically illustrates an isometric view of an exemplary configuration of a E-O modulator in accordance with the present invention.
Figure 2B:
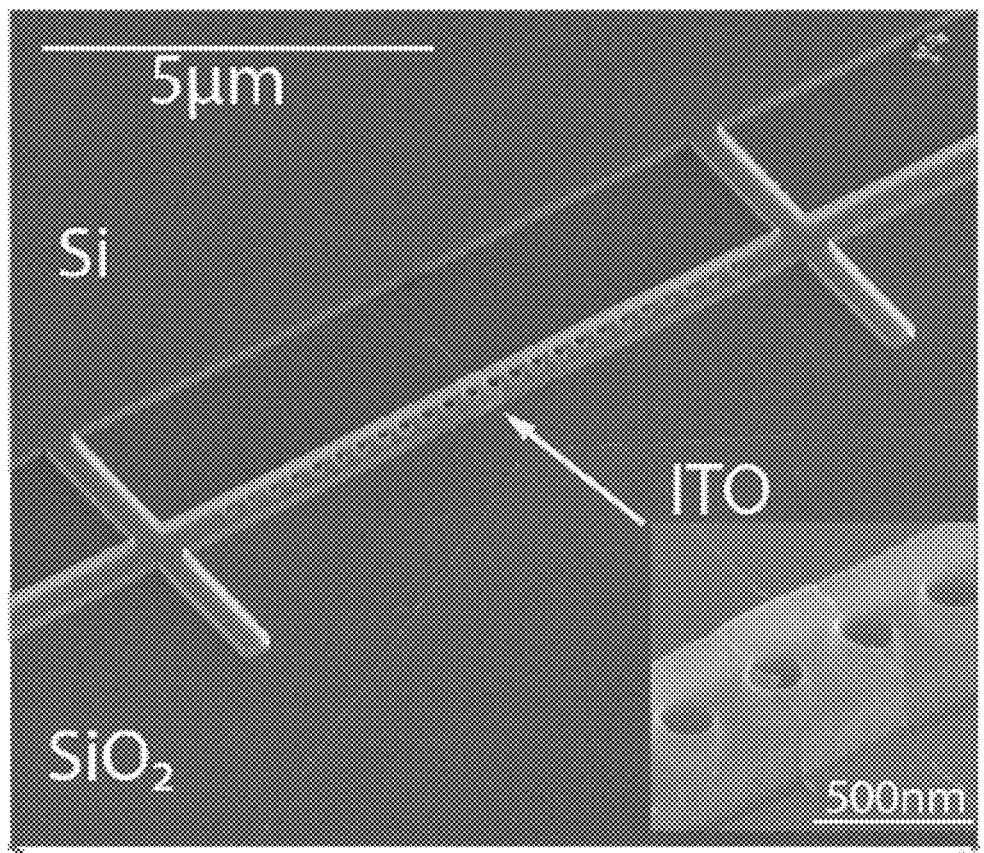
FIG. 2B illustrates a scanning electron micrograph (SEM) of a fabricated modulator in accordance with the present invention, with the inset showing an enlarged view of the center of the MOS capacitor region.
Figure 2C:
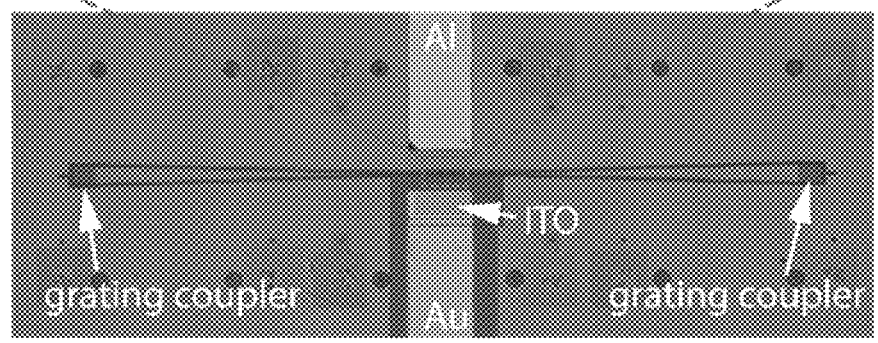
FIG. 2C illustrates an optical image of the fabricated modulator of FIG. 2B.
Figure 2D:
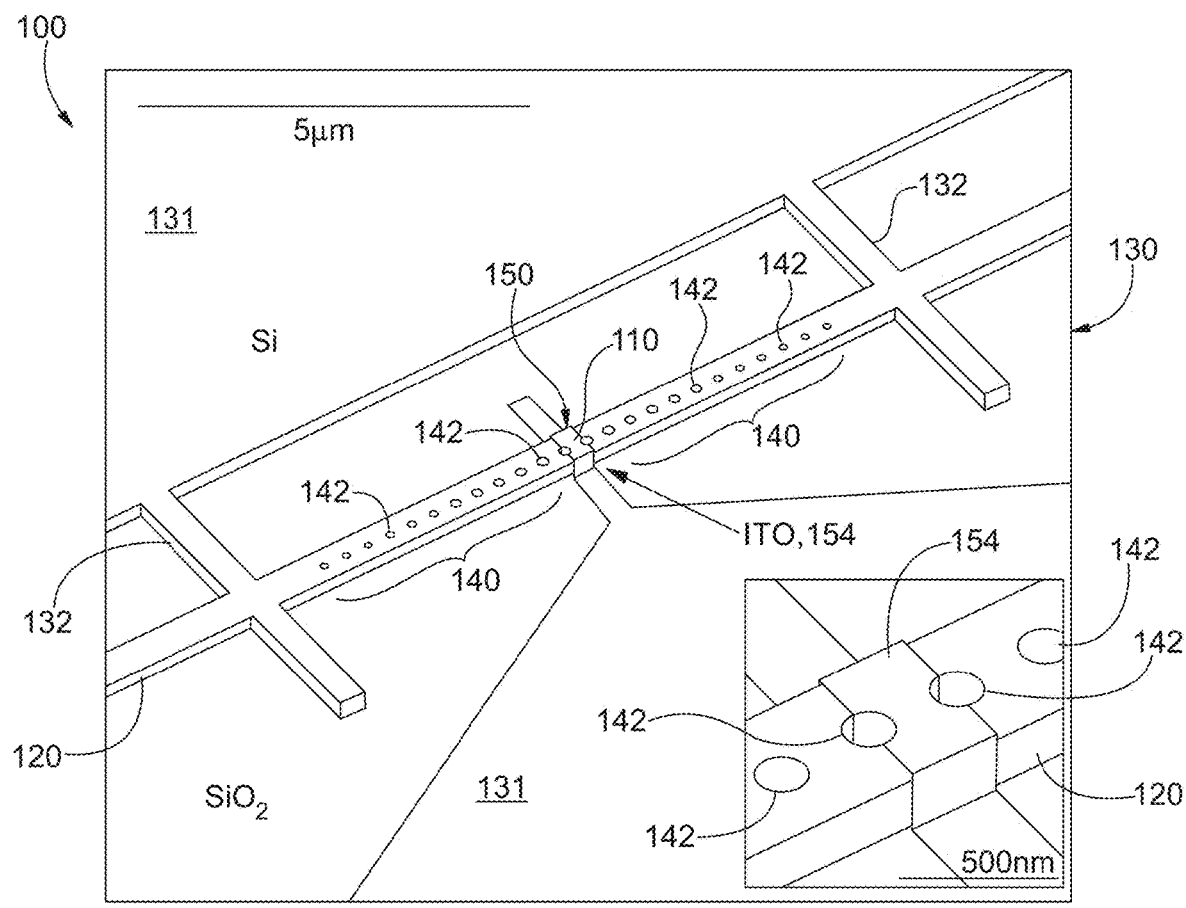
FIGS. 2D, 2E schematically illustrate line drawings of the images of FIGS. 2B, 2C, respectively.
Figure 2E:
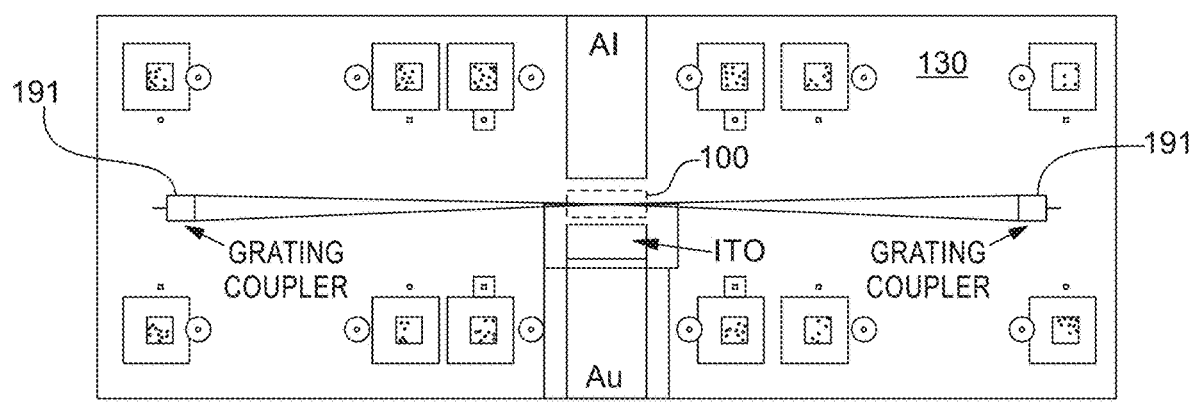
Figure 6A:
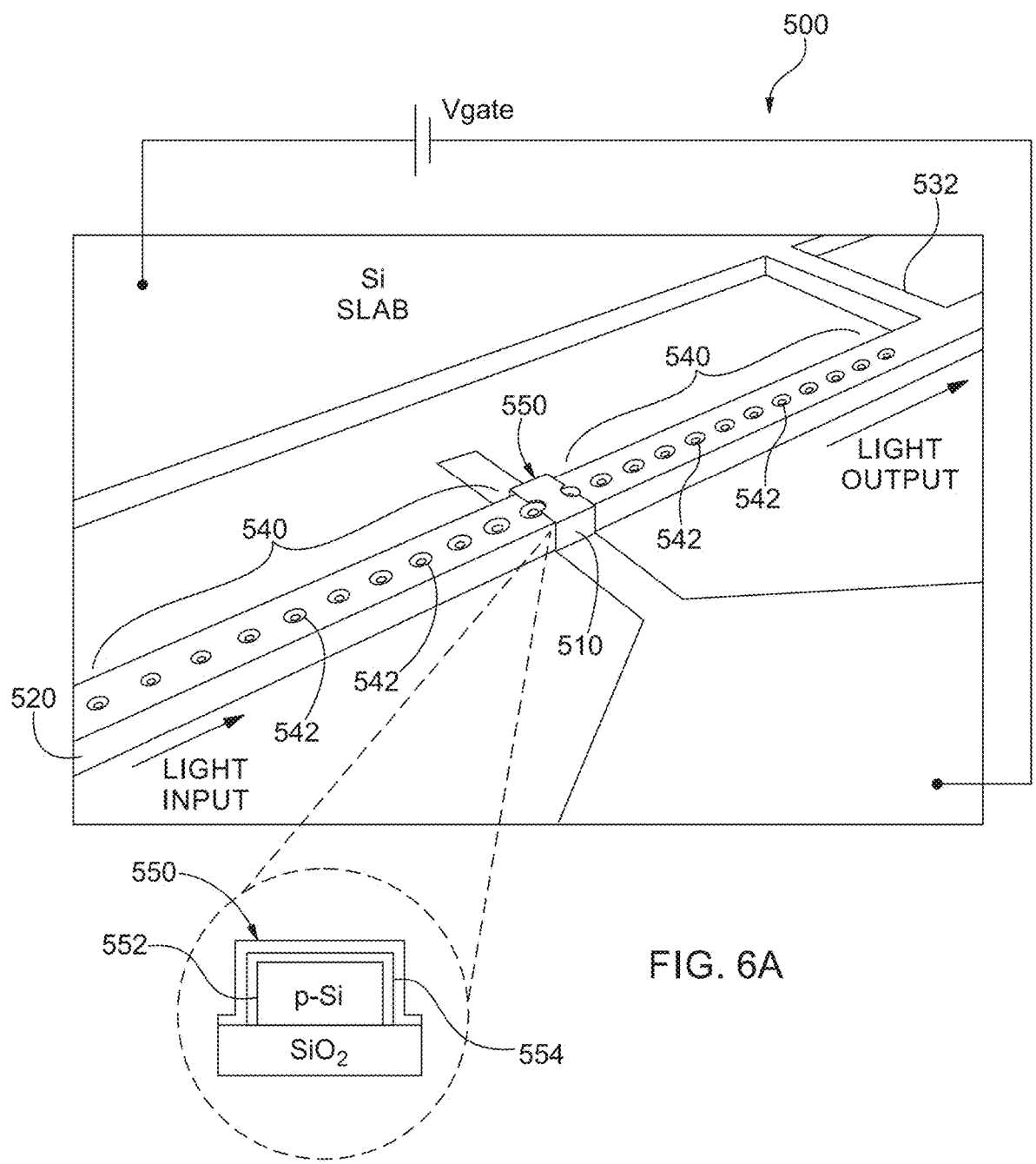
FIG. 6A schematically illustrates an isometric view of a further exemplary configuration of a photonic crystal nano-cavity modulator in accordance with the present invention, with the inset showing a cross-sectional view of the $In_2O_3$/$HfO_2$/p-Si film stack in the active region.

Referring now to the figures, wherein like elements are numbered alike throughout, in one of its aspects the present invention may provide an electro-optic (E-O) modulator 100, 500 characterized by increased energy efficiency and bandwidth while occupying a smaller footprint, FIGS. 2A, 6A. The benefits provided by E-O modulators 100, 500 of the present invention may be realized at least in part based the inclusion of a one-dimensional (1-D) semiconductor photonic crystal (PC) nano-cavity 110, 510 gated by a SIS capacitor 150, 550 disposed at the nano-cavity 110, 510. The SIS capacitor 150, 550 may comprise a plurality of layers 152, 154, 552, 554 conformally deposited on the surfaces of the nano-cavity 110, 510, with the layer 154, 554 furthest from the nano-cavity 110, 510 serving as a conductive gate electrode and the layer 152, 552 therebetween serving as the gate oxide. To achieve the desired performance, the gate material 154, 554 may include a material that can operate in the epsilon-near-zero (ENZ) mode, such as a transparent conductive oxide (TCO), e.g., indium-tin oxide (ITO) or $In_2O_3$, and the oxide layer 152, 552 may include $SiO_2$ or a high-κ dielectric material, such as $HfO_2$.

Figure 1A:
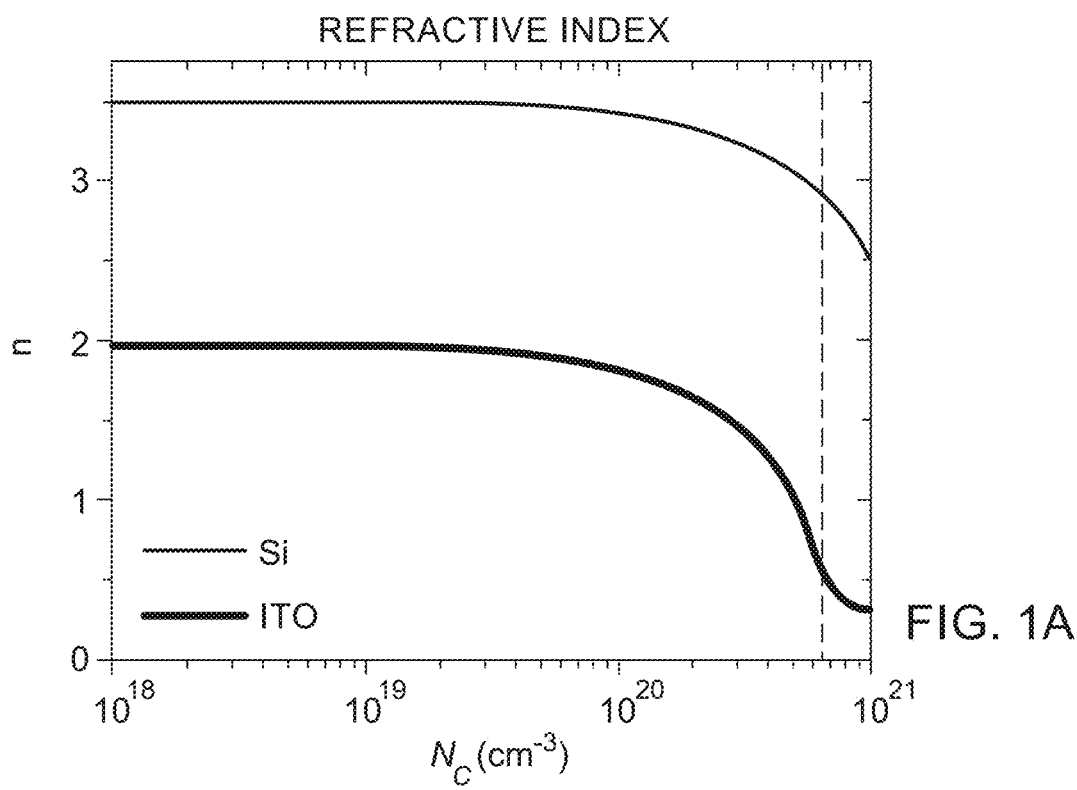
FIGS. 1A, 1B illustrate the real part (n) and imaginary part (κ), respectively, of the refractive indices of p-type Si and ITO as a function of free carrier concentration $N_c$ (hole in Si, $N_{h,Si}$, and electron in ITO, $N_{e,ITO}$) at wavelength λ=1.55 μm for devices of the present invention.
Figure 1B:
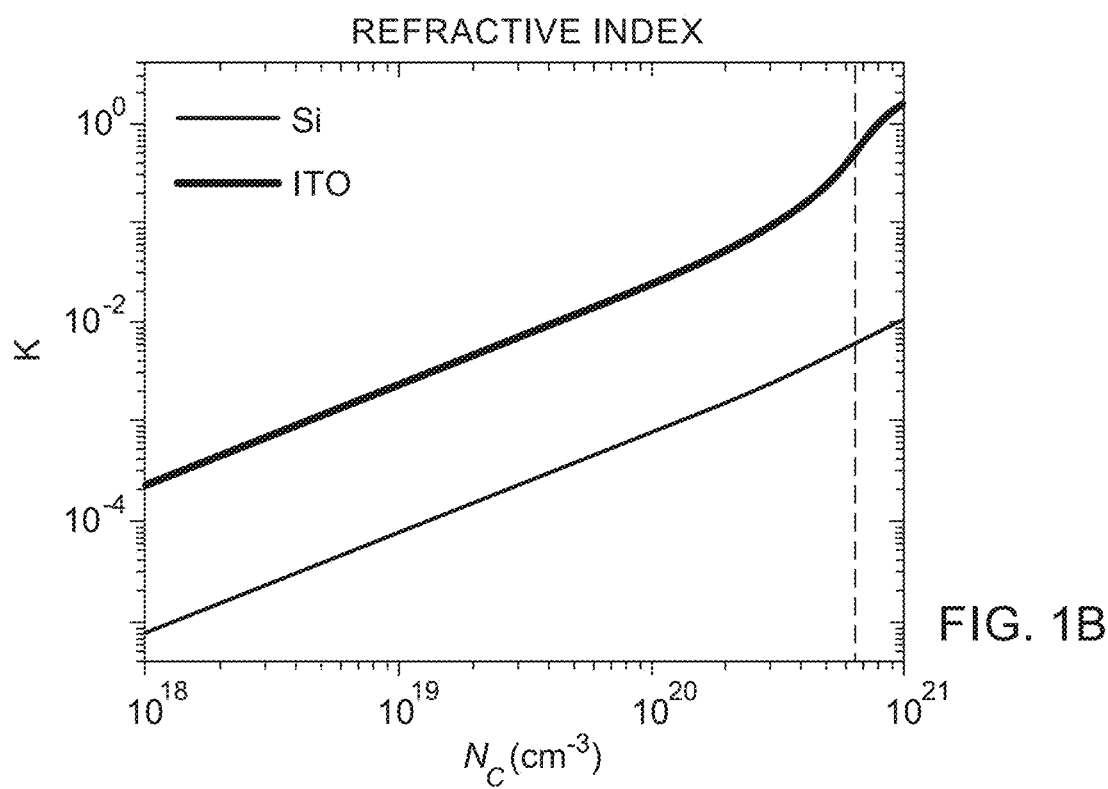
Figure 1C:
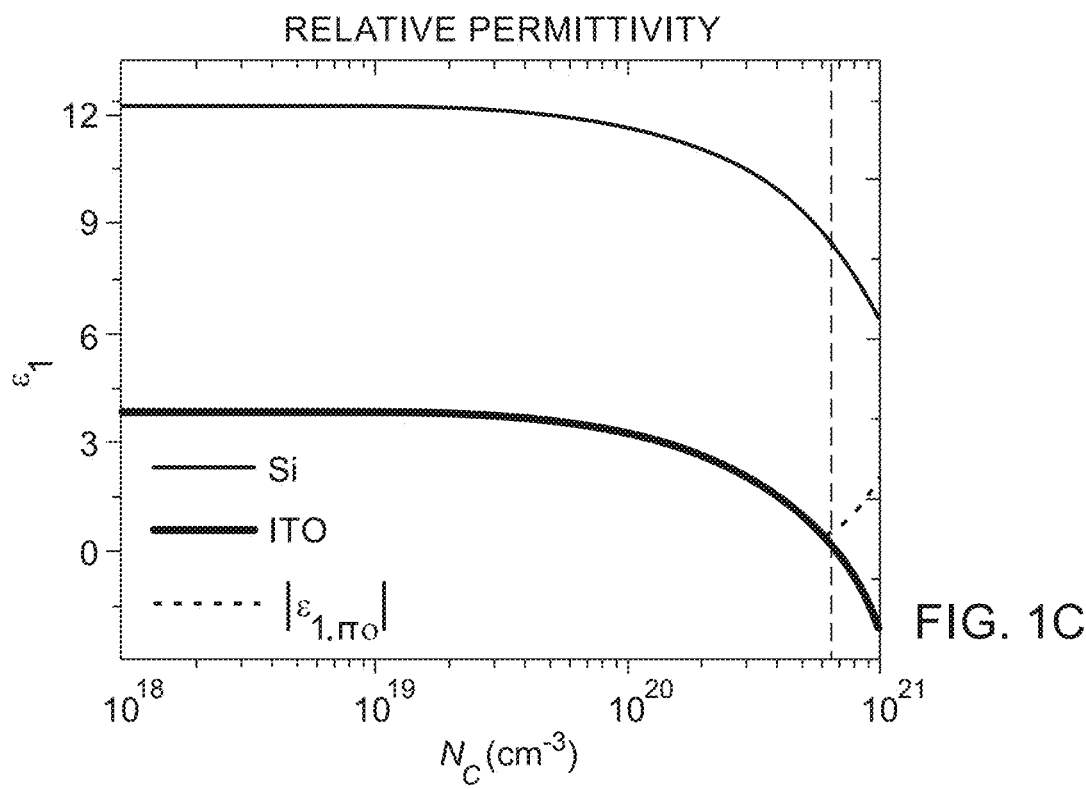
FIGS. 1C, 1D illustrate the real part ($\varepsilon_1$) and imaginary part ($\varepsilon_2$), respectively, of the relative permittivity of p-type Si and ITO as a function of $N_c$ at wavelength λ=1.55 μm, with the dashed line in FIG. 1C showing the absolute permittivity of ITO ($|\varepsilon_{r,ITO}|$), and the vertical dashed line indicating the $N_c$ where the ITO reaches an epsilon-near-zero (ENZ) mode.
Figure 1D:
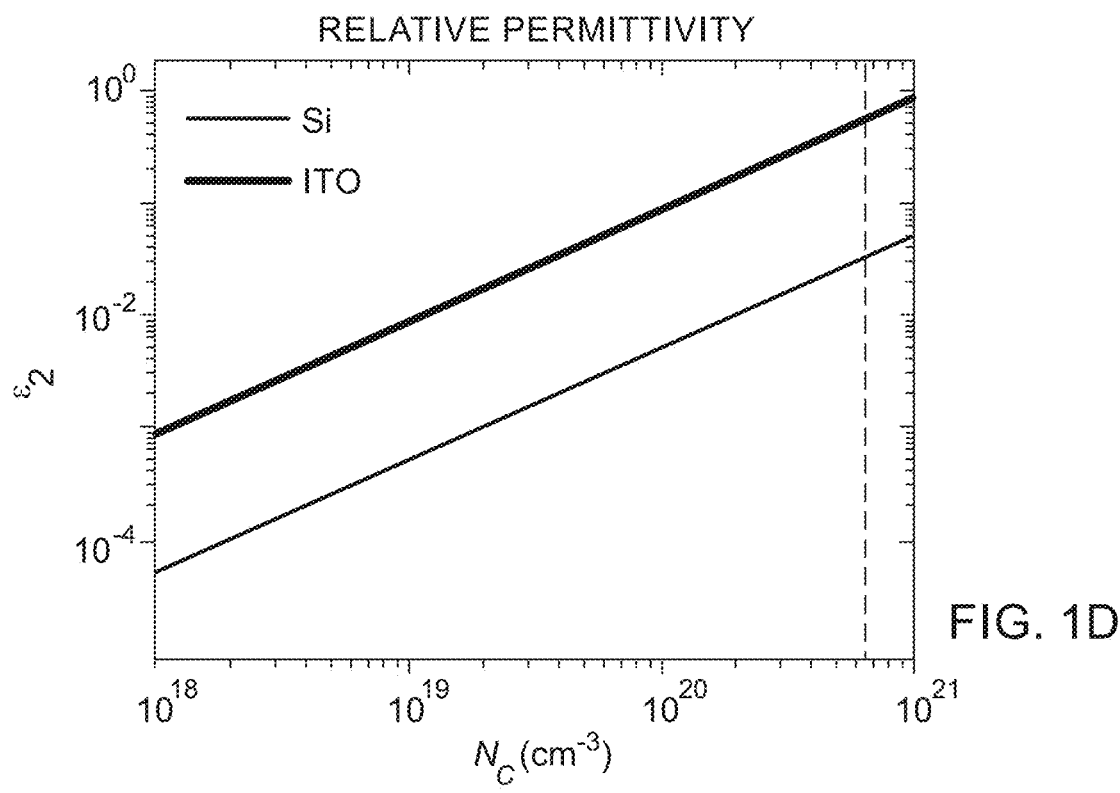

More specifically, to overcome the intrinsic drawback of the plasma dispersion effect of silicon, the present inventors have appreciated the utility of TCOs as an active material for E-O modulators based in part on the large tunability of their refractive indices. TCOs, such as indium-tin oxide and aluminum-zinc oxide (AZO), are a family of wide bandgap semiconductor oxide materials that can be degenerately doped to a high level. With free carrier concentrations ranging from $1 \times 10^{19}$ $cm^{-3}$ to $1 \times 10^{21}$ $cm^{-3}$, the real part n of the refractive index could experience more than 1 refractive index unit (RIU) change, FIG. 1A. (see supporting calculations below beginning at [0074].) At the same time, the imaginary part κ can increase to the same order of magnitude as the real part, which can cause a dramatic increase of the absorption 30-140 times larger than that of silicon, FIG. 1B. In addition, a unique property called epsilon-near-zero (ENZ) is present in TCO materials, which the instant inventors have recognized as a property that is useful in E-O modulators. At very high free carrier concentration, the real permittivity of TCOs reaches zero while the absolute permittivity has a minimum value due to the small value of the imaginary part as indicated by the vertical dotted lines in FIGS. 1C and 1D. In this situation, the electric field will be strongly confined in TCOs due to the continuity of electric field displacement at the material interface. (Silicon, however, is still far from exhibiting the ENZ property even at $10^{21}$ $cm^{-3}$ free carrier concentration due to the large value of the high frequency permittivity.)

Accordingly, in one of its aspects the present invention may provide an ultra-compact hybrid silicon-TCO nano-cavity modulator 100 to overcome the intrinsic drawbacks of straight waveguide modulators, FIGS. 2A-2E. Two particular advantages may be provided by devices of the present invention as compared with existing modulators. First, the active region of a plasmonic E-O modulator 100 of the present invention may be free of metal. In one exemplary configuration, an ITO gate is provided, rather than a metal gate, which ITO gate induces much smaller optical absorption compared to metal-gated modulators. A SIS (ITO-Oxide-Si) capacitor 150 of the present invention offers the possibility to build a relatively high Q-factor resonator while traditional devices cannot. Second, in the nano-cavity E-O modulator 100 of the present invention, both the phase change and the absorption, from both the Si and ITO materials, contribute coherently to E-O modulation. Further, the total device footprint of an exemplary configuration of an E-O modulator 100 of the present invention may be only 0.6×8 µm² using a one-dimensional (1-D) photonic crystal (PC) nano-cavity with 20 nm $SiO_2$ as the insulator and 20 nm ITO as the gate. The E-O modulation volume may be less than 0.06 µm³ (width×height×length=0.56 µm×0.28 µm×0.375 µm), namely only 2% of lambda-cubic (0.02$\lambda^3$) volume. The E-O modulation volume may be a most critical device metric affecting the energy efficiency of an E-O modulator, which is usually achieved by compact resonant cavities or plasmonic structures. E-O modulators 100 of the present invention combine the advantages of ultra-compact resonators and TCO plasmonics, which further reduces the active E-O modulation volume by 10-fold.

Figure 3A:
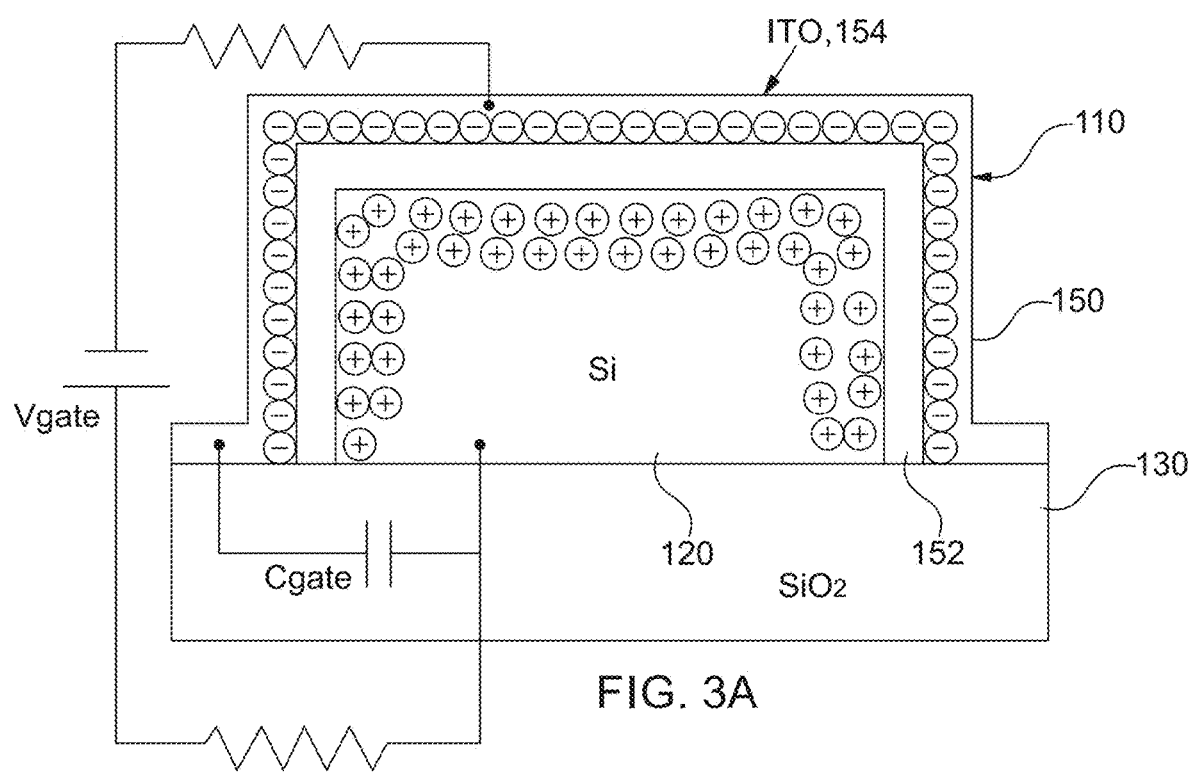
FIG. 3A schematically illustrates a cross-sectional view of a Si/oxide/ITO MOS capacitor at the center of an E-O modulator in accordance with the present invention, showing electron and hole accumulation at the ITO/oxide and Si/oxide interfaces, respectively, when a negative bias is applied on the ITO gate.

Briefly, as to the function and performance of the E-O modulator 100, without intending to be bound by any theory by any statements contained herein, the applied gate voltage induces free electron and hole accumulation in the ITO layer 154 and the silicon of the waveguide 120, respectively, FIG. 3A. The free carrier-induced variation of the real part of the optical permittivity causes a blue shift of the resonance peak; while increase of the imaginary part of the optical permittivity induces optical absorption of the resonance mode, which becomes more prominent when ITO layer 154 is close to the ENZ condition. We experimentally achieved a large E-O response of 30 pm/V and high energy efficiency of 46 fJ/bit. Compared with reported TCO-based plasmonic modulators, the active region of our E-O modulator 100 is completely free of metallic materials, which offers a low device loss of only 0.5 dB, moderately high Q-factor of 1,000, and better compatibility with CMOS processes. Compared with a conventional silicon ring resonator or microdisk modulator, E-O modulators 100 of the present invention show advantages including larger resonant wavelength tuning and higher usable optical bandwidth of greater than 1 nm. By replacing current $SiO_2$ gate with high-k materials and improving the Q-factor, we can potentially achieve even higher energy efficiency below 1 fJ/bit.

Figure 12A:
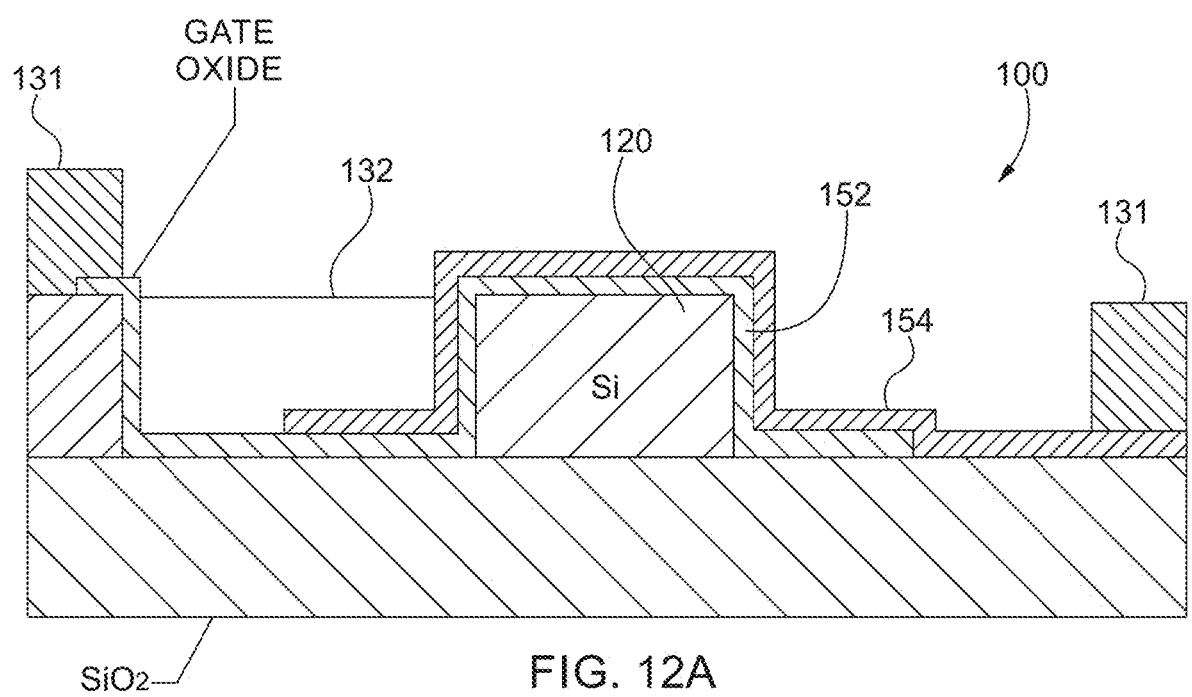
FIGS. 12A, 12B schematically illustrate side cross-section and top views, respectively, of an exemplary contact design in accordance with the present invention.
Figure 12B:
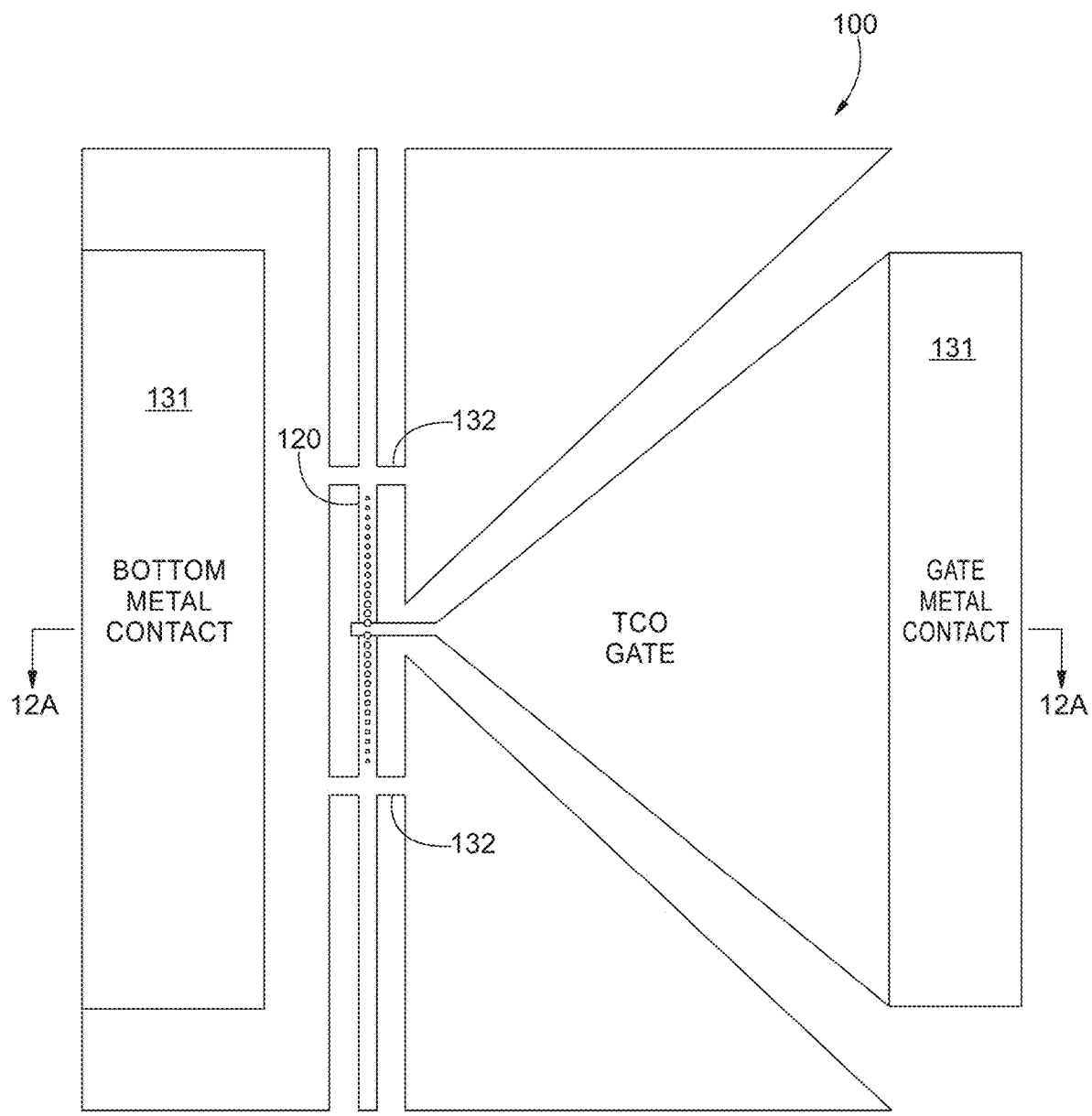

Turning to the structure more particularly, FIGS. 2A-3A illustrate an exemplary configuration of an ITO gated 1-D silicon photonic crystal (PC) nano-cavity E-O modulator 100 in accordance with the present invention. The device may include a SIS capacitor 150 centered on a nano-cavity 110 of a silicon strip waveguide 120. The strip waveguide 120 may be fabricated on a p-type silicon-on-insulator (SOI) substrate 130 with the waveguide 120 being 500 nm in width and 250 nm in height. A pair of grating couplers 191 may be integrated with the waveguide 120 to couple light in and out of the waveguide 120 such as by an optical fiber, for example, FIG. 2C. The PC nano-cavity 110 may be defined through electron beam lithography (EBL) and reactive ion etching (RIE), operating in the TE mode. Two photonic crystal mirror segments 140 may be placed back-to-back adjacent to the nano-cavity 110. The photonic crystal mirror segments 140 may include air holes 142 having a size which is quadratically tapered down from the center of the PC nano-cavity region to the edge of the two mirror segments 140. In one exemplary design, each mirror segment 140 has twelve air holes 142. The filling factor, which is defined as f=A/pw, is tapered down from f=0.23 in the center to f=0.1 at the edge, where A is the air hole area, p is the air hole period, and w is the waveguide width. The period p may be chosen to be 340 nm to allow the modulator 100 to operate in the telecom wavelength range, e.g., 1.3~1.65 µm. Centered on the cavity 110, an ITO/$SiO_2$/Si film stack creates a SIS capacitor 150 with cross-sectional view shown in FIG. 3A. In this exemplary configuration, the silicon waveguide 120 also serves as the bottom electrode of the capacitor 150 despite its relatively high resistivity. Two 400 nm wide silicon strips 132 may be used to form the conduction path between the silicon waveguide 120 and the silicon slab on which contact electrodes 131 may be provided, FIGS. 2A, 12A, 12B. A 20 nm thick $SiO_2$ gate oxide layer 152 may be thermally grown on top of the silicon PC nano-cavity 110 to serve as the gate oxide, FIG. 3A. A 20 nm thick ITO layer 154 may then be sputtered on the gate oxide layer 152 to provide a conductive gate electrode. The center nano-cavity length may be only 120 nm, which is believed to be at least 50 times shorter than ring resonators or micro-disk resonators. A 375 nm long (as measured along the direction of the longitudinal axis of the waveguide 120) ITO gate may be provided to compensate for possible misalignment of the electron beam lithography (EBL) process, see inset panel of FIGS. 2B, 2D. The SEM and optical images of a fabricated E-O modulator 100 of the present invention are depicted in FIGS. 2B, 2C, respectively.

Modeling

The E-O modulator 100 of the present invention operates in the accumulation mode of the SIS capacitor 150 with the negative gate bias on the ITO gate/layer 154. We present a numerical simulation systematically to analyze the carrier distribution in the accumulation layers versus the applied gate bias. (Unlike other reports that ignore the free carrier effect in the metal gate, we consider the free carrier accumulation at both sides of the interfaces, i.e., in the ITO/$SiO_2$ and Si/$SiO_2$ interfaces.) In our modeling, the carrier density and electric potential in the ITO layer 154 and Si region of the waveguide 120 are treated in different ways. The main difference is that the high doping level of ITO results in an initial Fermi level higher than the bottom of the conduction band. Therefore, the electron density and electric potential in ITO behave more like a metal, which can be approximated by the Thomas-Fermi screening model. On the other side, Si follows classic semiconductor theory. However, a large band bending is expected in our device and traditional Boltzmann distribution approximation is not accurate. A rigorous analysis using Fermi-Dirac distribution is used to model the Si side. To obtain representative results, we conduct our modeling using the electric displacement field $D_{ox}$ instead of the electric field E. The boundary condition only requires the value of $D_{ox}$ in the gate oxide layer 152, making the modeling independent of the gate oxide material and thickness.

Figure 3B:
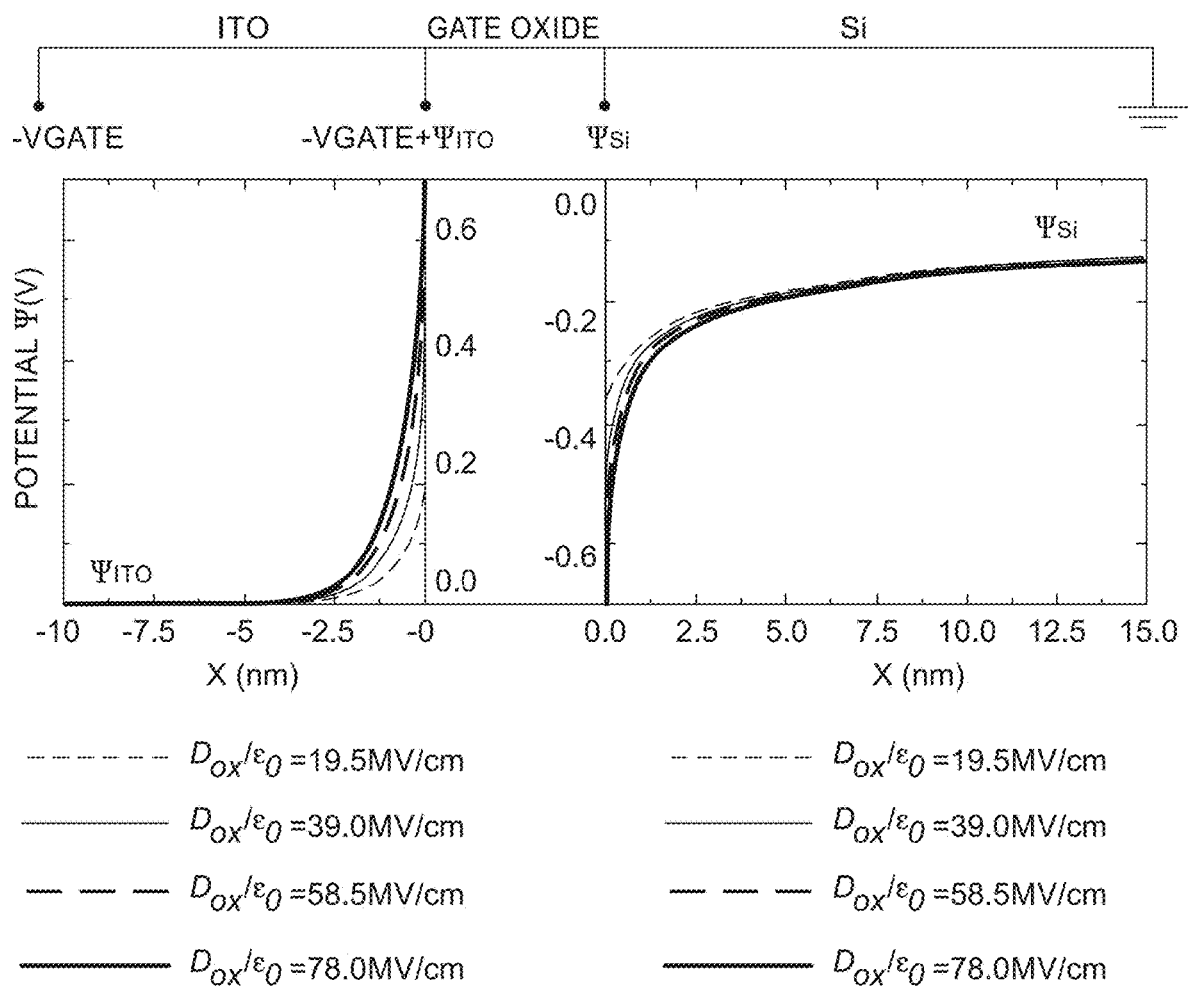
FIG. 3B illustrates an electrical potential distribution in ITO ($\Psi_{ITO}$) and Si ($\Psi_{Si}$) as a function of the electrical displacement field in the gate oxide layer, $D_{ox}$.
Figure 3C:
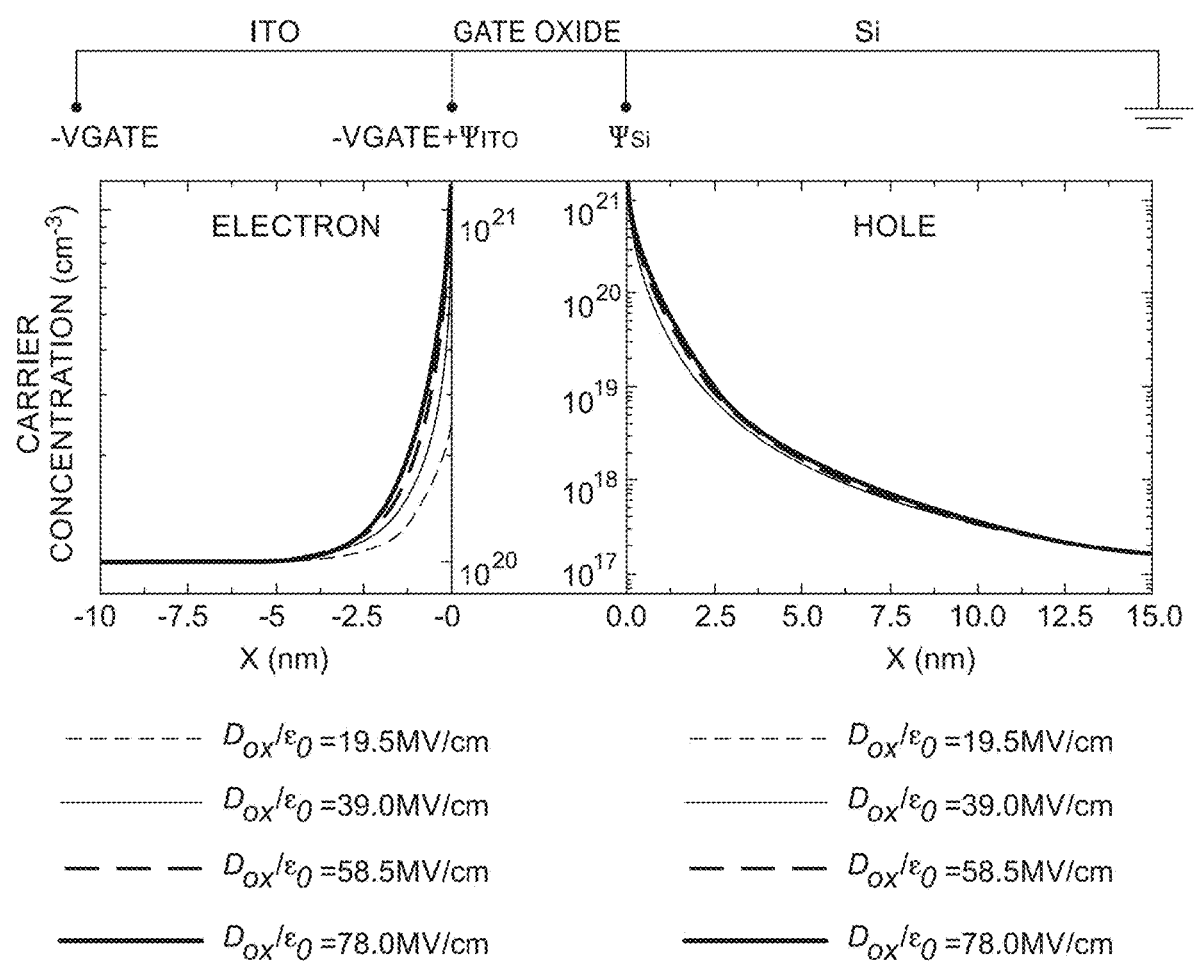
FIG. 3C illustrates a carrier density distribution in ITO (electron) and Si (hole) as a function of $D_{ox}$ field.
Figure 3D:
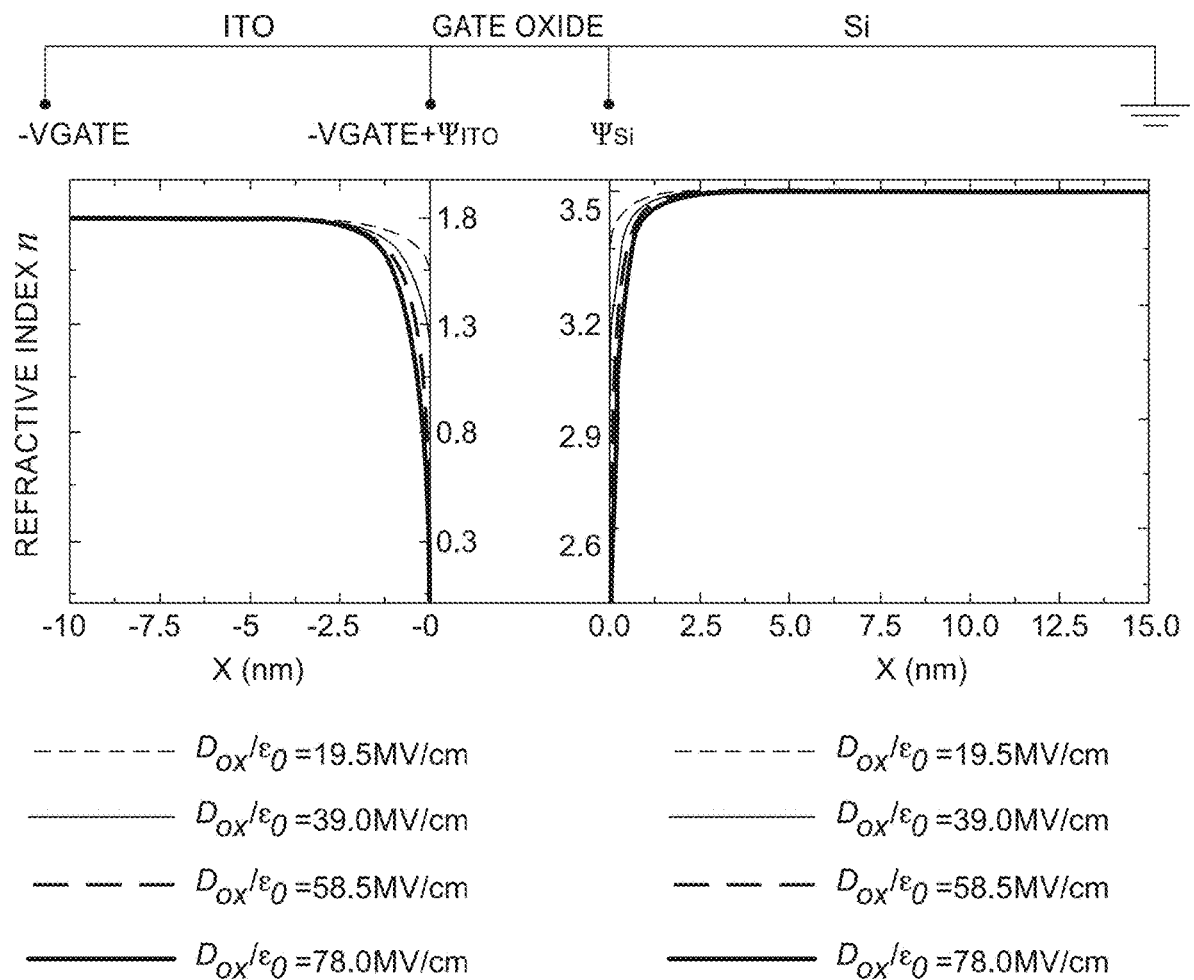
FIG. 3D illustrates the real part refractive index (n) distribution in ITO and Si as a function of $D_{ox}$ field.
Figure 3E:
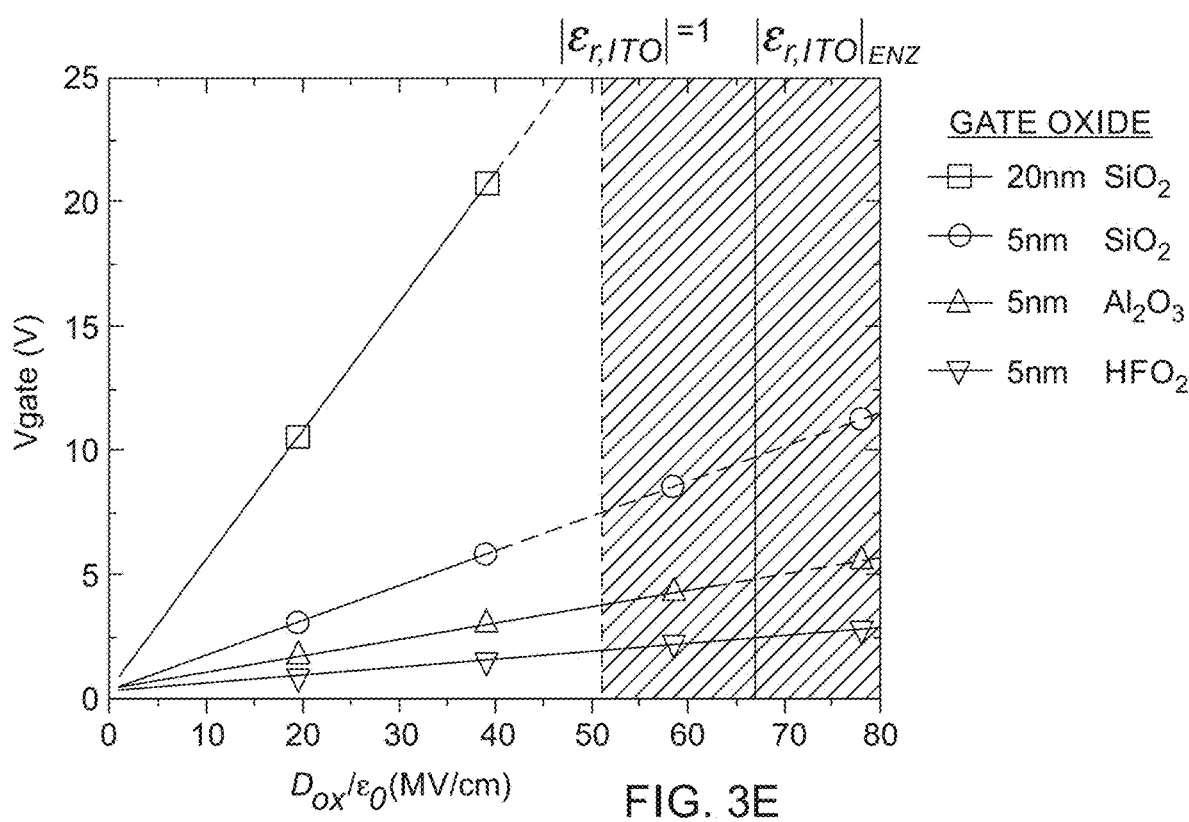
FIG. 3E illustrates gate voltage as a function of the $D_{ox}$ field for different gate oxide layers: 20 nm $SiO_2$, 5 nm $SiO_2$, 5 nm $Al_2O_3$, and 5 nm $HfO_2$, with the associated dashed lines showing the $D_{ox}$ field range where the gate oxide layer will breakdown, and with the shaded area to the right of the vertical dashed line showing the $D_{ox}$ field range when the permittivity of ITO accumulation layer, $|\varepsilon_{r,ITO}|$, is smaller than 1, representing the ENZ region, and the solid vertical line indicating the $D_{ox}$ field when $|\varepsilon_{r,ITO}|$ reaches minimum ENZ value.

We plot the electric potential and carrier distribution as a function of $D_{ox}$ as shown in FIGS. 3B and 3C. One can see that the electron concentration in the ITO layer 154 ($N_{e,ITO}$) accumulates from $1\times10^{20}$ cm³ to $7.46\times10^{20}$ cm³ and the hole concentration in Si 120 ($N_{h,Si}$) accumulates from $1\times10^{17}$ cm³ to $1.08\times10^{21}$ cm³ with a $D_{ox}/\varepsilon_0$ value of 78 MV/cm. Surprisingly, the peak $N_{h,Si}$ is even higher than that of $N_{e,ITO}$, which is due to the larger effective density of states of Si compared with ITO (see supporting information below beginning at [0075]). As a result, $N_{h,Si}$ in the Si of the waveguide 120 is more sensitive to electrical potential modulation than $N_{e,ITO}$ in the ITO layer 154. The ITO material reaches the ENZ region when the $N_{e,ITO}$ is $6.4\times10^{20}$ cm³ with $D_{ox}/\varepsilon_0$ of 67 MV/cm. FIG. 3D plots the corresponding distribution of the refractive indices of ITO and Si. Both ITO and Si exhibit dramatic refractive index modulation within a thin layer of ~1 nm thick close to the interface therebetween even at a relatively small $D_{ox}$ field. For the ITO side, this layer 154 is typically treated as an effective accumulation layer and the thickness can be estimated by the Thomas-Fermi screening length, $L_{tf}$. On the Si side, this thin accumulation layer in the waveguide 120 could also play a critical role for the E-O modulation. Next, knowing the $D_{ox}$ field, we can calculate the gate voltage by $$V_{gate} = |\Psi_{ITO}| + \frac{D_{ox}t_{ox}}{\varepsilon_0 \varepsilon_{oxide,st}} + |\Psi_{Si}|,$$

where $\Psi_{ITO}$ and $\Psi_{Si}$ are the surface potential at the ITO/SiO$_2$ and the Si/SiO$_2$ interface, $\varepsilon_0$ is the vacuum permittivity, and $\varepsilon_{oxide,st}$ and $t_{ox}$ are the static relative permittivity and thickness of the gate oxide layer, respectively. FIG. 3E plots the applied gate voltage as a function of $D_{ox}$ field with different oxide materials and thickness. Here the dashed lines indicate a large $D_{ox}$ field exceeding the breakdown of the gate oxide. From this analysis, one can conclude that thinner oxide layer thickness and high-k materials will help to reduce the applied bias voltage. Besides, to truly reach the ENZ operation of the ITO layer 154, a high-k gate material such as HfO$_2$ may be preferred. In our experimental demonstration, we chose SiO$_2$ as the gate oxide layer 152 primarily due to our current fabrication facilities.

The Si-ITO nano-cavity modulator 100 operates in the dual mode of cavity resonance and optical absorption. At a relatively small applied bias, the device operates in the "normal mode", when the $N_{e,ITO}$ is not high enough to push ITO into the ENZ confinement condition. Modulation of the nano-cavity resonance dominates, which mainly comes from the real parts of the permittivity change ($\Delta\varepsilon_1$) induced by the plasma dispersion effect of the ITO and Si. Based on the cavity perturbation theory, the resonance shift ($\Delta\omega$) can be expressed as:

$$\Delta\omega = \frac{-\frac{\omega}{2}\int \Delta\varepsilon \cdot E^* \cdot E \, dv}{\int \varepsilon \cdot E^* \cdot E \, dv},$$

where $\omega$ is the original resonance frequency, $\varepsilon$ and $\Delta\varepsilon$ are the distribution of the original and changed permittivity, and E is the electric field distribution of the cavity mode. We know that the permittivity change caused by the plasma dispersion is proportional to the change of free carrier concentration, namely $\Delta\varepsilon \propto \Delta N_c$. This means that the resonance shift induced by a 1 nm thick accumulation layer with a $N_c$ of $1\times 10^{20}$ cm$^{-3}$ is equivalent to the shift induced by a 100 nm thick layer from fully depletion to a $N_c$ of $1\times 10^{18}$ cm$^{-3}$ under the uniform optical field distribution approximation.

Figure 4A:
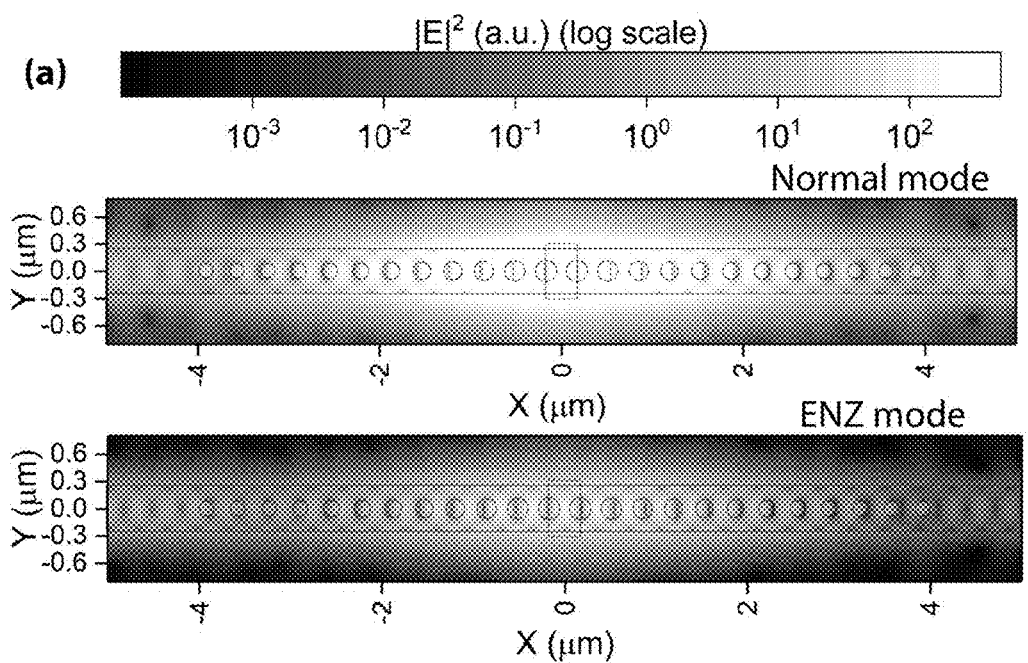
FIG. 4A illustrates photonic crystal cavity mode profiles of "normal mode" (accumulation layer $N_{e,ITO}=1\times10^{20}$ cm$^{-3}$) and "ENZ mode" (accumulation layer $N_{e,ITO}=6.4\times10^{20}$ cm$^{-3}$) of a modulator in accordance with the present invention with the optical field intensity plotted in log scale.
Figure 4B:
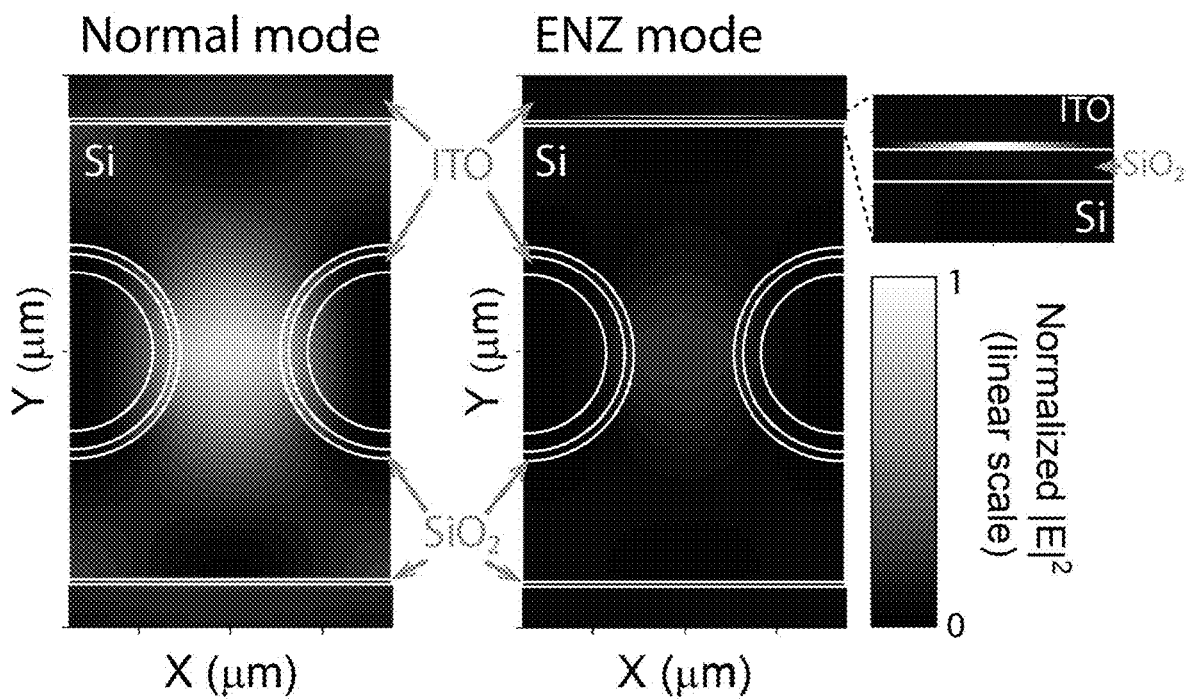
FIG. 4B illustrates the zoomed-in mode profile of "normal mode" and "ENZ mode" of FIG. 4A with the optical intensity plotted in normalized linear scale with the inset further showing a zoomed-in view of the mode profile of "ENZ mode" at the ITO/$SiO_2$ interface, indicating that in the "ENZ mode" the optical field is strongly confined in the accumulation layer at the side wall.

FIGS. 4A and 4B show a simulated photonic crystal cavity mode profile. The cavity mode profile and transmission spectra of the photonic crystal nano-cavity were simulated by a commercial software package, Lumerical MODE Solutions (Lumerical Inc, Vancouver, BC, Canada) based on a modified 2-D finite-difference time-domain (FDTD) method which treats the vertical direction with the effective index approximation. Because the thickness of the ITO accumulation layer 154 is very thin, it requires very fine mesh at the accumulation layer to numerically simulate the device, which would make the simulation of this kind of device very time-consuming if 3-D FDTD were used. Through the current method we can visualize the operation principle of the PC nano-cavity modulator 100 at the cost of spectral accuracy which can be improved by 3-D FDTD. In the simulation, we considered the ITO accumulation layer thickness to be 1 nm $L_{tf}$. On the Si side, uniform optical field distribution approximation was used to simplify the analysis. Basically, we assumed the same amount of holes were induced in the Si side and that they were uniformly distributed over the active region.

The cavity mode has a good overlap with the accumulation layer of the SIS structure 150 near the center air holes 142 and is relatively uniform. Thus, it is reasonable to assume an approximately uniform optical distribution here. The resonance shift has the relationship:

$$\Delta\omega \propto \frac{\omega \int \Delta N_c \cdot dv}{\varepsilon_{eff} \cdot v_c} = \frac{\omega \Delta Q}{\varepsilon_{eff} \cdot v_c} = \frac{\omega CV}{\varepsilon_{eff} \cdot v_c} = \frac{\omega CV}{\varepsilon_{eff} \cdot \gamma v_a} \propto \frac{C}{v_a},$$

where $\varepsilon_{eff}$ and $v_c$ are the effective permittivity and mode volume of the cavity mode; $\Delta Q$ is the accumulated free carriers induced by the applied voltage V; C and $v_a$ are the capacitance and volume of the active modulation region of the modulator respectively; and $\gamma$ is the coefficient describing the overlapping between $v_a$ and $v_c$. Additionally, due to the small mode volume of the photonic crystal cavity mode and its large overlap with the active modulation region of the modulator (FIG. 4B), we can conclude that the resonance shift is proportional to the capacitance per unit active volume. Large capacitance C and small active volume $v_a$ are preferred for high modulation efficiency. Since we effectively construct a 3-D SIS capacitor 150 in the center of the cavity of the photonic crystal 110, free carriers accumulate at all three interfaces. As large C/$v_a$ ratio is realized, we can achieve significant resonance modulation within $0.02\lambda^3$ active modulation volume. In spite of the resonance shift induced by the real part permittivity change, the optical absorption from the imaginary part change of the permittivity, which is usually a minor effect in pure silicon modulators, also plays an important role in the Si-ITO hybrid modulator 100, because of the 30-140 times larger imaginary part of ITO compared with Si. As a result, a larger extinction ratio can be achieved at the same resonance tuning. As the applied bias increases, the accumulation layer of ITO approaches the ENZ region as shown by the shaded area in FIG. 3E. Once the modulator reaches the "ENZ mode", the optical mode starts to be confined in the ITO accumulation layer. This ENZ confinement effect is highly polarization sensitive. For our photonic crystal nano-cavity design operating in the TE mode, ENZ confinement mainly happens at the sidewall interface as shown in FIG. 4B. The ENZ confinement effect will dramatically enhance the absorption which is proportional to $$\frac{\varepsilon_{2,ITO}}{2|\varepsilon_{ITO}|^2}.$$

Figure 4C:
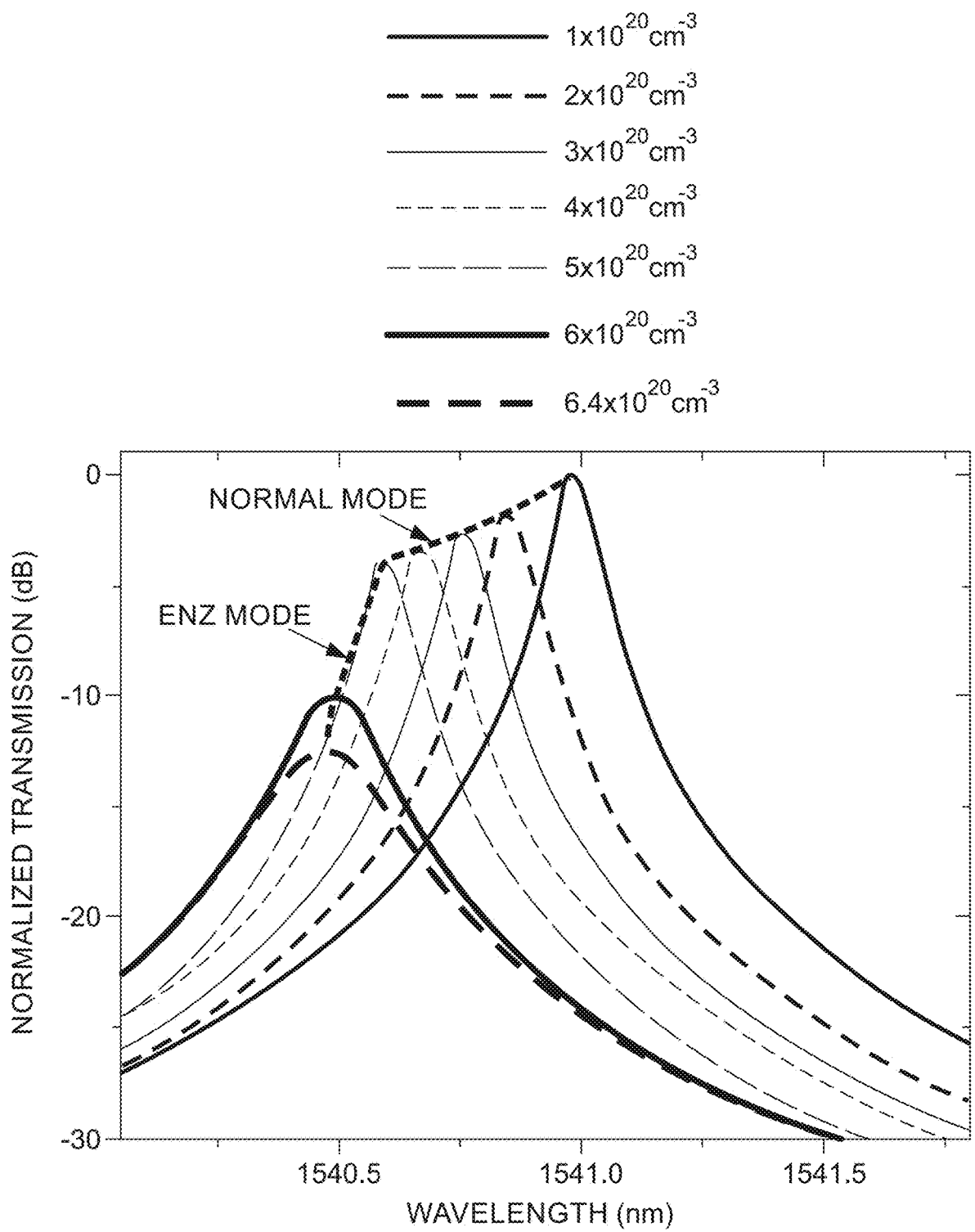
FIG. 4C illustrates a simulated normalized transmission spectra at different free carrier concentration $N_{e,ITO,acc}$ in the ITO accumulation region of a modulator in accordance with the present invention, with the dashed line connecting the peaks outlining the change of the transmission peak as $N_{e,ITO}$ increases.

In this case, the optical absorption mode dominates. FIG. 4C plots the simulated transmission spectra of the Si-ITO modulator 100 at different carrier concentration in the accumulation region, $N_{e,ITO,acc}$. The black dashed line outlines the evolution of the transmission peak. The trend from the normal resonance modulation to ENZ electro-absorption is clearly shown as $N_{e,ITO}$ increases.

Fabrication of Prototype

Figure 11A:
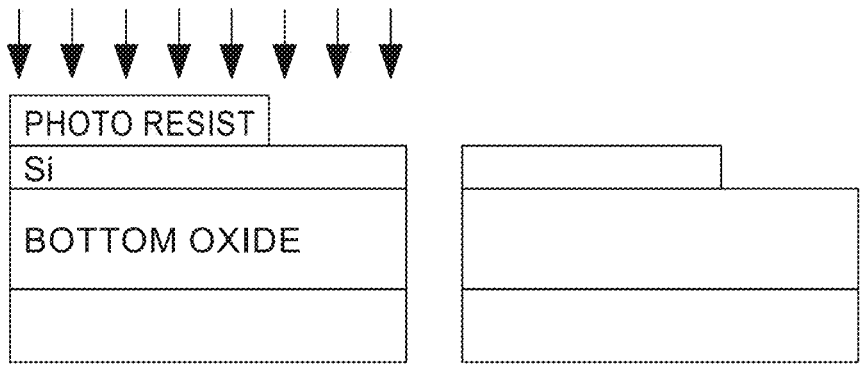
FIGS. 11A-11F schematically illustrate a flow chart of an exemplary fabrication process of a modulator in accordance with the present invention.
Figure 11B:
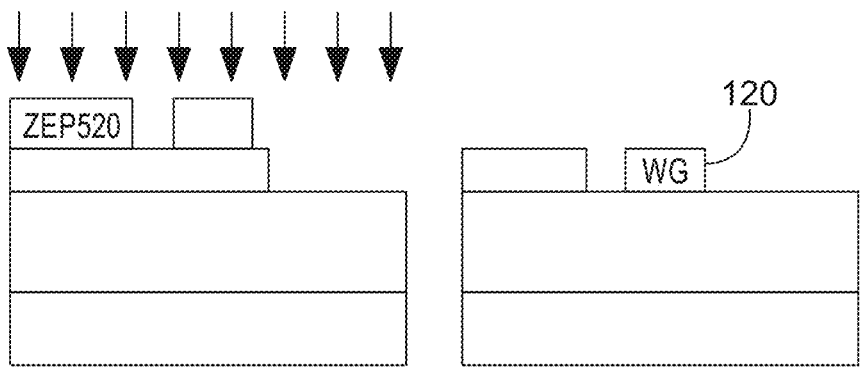
Figure 11C:
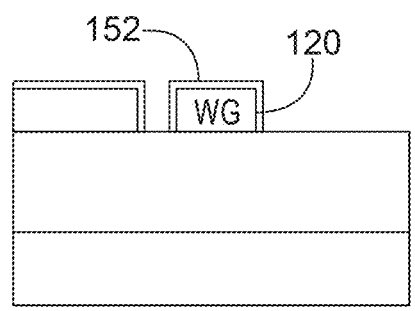
Figure 11D:
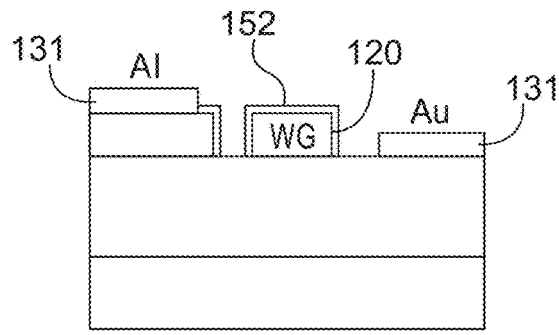
Figure 11E:
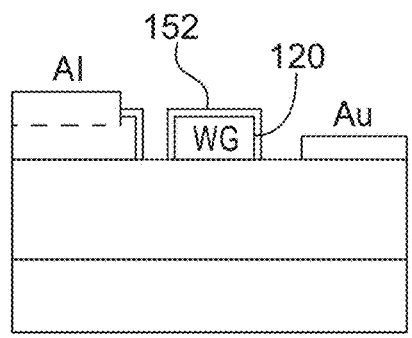
Figure 11F:
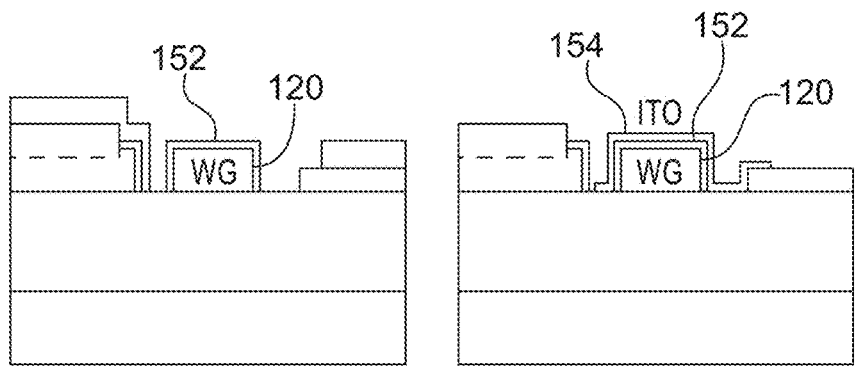

The E-O modulator 100 was fabricated on a p-type silicon-on-insulator (SOI) substrate with doping level of $1\times10^{15}$ cm$^{-3}$. As a first step, a contact photolithography and reactive ion etching (RIE) process was performed to pattern the Si layer in order to provide electrical isolation for the electrodes 131, FIG. 11A. Then, the silicon waveguide 120, cavity 110 and patterns of the grating couplers 191 were defined by electron beam lithography (EBL), FIG. 11B. RIE was used to etch into the 250 nm thick silicon layer to the bottom oxide. Next, a 20 nm thick $SiO_2$ layer 152 was formed through thermal oxidation which may cover all Si surfaces above the bottom oxide, FIG. 11C. After that, the metal contacts 131 were patterned using a contact photolithography, thermal evaporation and lift off process, FIG. 11D. Al was deposited on Si and annealed at 475° C. in a $H_2$:$N_2$ forming gas environment for 10 min to form ohmic contacts, FIG. 11E. Au was chosen to form the contact with the ITO. Finally, the ITO pattern was defined by a second step EBL, followed by RF sputtering a 20 nm thick ITO layer and lift off process to provide the fate oxide layer 154, FIG. 11F.

Measured Performance

The E-O modulation response of a fabricated Si-ITO modulator 100 of the present invention was characterized. To characterize the device, light from a tunable laser or an amplified spontaneous emission diode was coupled into and out of the silicon waveguide 120 by the grating couplers 191 using single-mode optical fibers with 10° tilted angle. A polarization-maintaining fiber was used as the input fiber in order to maintain the TE polarization. For the DC modulation testing, a DC bias voltage was applied on the top ITO gate electrode 154, while the bottom silicon waveguide 120 was grounded. The output spectrum was measured by a spectrum analyzer (Thorlabs, OSA203). For the dynamic testing an AC signal, FIG. 5, from a function generator (Tektronix, FG 503) was applied. The output signal was detected by a photodetector (Thorlabs, PDA10CF) and measured by an oscilloscope.

Figure 4D:
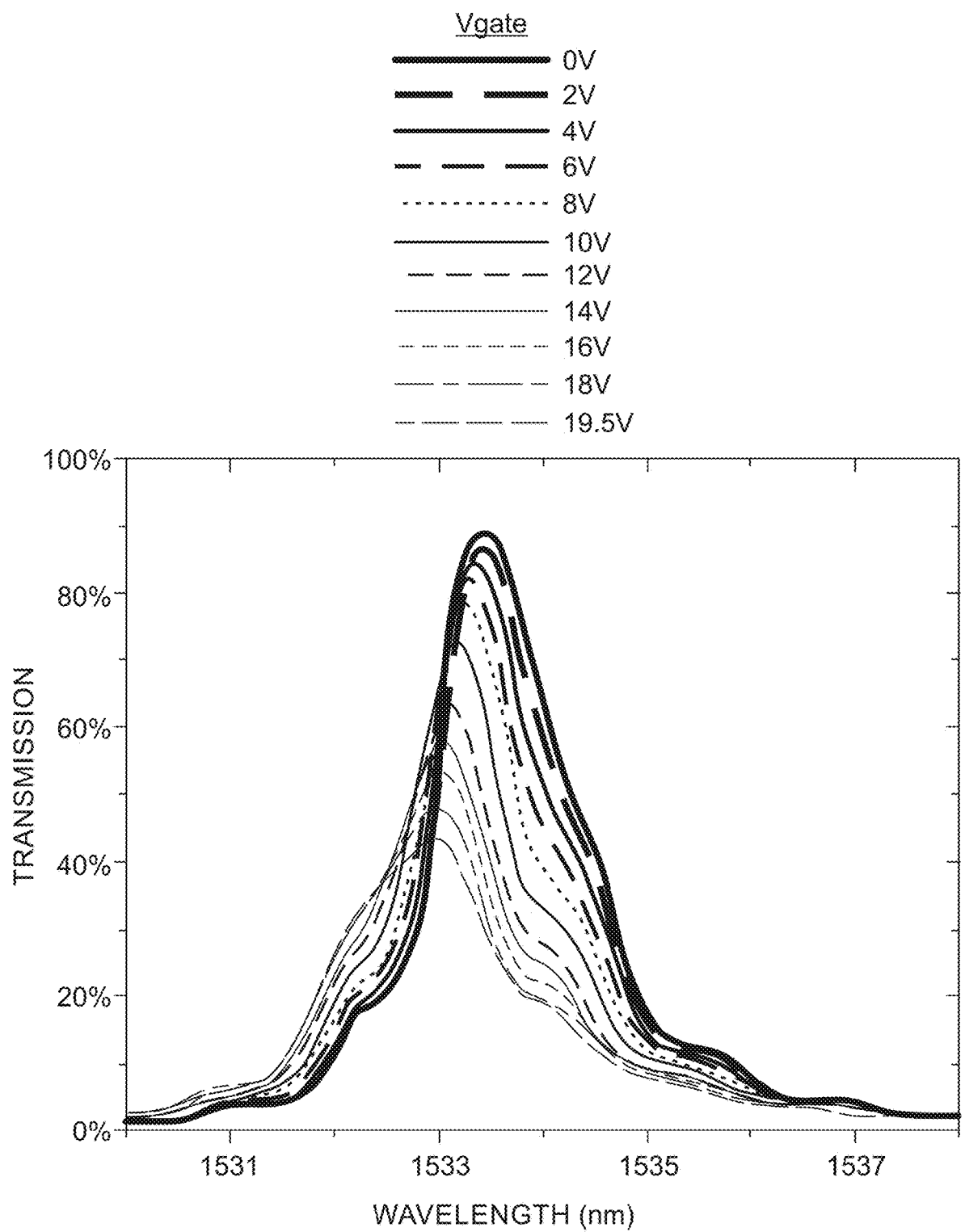
FIG. 4D illustrates measured static transmission spectra as a function of the applied bias voltage in ranges from 0 to 19.5 V.
Figure 4E:
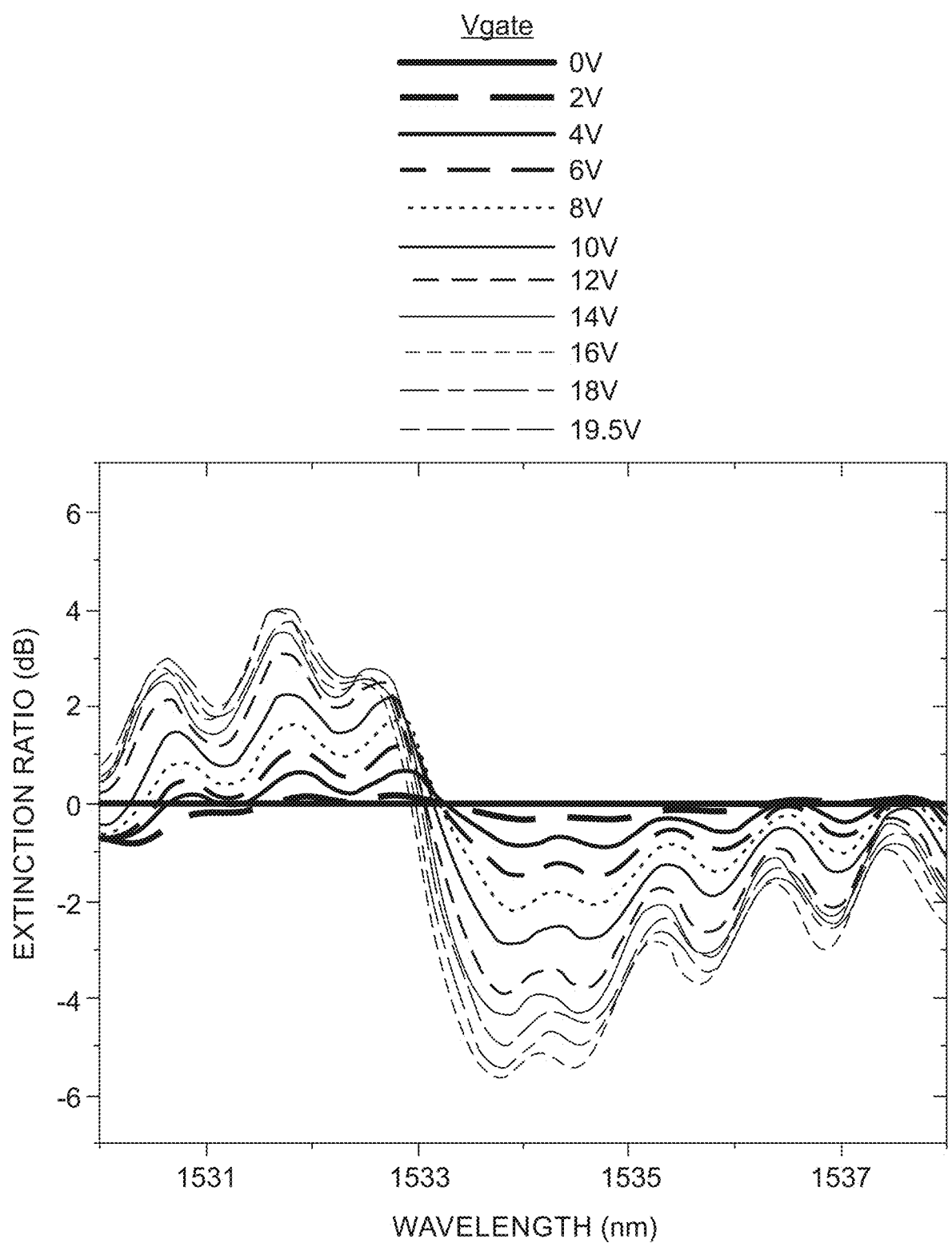
FIG. 4E illustrates measured extinction ratio (ER) spectra as a function of the applied bias voltage.
Figure 5:
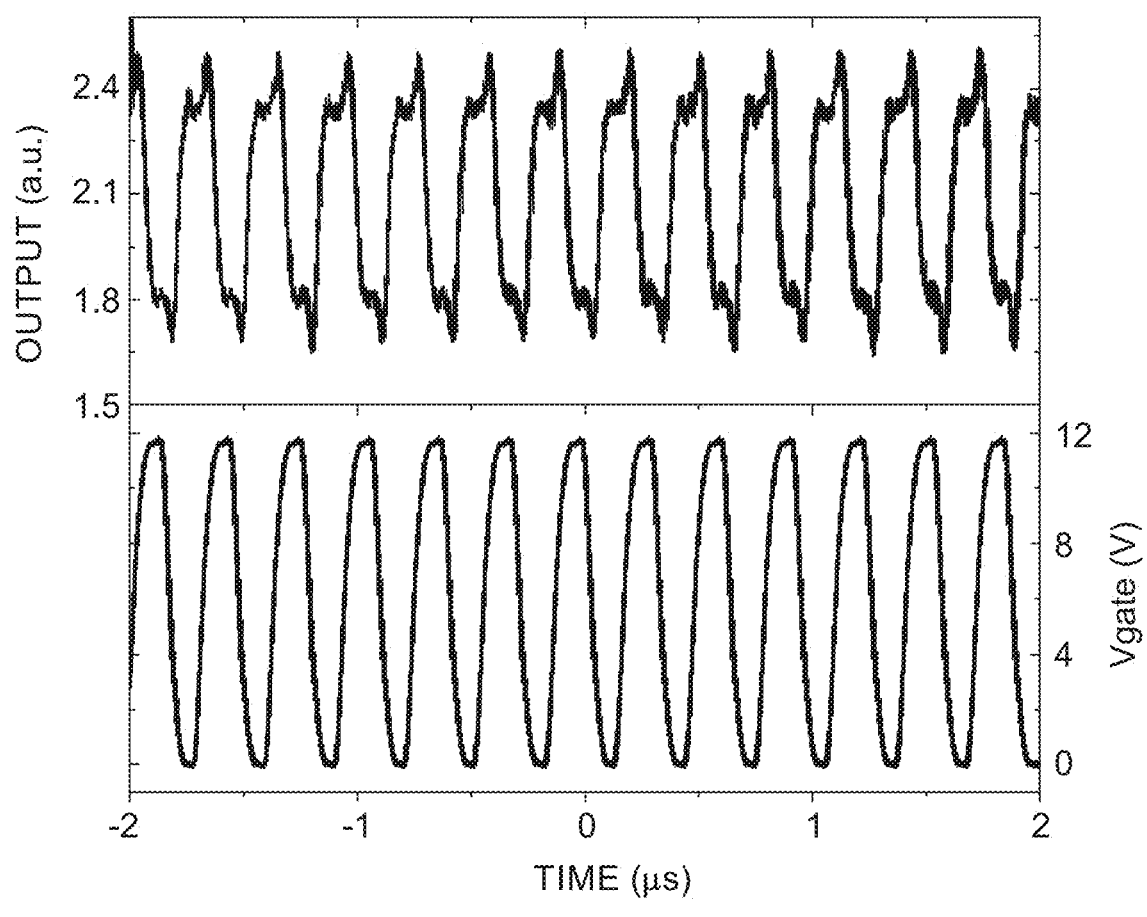
FIG. 5 illustrates AC optical modulation testing results at 1534.78 nm with 0 to −12 V sweep input bias voltage at 3.2 MHz of a modulator in accordance with the present invention.

FIG. 4D shows the measured transmission spectra as a function of the applied bias. The spectra are normalized to a straight Si waveguide as the reference. The insertion loss (IL) of the PC nano-cavity modulator 100 is only 0.5 dB at the peak resonance wavelength. The free carrier concentration of as-sputtered ITO is $1\times10^{20}$ cm$^{-3}$, which is still a dielectric material at telecom wavelengths. The measured Q-factor after ITO deposition is around 1,000, which is slightly smaller than the Q-factor measured before sputtering the ITO layer 154 (~1,200), proving that the degradation of the Q-factor due to the thin ITO layer 154 is minor. The resonance wavelength blue-shifts by 0.57 nm with a change in DC bias from 0 to −19.5 V, indicating a 30 pm/V modulation efficiency. In addition, a significant drop of the peak transmission by 45.34% is observed, which is caused by the resonance shift as well as the optical absorption. The SIS capacitor 150 operation is verified by the low leakage current, which is measured to be less than 100 fA at −20V. FIG. 4E plots the extinction ratio (ER) spectrum as a function of the applied bias. A usable optical bandwidth of greater than 1 nm is observed if we allow 1 dB variation of the ER. The maximum modulation is observed at 1533.78 nm, which introduces an additional loss of 0.75 dB at the peak wavelength. The transmission varies by 5.6 dB with a bias changing from 0 V to −19.5 V. The dynamic modulation speed is demonstrated up to 3.2 MHz with an AC voltage swing of 0 to −12 V as shown in FIG. 5, which is limited by the testing instruments used.

We estimated the modulation speed and energy efficiency of the hybrid Si-ITO nano-cavity modulator 100. The speed of the modulator 100 was limited by the RC delay, since its operation is based on the fast accumulation mode of a SIS capacitor 150. The finite element method (FEM) simulation gives the capacitance of the modulator including the whole PC nano-cavity 110 and the ITO gate 154 in the active region to be 1.28 fF. The series resistance of our fabricated device was around 4.9 MΩ, which was limited by the lightly doped ($1\times10^{15}$ cm$^{-3}$) SOI slab. Consequently, the fabricated E-O modulator 100 had a relatively slow RC-limited speed of 160 MHz. However, the series resistance can be reduced to ~9 KΩ by selectively doping the silicon conduction strips 131 and PC waveguide 120 to a high level of $5\times10^{18}$ cm$^{-3}$ while keeping the doping of the center active cavity region at a moderate high level of $1\times10^{17}$ cm$^{-3}$.

The optical loss of a passive silicon waveguide with high level doping is around 0.017 dB/μm according to our optical FEM simulation. A 10 μm long silicon waveguide with high doping level will only introduce an additional loss of 0.17 dB. Besides, the corresponding silicon waveguide loss of moderate high doping level is $3.4\times10^{-4}$ dB/μm. For a cavity with a moderate Q factor of 5,000, which corresponds to a photon lifetime of 4.2 ps, the increase in optical loss is only 0.12 dB. As a result, the RC-limited bandwidth can be improved to 87 GHz. But the real achievable operation speed will be limited by the electronic circuit or signal generator. The energy efficiency of the E-O modulator 100 is estimated using $E_{per\ bit}=CV^2/4$. Assuming a 12 V voltage swing (3 dB ER at the resonance peak), the energy consumption of the modulator 100 is only 46 fJ/bit. Since the free carrier accumulation in the SIS only depends on the D field in the gate insulator 152, the performance of the modulator 100 can be further improved with high-k materials such as $HfO_2$. For example, if we replace the 20 nm $SiO_2$ layer 152 with 5 nm $HfO_2$, the applied voltage will be reduced to 1 V to achieve the same D field using current 12 V bias. In this case, the RC limited speed will decrease to 40 GHz due to the increased capacitance. However, the resonance tuning efficiency will increase to 360 pm/V and the energy consumption will drop to 6.2 fJ/bit. In addition, the fabricated silicon-ITO nano-cavity modulator 100 only possesses a moderate Q-factor of 1,000 limited by the fabrication quality, such as the surface roughness and the deviation of the air hole diameters. Through advanced designs and optimized fabrication, a PC nano-cavity 110 with higher Q factor is achievable. We anticipate that both the ER and the operation voltage will be improved in further development, offering the possibility to achieve hundreds of atto-joule/bit energy efficiency in the future. For example, if the Q factor is improved to 5,000 (Q factor limited bandwidth will be 240 GHz), we can further reduce the operational voltage by 5 times and improve the energy efficiency by 25 times to 250 aJ/bit.

$HfO_2$ Embodiment

In a further exemplary configuration of a device in accordance with the present invention, a low-voltage silicon photonic crystal nano-cavity modulator 500 using an optimized SIS capacitor 550 may be provided similar to that of FIGS. 2A-2E but comprising an $In_2O_3/HfO_2$/p-Si stacked nanostructure, FIG. 6A. The use of $HfO_2$ is expected to improve upon the relatively smaller capacitance density of the $SiO_2$ gate insulator layer 152 in the modulator 100. Like the modulator 100 of FIGS. 2A-2E, the SIS capacitor 550 may be provided at the center of the photonic crystal (PC) nano-cavity 510 on a silicon strip waveguide 520 of the modulator 500, FIG. 6A.

More specifically, FIG. 6A shows the schematic of the photonic crystal nano-cavity E-O modulator 500. The photonic crystal nano-cavity 510 may be created on the strip silicon waveguide 520 which is 500 nm in width and 245 nm in height. Two tapered photonic crystal mirror segments 540 may be placed back-to-back, resulting in a zero-length cavity 510. Each mirror segment 540 may include 12 air holes 542 with a period of 340 nm. The size of the air holes 542 may be quadratically tapered from the edge to the center. The $In_2O_3/HfO_2$/p-Si film stack may be formed in the center of nano-cavity 510, forming the SIS capacitor 550 which is the active region of the modulator 500, with a cross-sectional view of the capacitor 550 shown in the enlarged detail of FIG. 6A. Here, the p-Si performs as the semiconductor layer. The two silicon strips 532 may be placed 5 μm away from the center on each side of the nano-cavity 510, providing electrical connection between the nano-cavity 510 and the silicon slab which may be electrically connected to metallic electrodes. The 10 nm thick high-k dielectric, $HfO_2$, film 552 serves as the gate oxide, and on the top, a 20 nm thick $In_2O_3$ film 554 acts as the TCO gate electrode. (Here, we choose $In_2O_3$ as the TCO material instead of previously used ITO, because $In_2O_3$ offers slightly higher mobility than ITO in our fabrication facility, which can potentially improve the plasma dispersion effect.) The total length (as measured along the direction of the longitudinal axis of the waveguide 520) of the capacitor 550 may be 350 nm. Compared with other high-Q resonators such as micro-ring and micro-disk, the photonic crystal nano-cavity 510 has more confined mode volume.

Figure 6B:
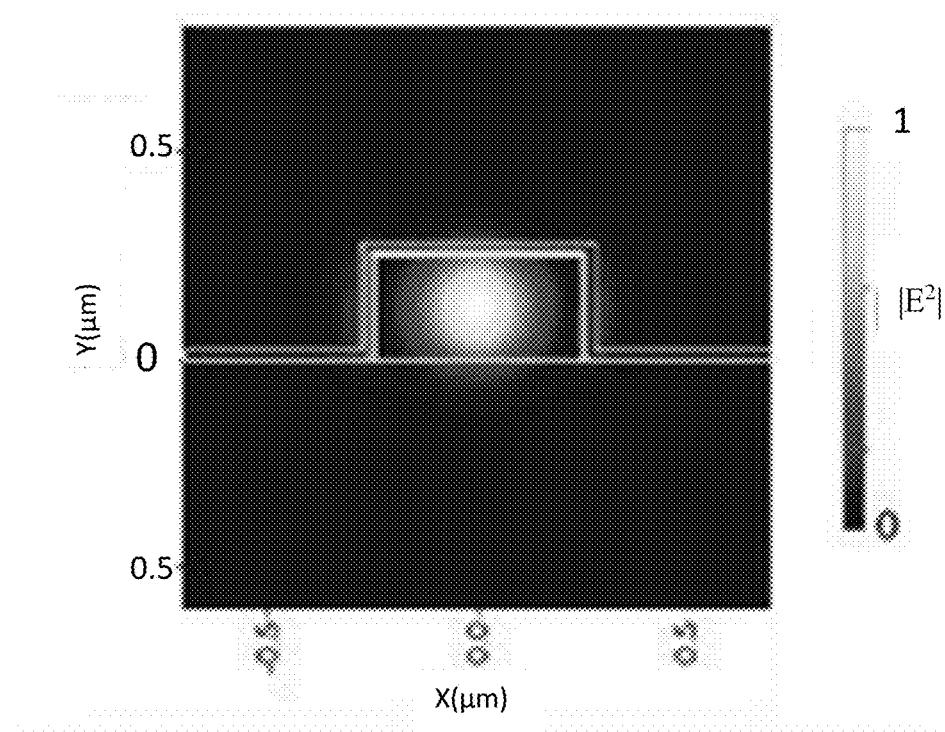
FIG. 6B illustrates a cross-sectional $|E^2|$ distribution in the center of the photonic crystal nano-cavity (Z=0 μm) of the present invention.
Figure 6C:
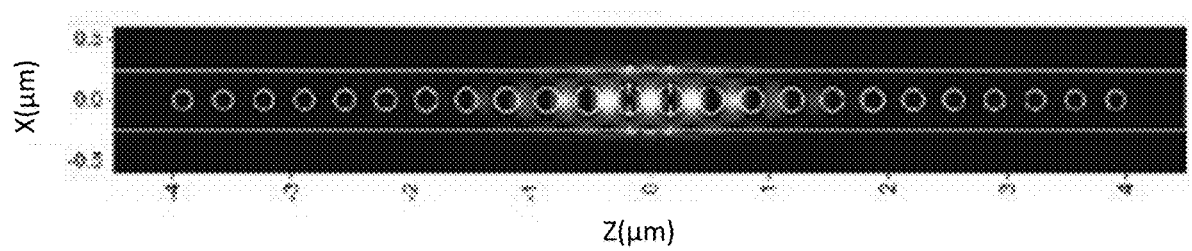
FIG. 6C illustrates a top view of the $|E^2|$ distribution in the center plane of the photonic crystal nano-cavity of the present invention.
Figure 7A:
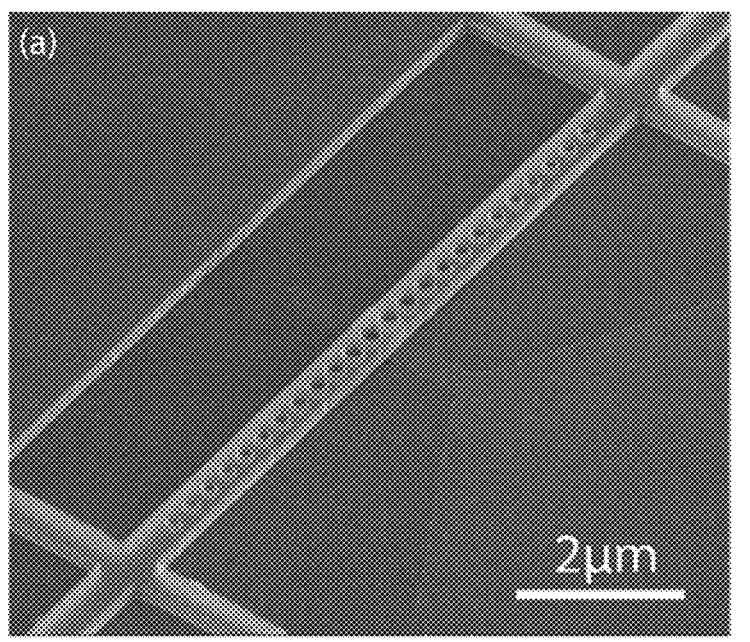
FIG. 7A illustrates a scanning electron micrograph (SEM) of a fabricated photonic crystal nano-cavity modulator in accordance with the present invention taken with the sample tilted at 45°.
Figure 7B:
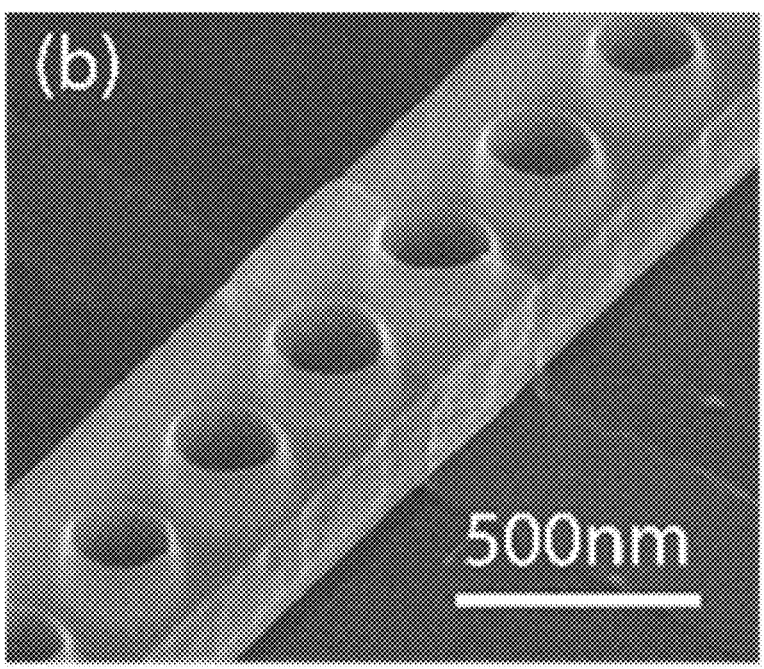
FIG. 7B illustrates a zoomed-in SEM of the MOS structure in the active region of the nano-cavity modulator of FIG. 7A.
Figure 7C:
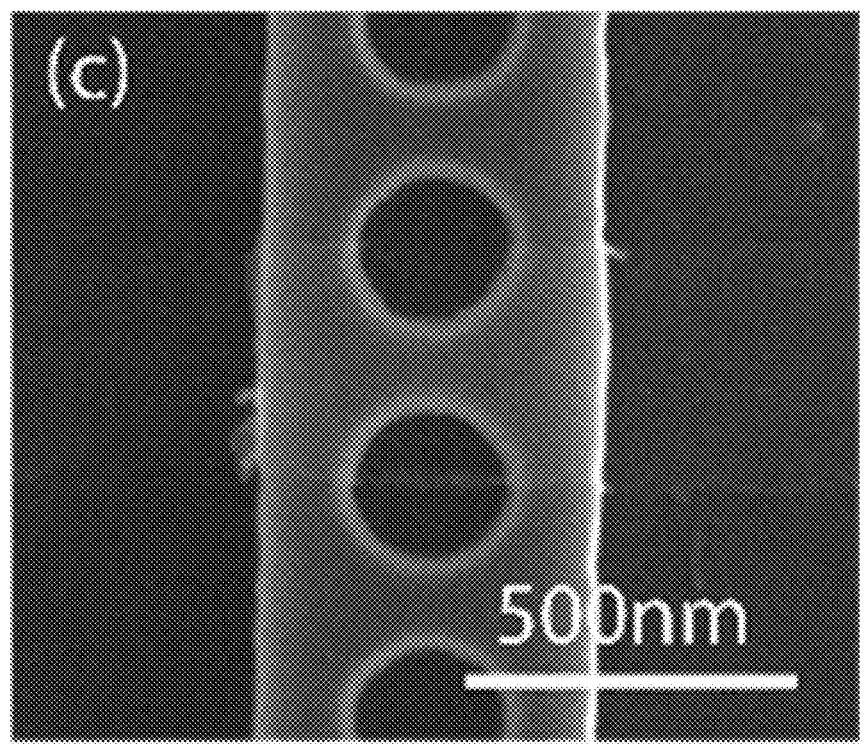
FIG. 7C is a top view SEM of the active region of the nano-cavity modulator of FIG. 7A.
Figure 7D:
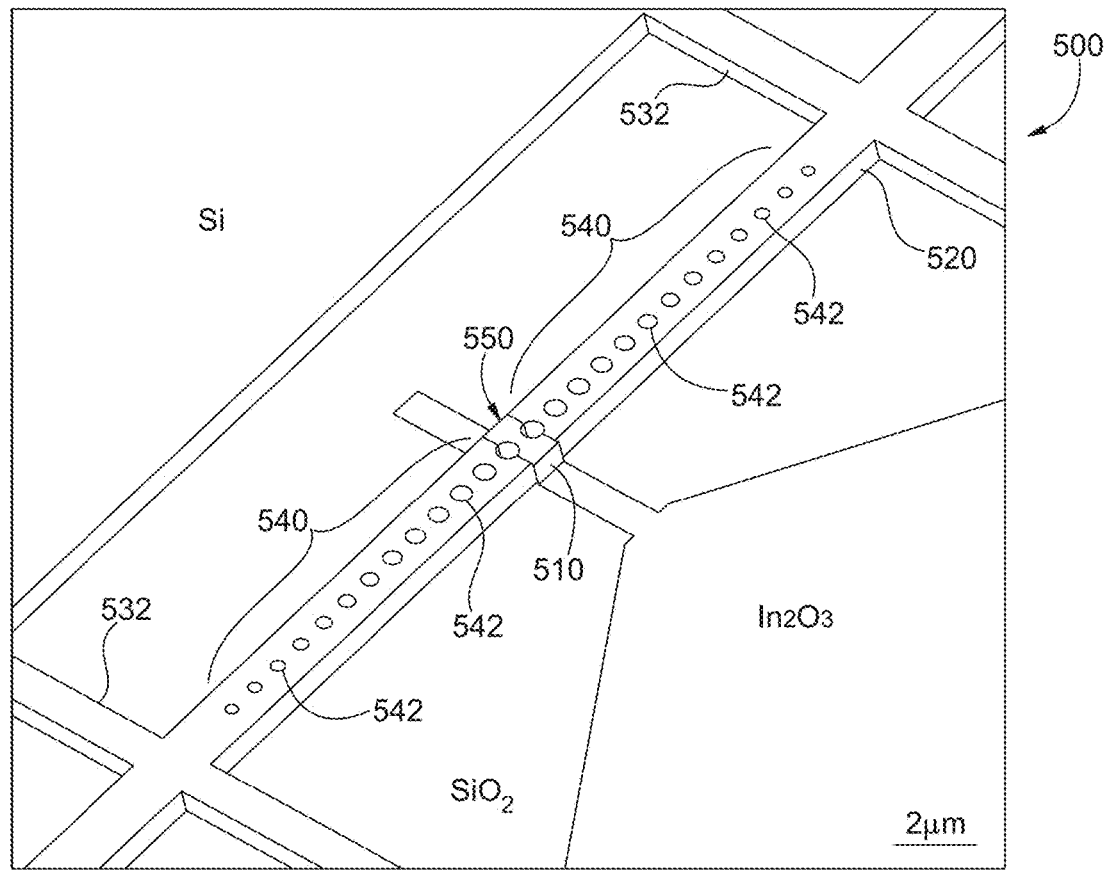
FIGS. 7D-7F are line drawings of FIGS. 7A-7C, respectively.
Figure 7E:
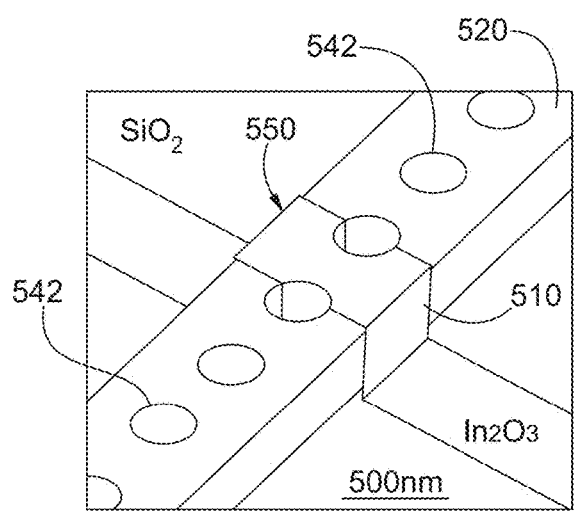
Figure 7F:
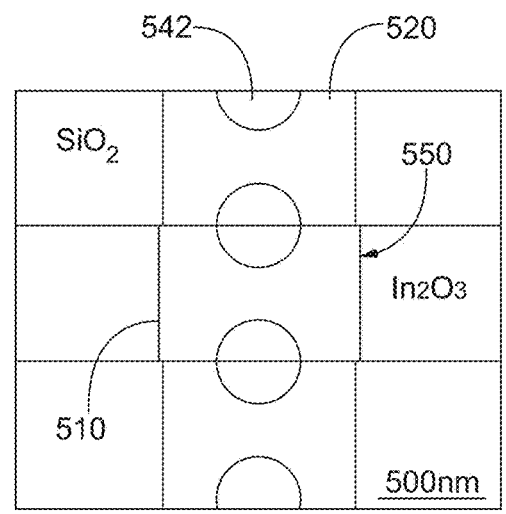

The photonic crystal nano-cavity modulator 500 was simulated based on a 3D finite-difference time-domain (FDTD) method with the nano-cavity 510 operating in the transverse-electric (TE) mode. The simulation shows an ultra-compact mode volume of 0.049 μm³ (0.25 (λ/n)³), which is believed to be more than one order of magnitude smaller than the most compact micro-disk resonator. FIGS. 6B, 6C show the simulated cross-sectional and top views, respectively, of the optical mode profile of the TE cavity mode. Best tuning efficiency of plasma dispersion effect can occur when the carrier modulation happens near the region where the optical field has the maximum power. In the photonic crystal nano-cavity modulator 500, this corresponds to the center silicon region (~130 nm wide) between the two photonic crystal segment 540. In our design, we chose the $In_2O_3$ gating length to be slightly bigger than one period between air holes, primarily due to the consideration of fabrication tolerances. Even so, the $In_2O_3$ gating length still provides an ultra-small active volume of $V_a$=0.06 μm³.

In operation, the active region of the photonic crystal nano-cavity modulator 500 is driven by a SIS capacitor 550. A negative bias applied on the $In_2O_3$ gate layer 554 produces free carrier accumulation at both the $In_2O_3/HfO_2$ (electron) and the $HfO_2$/p-Si (holes) interfaces. We know that the permittivity change caused by the plasma dispersion is proportional to the change of free carrier concentration. The SIS capacitor 550 of the present invention can easily provide a huge capacitance density using the thin high-k gate insulator layer 552. For example, a SIS capacitor with 10 nm $HfO_2$ gate oxide layer has a large capacitance density of 22.1 fF/μm². As comparison, the capacitance density for a PN junction with doping level of $10^{18}$ cm⁻³ is only ~1.5 fF/μm². In addition, the photonic crystal nano-cavity modulator 500 actually includes a 3D-SIS capacitor 550. Hence, free carriers can accumulate at all the surrounding interfaces (side wall interfaces and the top interface, FIG. 6A; also recall FIG. 3A.). A large capacitance (C) can be achieved in a very small active volume ($V_a$). Simulation of the capacitance of the modulator 500 through commercially available software, ANSYS® HFSS (ANSYS, Inc., Canonsburg, Pa. USA), based on finite element method (FEM) gives a gate capacitance of 13 fF, which corresponds to a capacitance over active volume ratio of $C/V_a$=216 fF/μm³.

Fabrication of $HfO_2$ Embodiment

The modulator fabrication process started with a p-type silicon-on-insulator (SOI) wafer with a silicon layer thickness of 250 nm and the buried oxide layer thickness of 3 μm. First, the SOI wafer was uniformly implanted with 34 keV B+ ions at a flux of 2×10¹³ ions cm⁻² to lightly dope the silicon layer and reduce the resistivity. Then, the silicon waveguide 520, photonic crystal cavity 510 and grating couplers were patterned by diluted ZEP520A resist using electron beam lithography (EBL), followed by a reactive ion etching (RIE) process to etch through the silicon layer. (We found that the resonance peak of our fabricated device shifted to shorter wavelength compared with the design value.) The dimension of the actual fabricated device was 5% larger than the designed values as listed above. A 10 nm thick $SiO_2$ layer was then formed by thermal oxidation at 1000° C. in order to smooth the etching surface (to improve the Q factor) and also activate the dopants. After etching the $SiO_2$ layer by buffered oxide etchant (BOE), a 10 nm thick $HfO_2$ layer 552 was deposited using atomic layer deposition (ALD). Next, Al and Au electrode pads were patterned by contact photolithography, thermal evaporation and lift-off process, for subsequent contacting with the Si and $In_2O_3$ layer respectively. Before metal evaporation, the overlapped $HfO_2$ layer 552 was removed by BOE. The sample was then annealed at 475° C. to form Ohmic contact between Al and Si. Finally, the 20 nm $In_2O_3$ gate layer 554 was patterned a second time by EBL with ZEP resist followed by room-temperature an RF sputtering and lift-off process. FIGS. 7A-7C, 7D-7F show the scanning electron microscopy (SEM) images and line drawings, respectively, of a fabricated modulator 500.

Optical and E-O modulation characterization of the fabricated modulator 500 was performed. Light was coupled into and out of the silicon waveguide through grating couplers from optical fibers with a 10° tilted angle. At the input side, a polarization-maintaining fiber was used to maintain the TE mode polarization controlled by a polarization controller. The output light was then coupled into an optical spectrum analyzer. During the E-O testing, a DC voltage was applied onto the top $In_2O_3$ gate electrode 554 while the bottom silicon waveguide 520 was grounded.

Figure 10A:
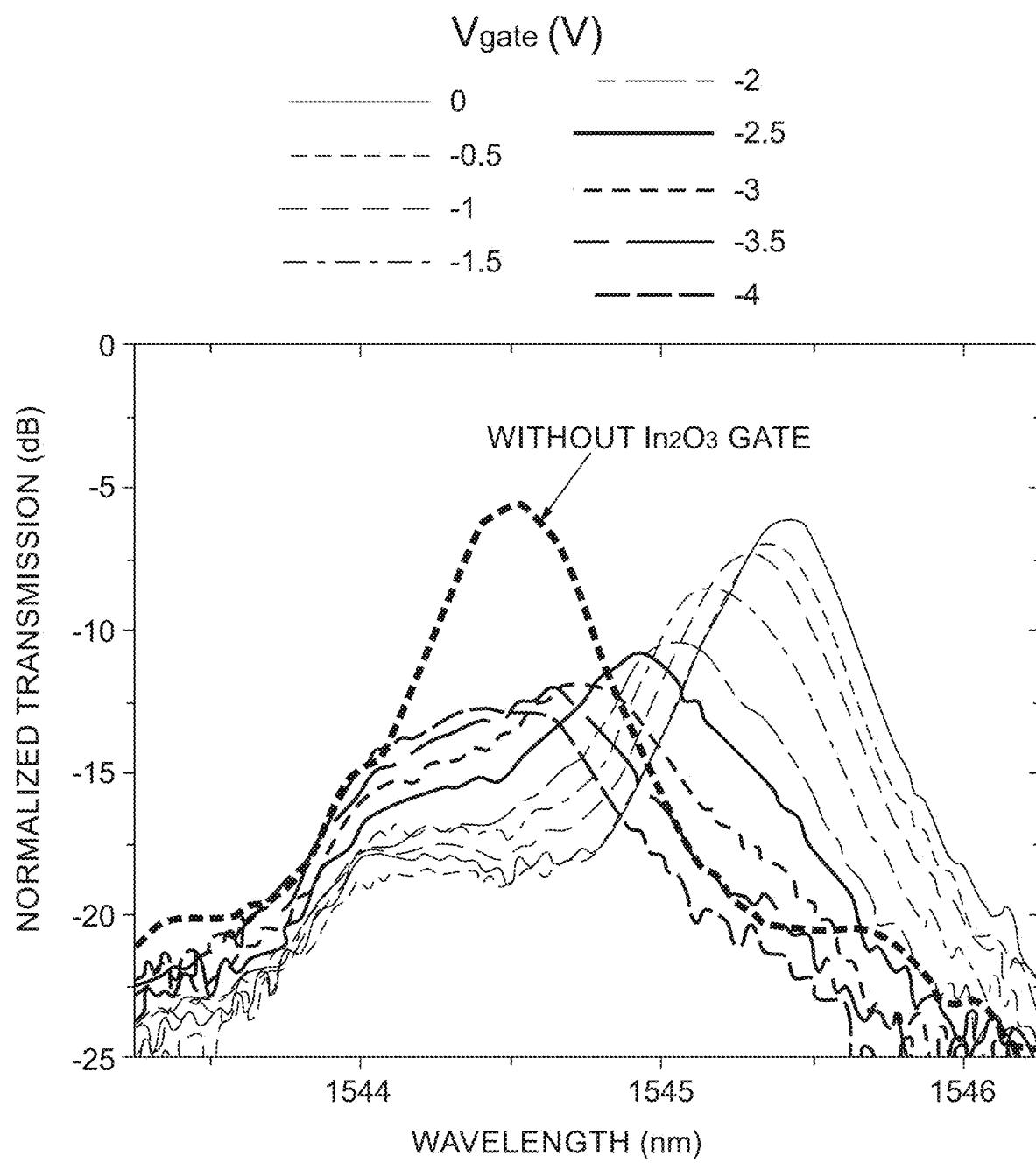
FIG. 10A illustrates transmission spectra of a nano-cavity modulator in accordance with the present invention at different bias voltages (solid lines) and before sputtering the $In_2O_3$ gate (dashed line)
Figure 10B:
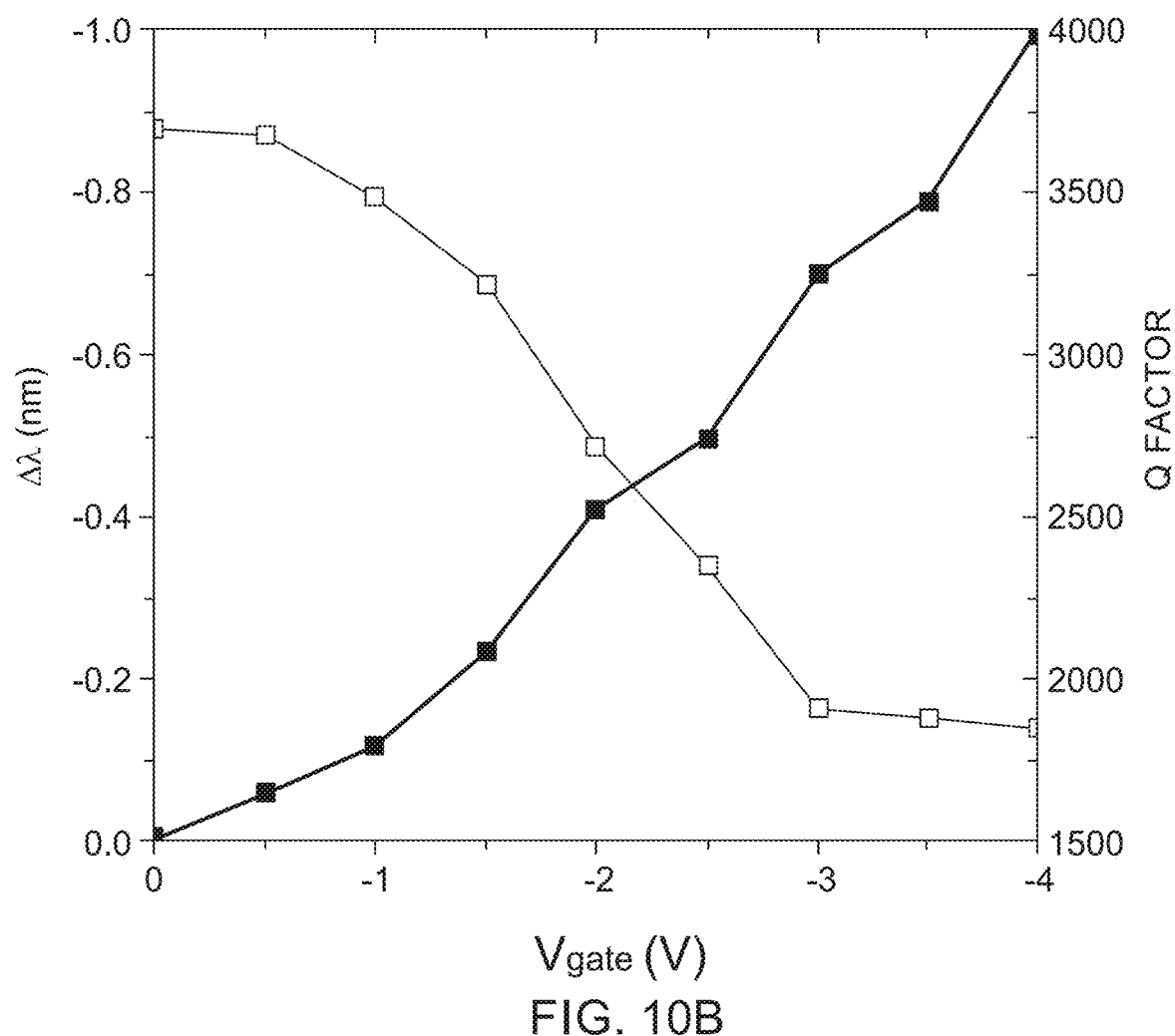
FIG. 10B illustrates peak wavelength shift and Q factor as a function of applied bias.

FIG. 10A shows the plots of the measured transmission spectra at different applied bias voltages. The spectra are normalized to a straight Si waveguide with same crossing strips as the reference. When no bias is applied, a transmission peak with a relative high Q factor of 3,700 is observed at 1545.39 nm, FIG. 10B. The insertion loss at peak wavelength is ~6 dB, which is majorly caused by fabrication errors and waveguide surface roughness, FIG. 10A. Compared with the transmission spectrum before sputtering the In$_2$O$_3$ gate (bold black dashed curve in FIG. 10A), the effect of the In$_2$O$_3$ gate on the Q factor is negligible. We should point out that the current moderate Q factor of our device is believed to be primarily limited by fabrication errors. With optimized process, higher Q factor and lower insertion loss should be achievable.)

As we apply the bias voltage on the In$_2$O$_3$ gate, electrons and holes start to accumulate at the In$_2$O$_3$/HfO$_2$ and Si/HfO$_2$ interfaces, respectively. The accumulated carriers induce modulation to both the real part and the imaginary part of the optical permittivity, and both contribute to the E-O modulation. The real part variation of the permittivity causes the resonance peak blue shift to shorter wavelength. By increasing the applied voltage from 0 to −4V, the resonant peak blue shifts by 1 nm, FIG. 10A, which corresponds to resonance tuning of 250 pm/V. (By comparison with a conventional silicon MZI modulator, such tuning efficiency corresponds to an equivalent V$_\pi$L of 0.18 V·cm.) The shift of the peak wavelength and the degradation of the Q factor are plotted in FIG. 10B. The Q factor drops to 1,850 due to increased imaginary part of the permittivity as the voltage increases. The imaginary part modulation of the optical permittivity, primarily from the In$_2$O$_3$ layer 554, also increases the optical loss and reduces the peak transmission.

Figure 10C:
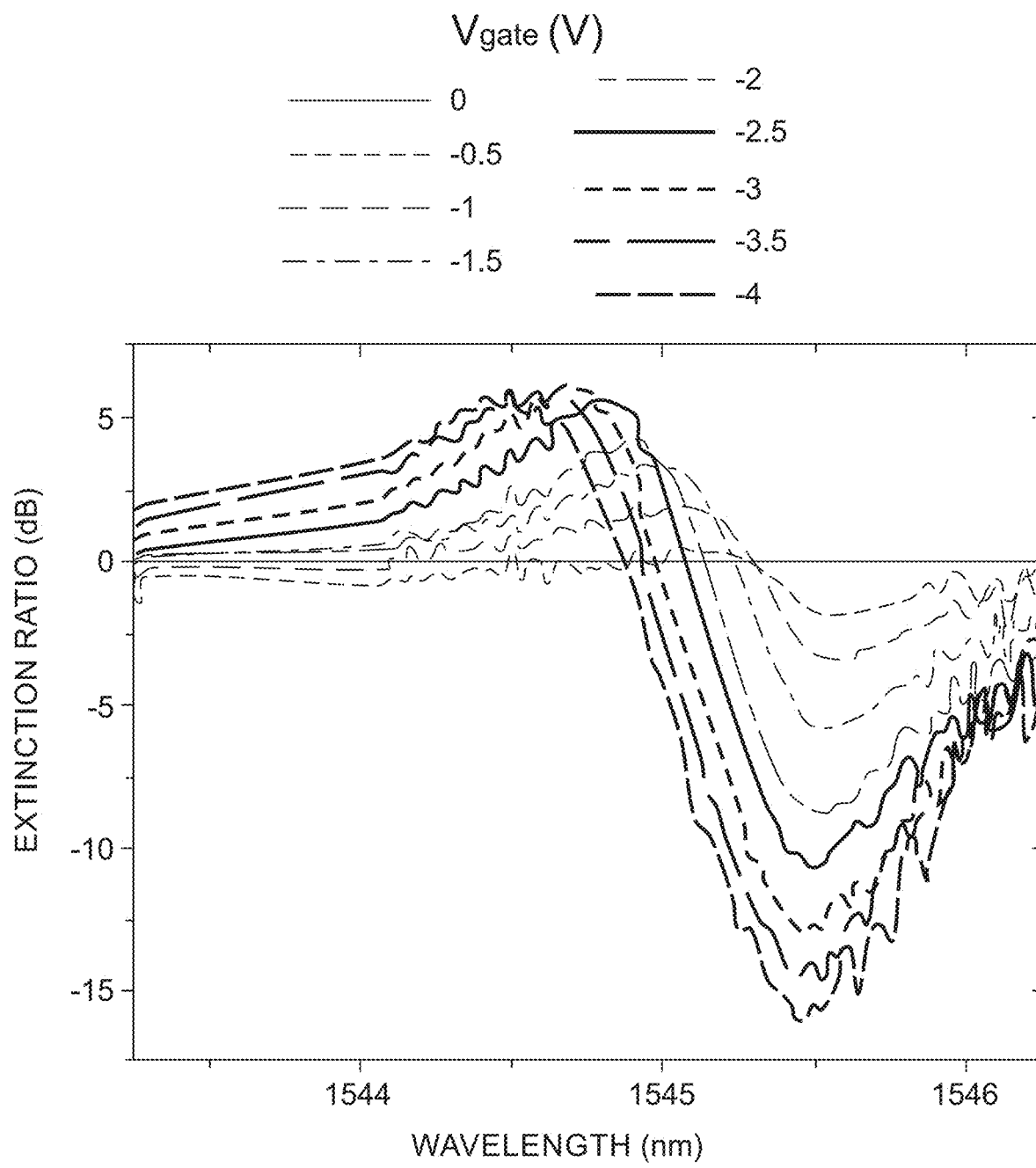
FIG. 10C illustrates extinction ratio spectra at different bias voltages.
Figure 10D:
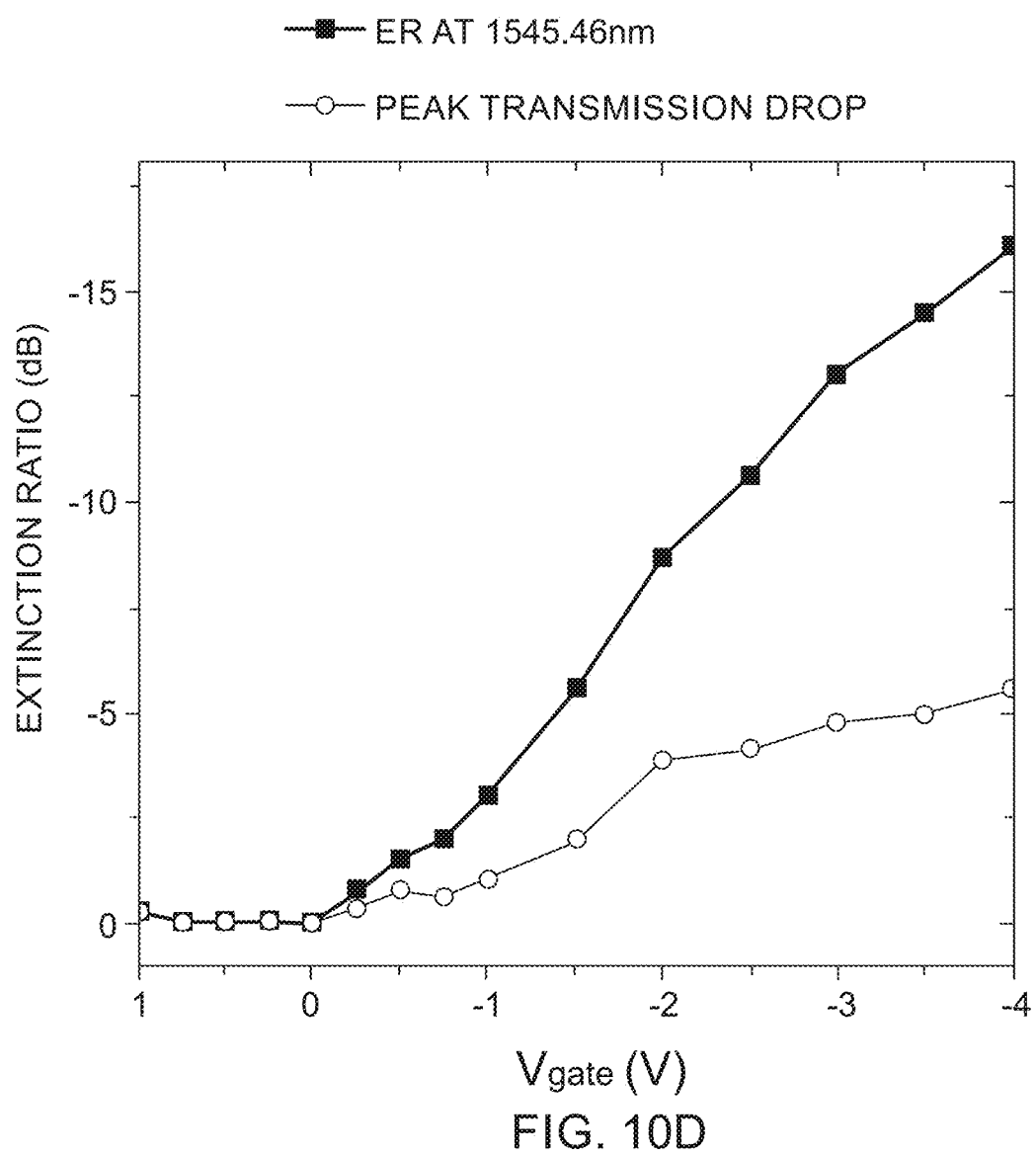
FIG. 10D illustrates extinction ratio at maximum efficiency wavelength (1545.46 nm) and the peak transmission reduction as a function of the applied voltage.

FIG. 10C plots the extinction ratio (ER) spectra as a function of the applied bias. The maximum modulation is observed at 1545.46 nm. The ER at this wavelength as a function of the applied voltage is shown in FIG. 10D. The flat band voltage of roughly 0V is observed, which is due to the similar Fermi levels of In$_2$O$_3$ and p-type silicon. An ER of 16 dB is achieved with a bias changing from 0V to −4V. We also plot the peak transmission versus the applied voltage as shown in FIG. 10D. With −4V applied voltage, the peak transmission drops by 5.6 dB. Compared with the peak transmission drop, the imaginary part modulation of the optical permittivity roughly contributes to around ⅓ to the total ER. The leakage current of the device at −4V is around 10$^{-14}$ A, which is at the noise level of our measurement equipment. This also means the static power consumption of the SIS capacitor 550 is negligible. The driving voltage for 3 dB ER is reduced to less than 1V, which is compatible with CMOS driving circuits. We can estimate the energy consumption of the modulator 500 by (CV$^2$/4) to be 3 fJ/bit. The driving voltage can be further reduced by decreasing the thickness of the gate oxide layer 552. For example, by decreasing the HfO$_2$ thickness to 5 nm, we can double the tuning efficiency to 500 pm/V, while decreasing the driving voltage to 0.5V. If we can increase the Q factor to 5000, we can further decrease the driving voltage to 0.37V, achieving an energy efficiency of 0.8 fJ/bit.

The speed of the photonic crystal nano-cavity modulator 500 is only limited by the RC time constant given the moderate Q factor below 5,000. Considering the silicon doping level of our fabricated device, ~10$^{17}$ cm$^{-3}$, simulation shows a series resistance of ~1MΩ, which yields a RC-delay limited speed of 0.12 GHz together with a capacitance of 13 fF. In the AC measurement of the nano-cavity modulator 500, the rising time of the transmitted optical signal shows a good match with our simulation analysis of ~10$^{-9}$ s. Unfortunately, a large falling time of ~10$^{-6}$ s is observed possibly due to the Schottky contact at the In$_2$O$_3$/Au interface. It is expected that the RF bandwidth can be increased to 2 GHz by increasing the silicon doping concentration to 5×10$^{18}$ cm$^{-3}$. According to a 3-D FDTD simulation, such doping concentration will not limit the Q factor up to at least 5,000. The additional insertion loss from increased doping level can be estimated by the passive waveguide loss (0.017 dB/μm for 5×10$^{18}$ cm$^{-3}$ doping concentration) and the photon life time of the nano-cavity (~4 ps for Q factor of 5,000), which equates to only ~1 dB.

In sum, the modulator 500 exhibited strong light-matter interaction from the accumulated free carriers with the nano-cavity resonant mode to result in holistic improvement in device performance. A low-voltage silicon photonic crystal nano-cavity modulator 500 with an ultra-short In$_2$O$_3$ electrical gate of only 350 nm in length was demonstrated, showing a large resonance tuning efficiency of 250 pm/V and an average modulation strength of 4 dB/V for a medium Q factor of 3,700. The 3 dB driving voltage was reduced to less than 1V on a 13 fF gate, which can be directly driven by CMOS logic gates without any additional signal amplification. The modulator 500 also preserved the feasibility to scale down the driving voltage by reducing the thickness of the gate oxide layer. Since the active volume of our nano-cavity modulator 500 was 10~50× smaller compared with micro-ring or micro-disk modulators, the modulator 500 should be more efficient in thermal tuning. Also, the moderate Q-factor makes the device quite tolerant to temperature variation although a thermal heater may still be needed to lock the operational wavelength.

Calculation of Permittivity and Refractive Index of ITO and Si as Used Above

The optical properties of the Silicon and ITO are described by the Drude model. The relative permittivity, $\varepsilon_r = \varepsilon_1 + i\varepsilon_2$, is given by $$\varepsilon_r = \varepsilon_\infty + \frac{\omega_p^2}{\omega(\omega + i\Gamma)},$$

where $\varepsilon_\infty$ is the high frequency dielectric constant, $\omega_p$ is the plasma frequency defined as $$\omega_p^2 = \frac{N_c q^2}{\varepsilon_0 m^*}, \text{ and } \Gamma = \frac{1}{\tau}$$

is the plasma collision frequency. Here N$_c$ is the free carrier concentration, q is the electron charge, $\varepsilon_0$ is the vacuum permittivity, and m* is the effective mass of the carrier. The plasma collision frequency γ is related with the carrier mobility μ by $$\mu = \frac{q\tau}{m^*}.$$

The complex retractive index can be calculated from the permittivity, (n+iκ)$^2 = \varepsilon_r$. In our calculation, undoped silicon dielectric constant $\varepsilon_{\infty,Si}$=12.27, hole effective mass m*$_h$=0.36 m$_0$, where m$_0$ is the free electron mass, and hole mobility μ$_h$=450 cm$^2$V$^{-1}$ s$^{-1}$ are used for the p-type silicon. The optical and electric properties are highly dependent on the deposition condition. Here, we take $\varepsilon_{\infty,ITO}$=3.9, m*$_e$=0.35 m$_0$, and Γ=1.8×10$^{14}$ rad s$^{-1}$ for the calculation.

Electric Modeling of ITO/oxide/Si Capacitor as Used Above

The carrier concentration distribution was calculated based on classic SIS theory, by numerically solving the Poisson equation. Because of the huge difference of the doping level between ITO and Si, different expressions were needed to model the relationship between the carrier density distribution and the electric potential distribution. ITO has a metallic like relationship due to the degenerated doping. The local electron density distribution near the conduction band n and electrical potential $\Psi$ is expressed as $$n = \frac{1}{3\pi^2}\left(\frac{8\pi^2 m_e^*}{h^2}\right)^{\frac{3}{2}} (E_F + \Psi)^{\frac{3}{2}},$$

where h is the plank constant and $m_e^* = 0.35\ m_0$ is the electron effective mass near the conduction band. The Fermi energy is defined as $$E_F = \frac{h^2}{8\pi^2 m_e^*}(3\pi^2 N_0)^{\frac{2}{3}},$$

where $N_0$ is the initial carrier concentration of the ITO bulk. On the other hand, in Si, Fermi-Dirac distribution is considered due to large band bending. The local hole density distribution p is calculated as $$p = 4\pi\left(\frac{2m_{h,DOS}^*}{h^2}\right)^{\frac{3}{2}} \int_{-\infty}^{E_V} (E_V - E)^{\frac{1}{2}} f(E)\, dE,$$

where $m_{h,DOS}^* = 1.15\ m_0$ is the density of states effective mass of hole in silicon and $E_V$ is valence band top. The Fermi-Dirac distribution is defined as $$f(E) = \frac{1}{1 + \exp[(E_F - \Psi - E)/kT]}.$$

Because $m_{h,DOS}^*$ of Si is more than 3× of $m_e^*$ of ITO, the effective density of state for holes in the Si valence band, $$N_V = 2\left[\frac{2m_{h,DOS}^* kT}{h^2}\right]^{\frac{3}{2}},$$

is much larger than that for electrons in the ITO conduction band, $$N_C = 2\left[\frac{2m_e^* kT}{h^2}\right]^{\frac{3}{2}}.$$

After we get the carrier concentration distribution, we calculate the electric field and electric displacement field at the gate insulator interfaces using the following relative static permittivity: $\varepsilon_{ITO,st}=9.3$, $\varepsilon_{Si,st}=11.2$, $\varepsilon_{SiO2,st}=3.9$, $\varepsilon_{Al2O3,st}=9$, and $\varepsilon_{HfO2,st}=25$. The dielectric strength of the gate insulators we use to estimate the breakdown voltage are $E_{SiO2}=10$ MV/cm, $E_{Al2O3}=7$ MV/cm and $E_{HfO2}=5$ MV/cm$^4$. The simulation results are listed in Table 1.

TABLE 1

| | ITO carrier accumulation summary and gate voltage scaling | | | | |
|---|---|---|---|---|---|
| $D_{ox}/\varepsilon_0$ (MV/cm) | peak $N_{e,ITO}$ (cm$^{-3}$) | total accumulated charge (cm$^{-2}$) | $V_{gate}$ (V) 20 nm SiO$_2$ gate oxide | $V_{gate}$ (V) 5 nm SiO$_2$ gate oxide | $V_{gate}$ (V) 5 nm HfO$_2$ gate oxide |
| 19.5 | 2.37 × 10$^{20}$ | 1.09 × 10$^{13}$ | 10.5 | 3.0 | 0.9 |
| 39.0 | 3.94 × 10$^{20}$ | 2.17 × 10$^{13}$ | 20.8 | 5.8 | 1.6 |
| 58.5 | 5.65 × 10$^{20}$ | 3.26 × 10$^{13}$ | 31.0 (breakdown) | 8.5 (breakdown) | 2.2 |
| 78.0 | 7.46 × 10$^{20}$ | 4.35 × 10$^{13}$ | 41.2 (breakdown) | 11.2 (breakdown) | 2.8 |

Calculation of the Capacitance and Resistance of the Modulator as Used Above

Figure 8:
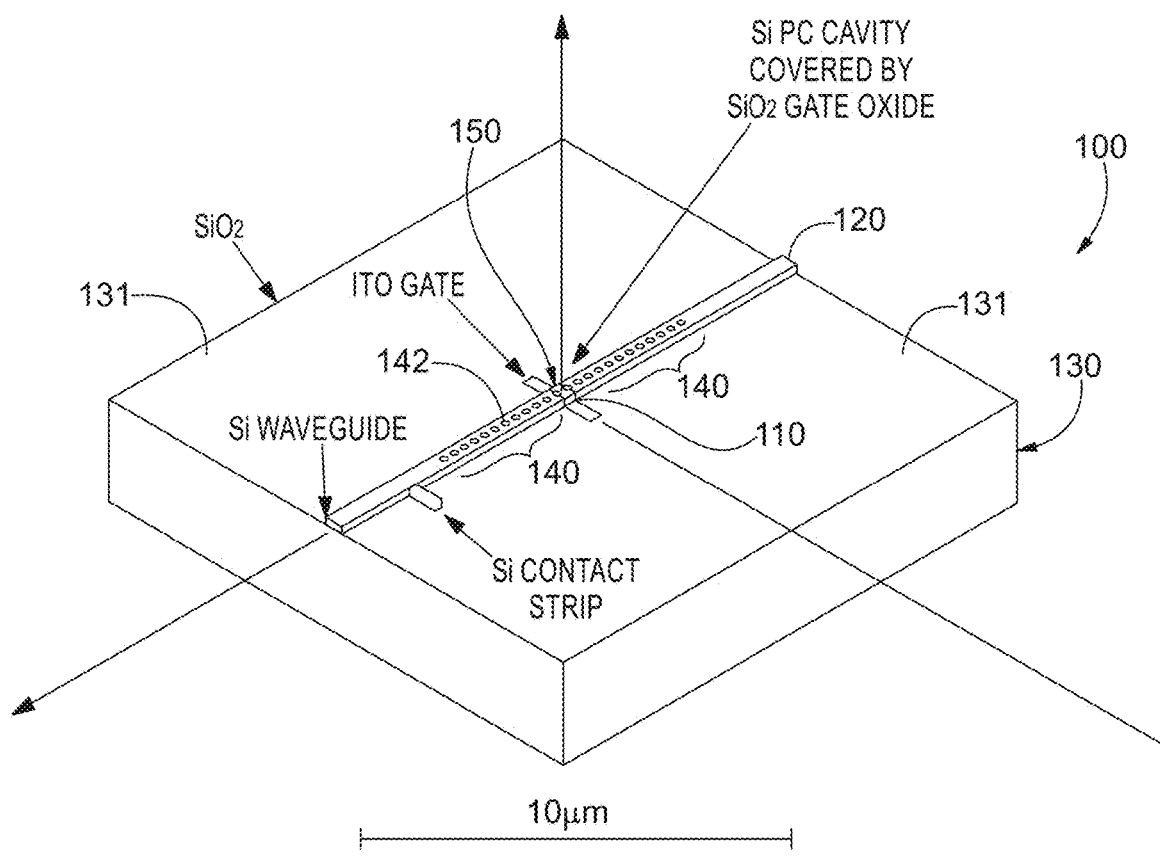
FIG. 8 schematically illustrates a structure used in a finite element method (FEM) capacitance simulation.

The capacitance of the modulator 100, 500 was simulated through ANSYS® HFSS based on finite element method (FEM). FIG. 8 shows the structural model used in the simulation. Here we considered the 8 µm long Si PC nano-cavity covered by 20 nm thick SiO$_2$ gate oxide with 20 nm thick ITO gate (width×length=1.5 µm×0.375 µm) in the center. The structure parameters were the same as the fabricated modulator 100 except that the parasitic effect from the contacting pads was excluded in our simulation. A lumped port was added between the Si conduction strip 132 and the ITO gate 154. The simulation gave a capacitance of 1.28 fF. The parasitic capacitances of the metal electrode pads 131 and the Si slab were not included, since these capacitances can be minimized through optimized electrode design and optoelectronic integration with the modulator driver.

Figure 9A:
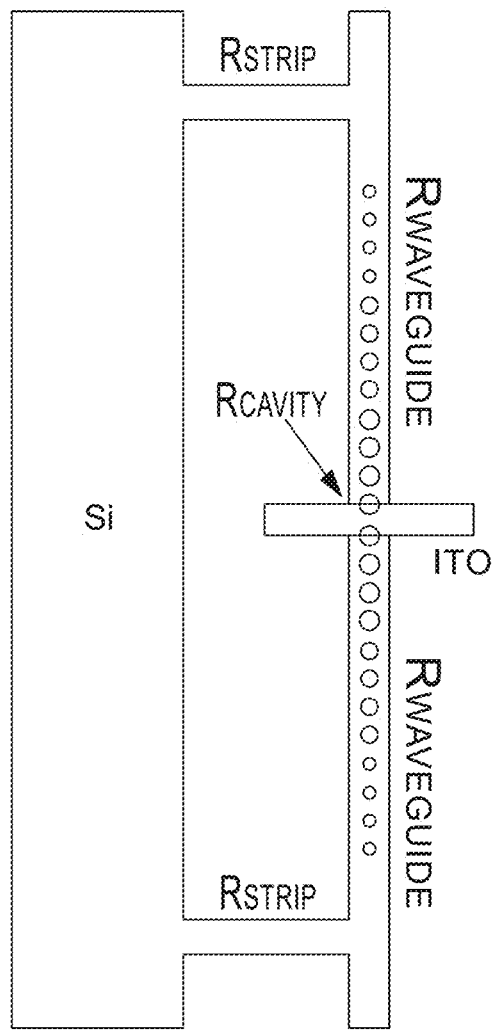
FIG. 9A schematically illustrates a hybrid Si-ITO modulator in accordance with the present invention.
Figure 9B:
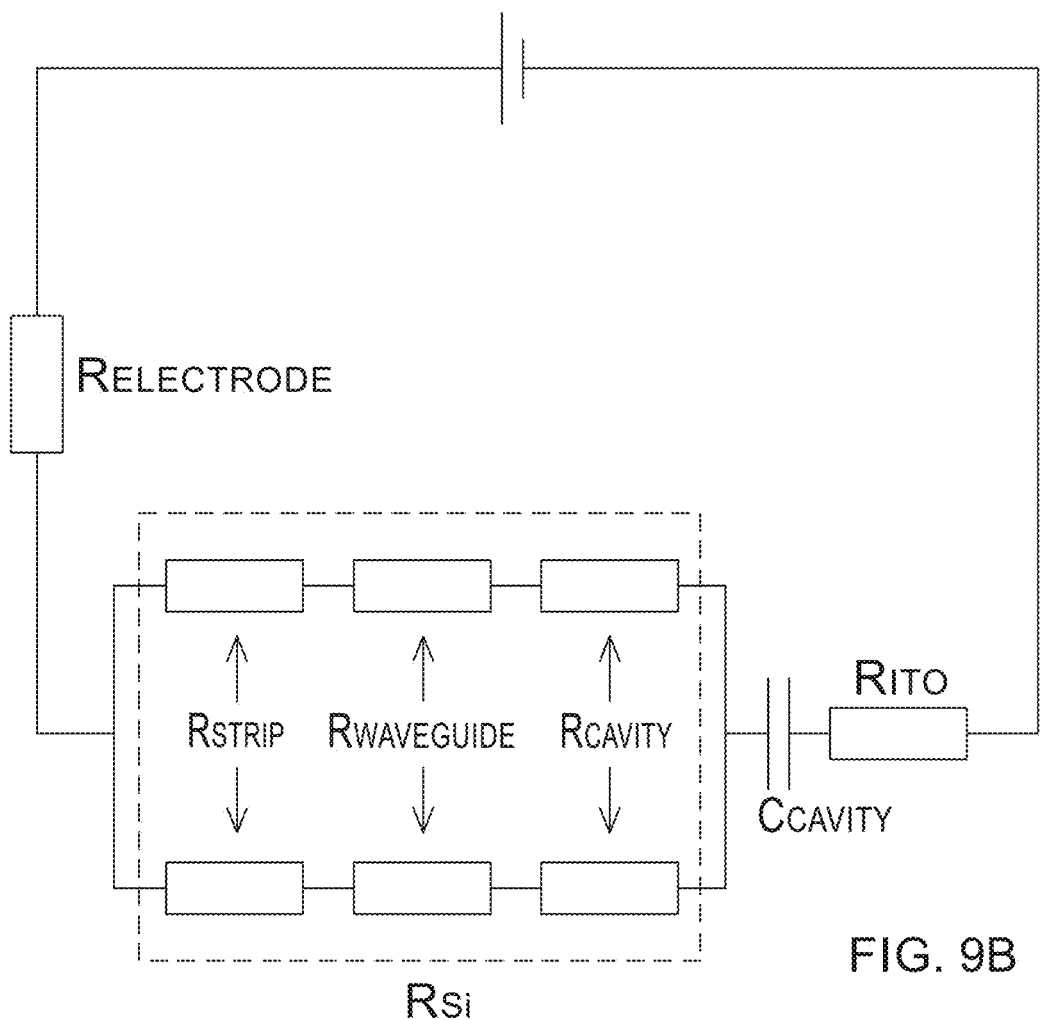
FIG. 9B schematically illustrates an equivalent circuit model of the modulator of FIG. 9A.

FIGS. 9A, 9B show the equivalent circuit model of the modulator 100. Basically, the total series resistance has three parts: the electrode resistance $R_{electrode}$, the resistance of the ITO gate $R_{ITO}$ and the resistance of Si conduction path $R_{Si}$. FIG. 9B. $R_{Si}$ again has three parts: the resistance of the conduction strips (2 µm long) $R_{strip}$, the resistance of the PC waveguide (~5 µm long on each side) $R_{waveguide}$, and the resistance of the PC cavity (~200 nm long) $R_{cavity}$.

For our current fabricated device, the series resistance was dominated by $R_{Si}$ due to the lightly doped SOI slab. The doping level was around 1×10$^{15}$ cm$^{-3}$, and the corresponding Si resistivity was 13.5 Ωcm. Then, $R_{strip}$, $R_{waveguide}$ and $R_{cavity}$ could be estimated to be 1.4 MΩ, 3.4 MΩ and 70 kΩ, respectively. The total $R_{Si}$ was around 4.9 MΩ.

Because the optical mode of the PC cavity 110 was concentrated in the center cavity region, we could greatly reduce the series resistance while keeping the optical loss at a moderate level by separately doping the Si conduction strip 132 and the region of the PC waveguide 120 to a high doping level of $5\times10^{18}$ cm$^{-3}$ and lightly doping the region of the cavity 110 to $1\times10^{17}$ cm$^{-3}$. The Si resistivity was then reduced to 0.0145 Ωcm and 0.197 Ωcm, respectively. Then, $R_{strip}$, $R_{waveguide}$ and $R_{cavity}$ could be reduced to 1.5 kΩ, 3.5 kΩ and 1 kΩ, respectively. Thus, the total $R_{Si}$ became 6 kΩ, which was at the same order of magnitude of $R_{ITO}$ under current configuration (~3 kΩ). The total series resistance became 9 kΩ. The series resistance may be further reduced by optimizing the electrode contact configuration using ridge waveguides.

Figure 13A:
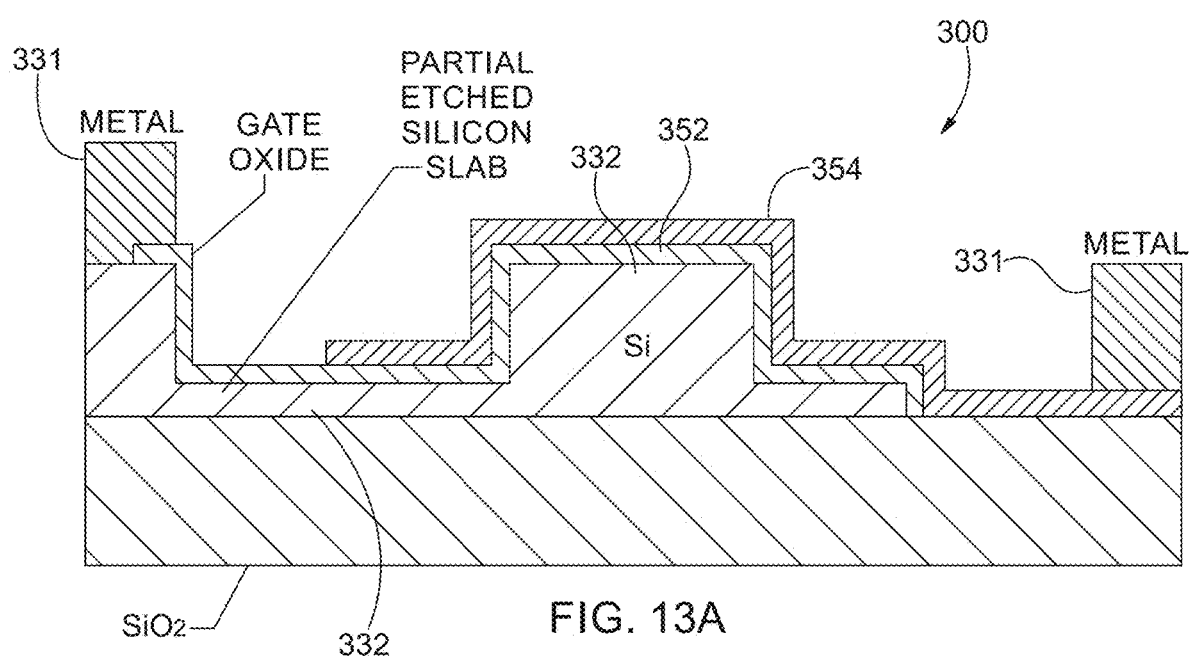
FIGS. 13A, 13B schematically illustrate side cross-section and top views, respectively, of a further exemplary contact design in accordance with the present invention, with FIG. 13A including the gate oxide layer and TCO gate layer and with FIG. 13B showing the structure of FIG. 13A prior to depositing the gate oxide layer and TCO gate layer.
Figure 13B:
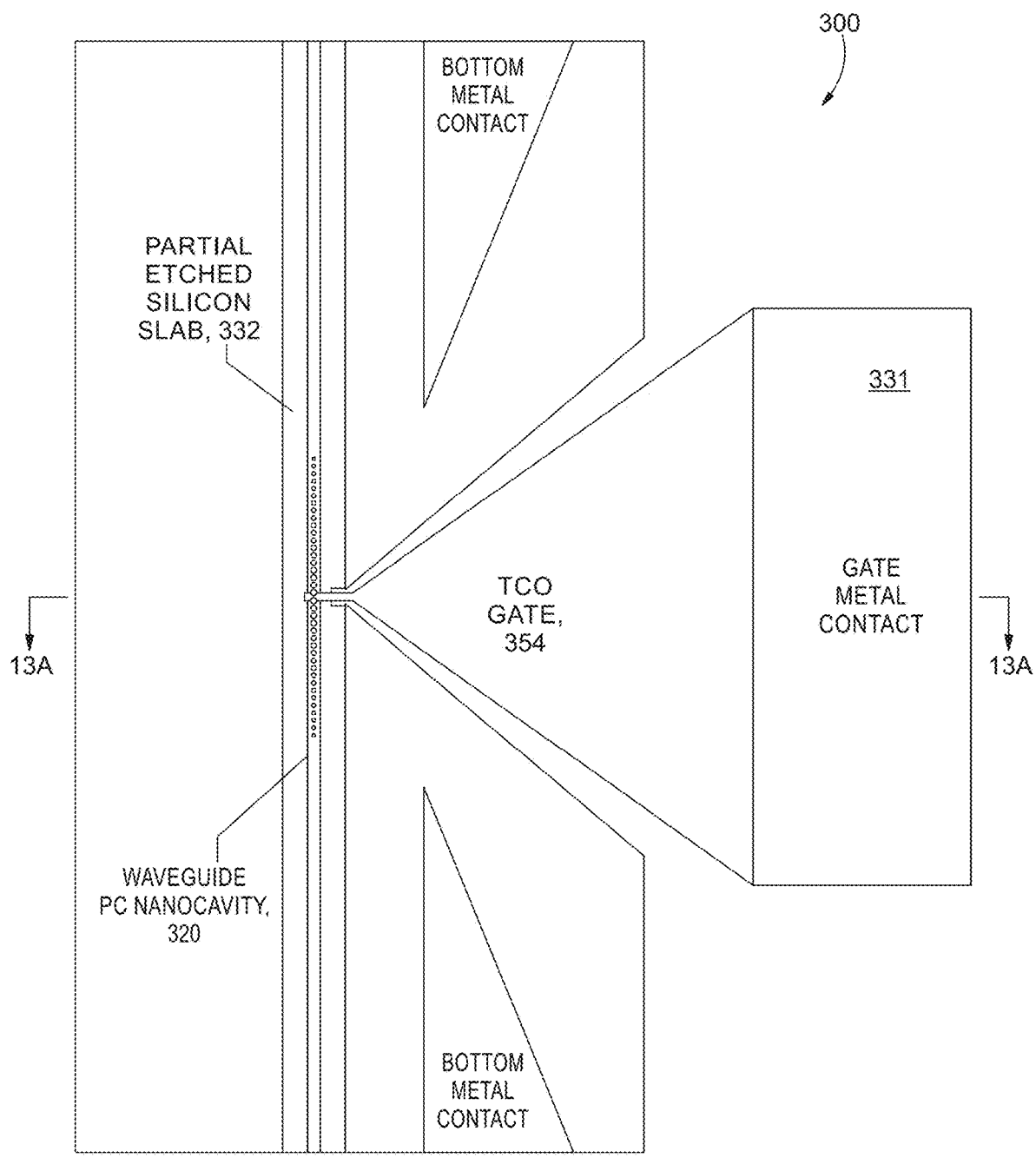

While the modulators 100, 500 of FIGS. 2A, 6A show complete removal, in selected regions, of the silicon down to the SiO$_2$ of the SOI wafer, it may be desirable to only partially etch the silicon slab to provide electrical connection between the silicon waveguide 120 and the silicon slab. For instance, a partial etch may provide un-etched silicon regions 332 that electrically connect the silicon waveguide 320 to the silicon slab disposed under the metal electrode 331 adjacent thereto, FIGS. 13A, 13B. As such the silicon strips 132 provided in the modulator 100 are not required in the modulator 300, though the two modulators 100, 300 may otherwise be similar, such as having a gate oxide layer 152, 352 and a TCO gate oxide layer 154, 354.

These and other advantages of the present invention will be apparent to those skilled in the art from the foregoing specification. Accordingly, it will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims.

What is claimed is:

1. An electro-optic modulator, comprising a semiconductor photonic crystal nano-cavity, and a semiconductor-insulator-semiconductor (SIS) capacitor disposed in contact with the nano-cavity, wherein the semiconductor photonic crystal nano-cavity comprises a one-dimensional nano-cavity and comprises two photonic crystal mirror segments placed back-to-back with the nano-cavity disposed therebetween.

2. The electro-optic modulator of claim 1, wherein the SIS capacitor comprises a first layer of oxide material disposed on the nano-cavity and comprises a second layer of transparent conductive oxide (TCO) material disposed on and covering the first layer of material to provide a stack of oxide material and TCO material.

3. The electro-optic modulator of claim 2, wherein the first and second layers are conformally deposited on the nano-cavity.

4. The electro-optic modulator of claim 2, wherein the second layer comprises one or more of indium-tin oxide and In$_2$O$_3$.

5. The electro-optic modulator of claim 4, wherein the first layer comprises one or more of SiO$_2$ and HfO$_2$.

6. The electro-optic modulator of claim 2, wherein the first layer comprises one or more of SiO$_2$ and HfO$_2$.

7. The electro-optic modulator of claim 2, wherein the second layer has a conductivity of at least 3.2e4 S/m.

8. The electro-optic modulator of claim 1, comprising a waveguide made of the semiconductor material with the nano-cavity located therein.

9. The electro-optic modulator of claim 1, wherein the photonic crystal mirror segments extend along the length of the waveguide.

10. The electro-optic modulator of claim 8, comprising a first electrode disposed in electrical communication with the waveguide at the location of the nano-cavity and a second electrode disposed in electrical communication with the second layer.

11. The electro-optic modulator of claim 8, wherein the waveguide is a strip waveguide.

12. An electro-optic modulator, comprising:
a strip waveguide comprising a semiconductor material, the waveguide having a height, length, and width;
two photonic crystal mirror segments placed back-to-back along the length of the waveguide to define a one-dimensional photonic crystal nano-cavity therebetween;
a layer of oxide material conformally disposed in contact with an upper surface of the waveguide at the location of the nano-cavity; and
a layer of transparent conductive oxide disposed in contact with the layer of oxide material.

13. The electro-optic modulator of claim 12, wherein the waveguide has one or more side surfaces dispose in contact with the upper surface and wherein the layer of oxide material is conformally deposited in contact with the one or more side surfaces.

14. A method for modulating light, comprising:
providing an electro-optic modulator having a semiconductor photonic crystal nano-cavity, and a semiconductor-insulator-semiconductor (SIS) capacitor disposed in contact with the nano-cavity, wherein the semiconductor photonic crystal nano-cavity comprises a one-dimensional nano-cavity and comprises two photonic crystal mirror segments placed back-to-back with the nano-cavity disposed therebetween;
injecting light into the photonic crystal nano-cavity; and
applying a time-varying voltage across the SIS capacitor to effect modulation of the light within the photonic crystal nano-cavity.

15. The method of claim 14, wherein the SIS capacitor comprises a first layer of oxide material disposed on the nano-cavity and comprises a second layer of transparent conductive oxide (TCO) material disposed on and covering the first layer of material to provide a stack of oxide material and TCO material, and wherein the step of providing a time-varying voltage comprises applying the voltage to the transparent conductive oxide material and the nano-cavity.

16. The method of claim 14, wherein the SIS capacitor comprises a first layer of oxide material disposed on the nano-cavity and comprises a second layer of transparent conductive oxide (TCO) material disposed on and covering the first layer of material to provide a stack of oxide material and TCO material, and wherein the step of providing a time-varying voltage comprises applying the voltage to create an epsilon-near-zero (ENZ) mode in the transparent conductive oxide material.

* * * * *